US010984593B2

(12) United States Patent
Wang

(10) Patent No.: US 10,984,593 B2
(45) Date of Patent: Apr. 20, 2021

(54) METHODS OF HIGH-DEFINITION CELLULAR LEVEL SET IN B-SPLINES FOR MODELING AND TOPOLOGY OPTIMIZATION OF THREE-DIMENSIONAL CELLULAR STRUCTURES

(71) Applicant: The Hong Kong University of Science And Technology, Kowloon (HK)

(72) Inventor: Michael Yu Wang, Kowloon (HK)

(73) Assignee: THE HONG KONG UNIVERSITY OF SCIENCE AND TECHNOLOGY, Kowloon (HK)

(*) Notice: Subject to any disclaimer, the term of this patent is extended or adjusted under 35 U.S.C. 154(b) by 0 days.

(21) Appl. No.: 16/665,369

(22) Filed: Oct. 28, 2019

(65) Prior Publication Data
US 2020/0134918 A1 Apr. 30, 2020

Related U.S. Application Data

(60) Provisional application No. 62/766,683, filed on Oct. 31, 2018.

(51) Int. Cl.
G06T 17/30 (2006.01)
G06T 15/08 (2011.01)
(Continued)

(52) U.S. Cl.
CPC ............ G06T 17/30 (2013.01); G06T 5/30 (2013.01); G06T 15/08 (2013.01); G06T 19/20 (2013.01); G06T 2219/2021 (2013.01)

(58) Field of Classification Search
CPC ........... G06T 17/30; G06T 5/30; G06T 15/08; G06T 19/20; G06T 2219/2021
See application file for complete search history.

(56) References Cited

U.S. PATENT DOCUMENTS

2010/0239178 A1* 9/2010 Osher ................. G06T 9/001
382/243
2015/0190971 A1 7/2015 Musuvathy et al.
(Continued)

FOREIGN PATENT DOCUMENTS

WO 2004/093657 A2 11/2004
WO 2014/160389 A1 10/2014
(Continued)

OTHER PUBLICATIONS

Béla et al., Adjusting Curvatures of B-spline Surfaces by Operations on Knot Vectors, KoG.20-2016, pp. 79-84. (Year: 2016).*
(Continued)

Primary Examiner — Haixia Du
(74) Attorney, Agent, or Firm — Amin, Turocy & Watson, LLP

(57) ABSTRACT

Techniques for designing and optimization of solid/cellular structures are described using a modeling process referred to as high-definition cellular level set in B-splines (HD-CLIBS). With this process, the entire design domain for the solid/cellular structure in question is subdivided into a set of connected volumetric cells in three dimensions. An implicit trivariate B-spline function is defined on each subdomain cell. With this parameterization scheme, constraints can be imposed on the relevant B-spline coefficients to naturally maintain geometric continuities at the connection faces between neighboring cells. The method offers several useful properties and powerful functionalities to build and modify a solid/cellular structure in the modeling process and to conduct topology optimization by directly adjusting the B-spline coefficients. The model construction can be carried out using a fast B-spline interpolation, and the topology optimization can involve a sequence of discrete B-spline convolutions.

20 Claims, 27 Drawing Sheets

(51) Int. Cl.
G06T 5/30 (2006.01)
G06T 19/20 (2011.01)

(56) References Cited

U.S. PATENT DOCUMENTS

2015/0193559 A1 7/2015 Musuvathy
2016/0096318 A1 4/2016 Bickel et al.
2018/0275637 A1* 9/2018 Elber ................. G06T 17/10

FOREIGN PATENT DOCUMENTS

WO 2015/106020 A1 7/2015
WO 2015/185702 A1 12/2015

OTHER PUBLICATIONS

Gibson et al., "Cellular solids: structure and properties", Cambridge University Press, Technology & Engineering, 1999, pp. 1-209.
Sigmund et al., "Topology optimization approaches", Structural and Multidisciplinary Optimization, vol. 48, No. 6, 2013, 25 pages.
Liu et al., "Current and future trends in topology optimization for additive manufacturing", Structural and Multidisciplinary Optimization, 2018, 27 pages.
Nishiwaki et al., "Advanced topology optimization", International Journal for Numerical Methods in Engineering, vol. 113, No. 8, 2018, pp. 1145-1147.
Zhou et al., "Multi-component topology and material orientation design of composite structures (MTO-C)", Computer Methods in Applied Mechanics and Engineering, vol. 342, 2018, 36 pages.
Clausen et al., "Topology Optimized Architectures with Programmable Poisson's ratio over Large Deformations", Advanced Materials, vol. 27, No. 37, 2015, pp. 5523-5527.
Chen et al., "Shape optimization with topological changes and parametric control", International Journal for Numerical Methods in Engineering, vol. 71, No. 3, 2007, pp. 313-346.
Sigmund, Ole, "Materials with Prescribed Constitutive Parameters: An Inverse Homogenization Problem", Int. J. Solids Struct., vol. 31, No. 17, 1994, pp. 2313-2329.
Chen et al., "Concurrent topology design of structure and material using a two-scale topology optimization", Computers & Structures, vol. 178, 2017, pp. 119-128.
Kato et al., "Micro-macro concurrent topology optimization for nonlinear solids with a decoupling multiscale analysis", International Journal for Numerical Methods in Engineering, 2017, 34 pages.
Sivapuram et al., "Simultaneous material and structural optimization by multiscale topology optimization", Structural and Multidisciplinary optimization, vol. 54, No. 5, 2016, 15 pages.
Wang et al., "Structure-material integrated design by level sets", Structural and Multidisciplinary Optimization, vol. 54, No. 5, 2016, 12 pages.
Wang et al., "Multiscale isogeometric topology optimization for lattice materials", Computer Methods in Applied Mechanics and Engineering, Aug. 2016, pp. 1-18.
Li et al., "Topology optimization for concurrent design of structures with multi-patch microstructures by level sets", Computer Methods in Applied Mechanics and Engineering, vol. 331, Apr. 1, 2018, pp. 1-37.
Groen et al., "Homogenization-based topology optimization for high-resolution manufacturable microstructures", International Journal for Numerical Methods in Engineering, vol. 113, No. 8, 2018, pp. 1-16.
Xia et al., "Recent Advances on Topology Optimization of Multiscale Monlinear Structures", Archives of Computational Methods in Engineering, vol. 24, No. 2, 2017, 23 pages.
Li et al., "Integrated design of cellular composites using a level-set topology optimization method", Computer Methods in Applied Mechanics and Engineering, vol. 309, 2016, pp. 1-32.

Nakshatrala et al., "Nonlinear structural design using multiscale topology optimization. Part I: Static formulation", Computer Methods in Applied Mechanics and Engineering, vol. 261-262, 2013, pp. 167-176.
Zong et al., "VCUT level set method for topology optimization of functionally graded cellular structures", ScienceDirect, Comput. Methods Appl. Mech. Engrg., vol. 354, 2019, pp. 487-505.
Farin, Gerald, "Curves and Surfaces for CAGD: A Practical Guide", Fifth Edition, Morgan Kaufmann, 2002, 521 pages.
Massarwi et al., "A B-spline based framework for volumetric object modeling", ScienceDirect, Computer-Aided Design, vol. 78, 2016, pp. 36-47.
Regli et al., "The New Frontiers in Computational Modeling of Material Structures", Computer-Aided Design, vol. 77, 2016, pp. 1-24.
Song et al., "Modeling and 3D object reconstruction by implicitly defined surfaces with sharp features", Computers & Graphics, vol. 33, No. 3, 2009, pp. 321-330.
Sethian, J. A. "Level set methods and fast marching methods: evolving interfaces in computational geometry, fluid mechanics, computer vision, and materials science", Cambridge University Press, 1999.
Osher et al., "Level Set Methods and Dynamic Implicit Surfaces", Springer, 2003, 288 pages.
Ho et al., "Parametric structural optimization with radial basis functions and partition of unity method", Optimization Methods and Software, vol. 26, No. 4-5, 2011, pp. 533-553.
Ho et al., "Parametric structural optimization with dynamic knot RBFs and partition of unity method", Structural and Multidisciplinary Optimization, vol. 47, No. 3, 2013, pp. 353-365.
Otomori et al., "Matlab code for a level set-based topology optimization method using a reaction diffusion equation", Structural and Multidisciplinary Optimization, vol. 51, No. 5, 2015, 14 pages.
Wei et al., "Piecewise constant level set method for structural topology optimization", International Journal for Numerical Methods in Engineering, vol. 78, No. 4, 2009, pp. 379-402.
Bajaj et al., "Higher-Order Level-Set Method and Its Application in Biomolecular Surfaces Construction", Journal of Computer Science and Technology, vol. 23, No. 6, 2008, pp. 1026-1036.
Zhang et al., "Stochastic sampling for deterministic structural topology optimization with many load cases: Density-based and ground structure approaches", Computer Methods in Applied Mechanics and Engineering, vol. 325, 2017, pp. 1-38.
Schillinger et al., "The Finite Cell Method: A Review in the Context of Higher-Order Structural Analysis of CAD and Image-Based Geometric Models", Archives of Computational Methods in Engineering, vol. 22, No. 3, 2015, 65 pages.
Liu et al., "A uniform multiscale method for 3D static and dynamic analyses of heterogeneous materials", ScienceDirect, Computational Materials Science, vol. 79, 2013, pp. 159-173.
Liu et al., "Efficient structure topology optimization by using the multiscale finite element method", Structural and Multidisciplinary Optimization, vol. 58, 2018, 20 pages.
Villanueva et al., "CutFEM topology optimization of 3D laminar incompressible flow problems", Computer Methods in Applied Mechanics and Engineering, vol. 320, 2017, pp. 1-40.
Gibson et al., "Cellular solids: structure and properties", Cambridge University Press, Technology & Engineering, 1999, pp. 210-536.
Wang et al., "Cellular level set in B-splines (CLIBS): A method for modeling and topology optimization of cellular structures", ScienceDirect,Comput. Methods Appl. Mech. Engrg., vol. 349, 2019, pp. 378-404.
Cai et al., "A control approach for pore size distribution in the bone scaffold based on the hexahedral mesh refinement", ScienceDirect, Computer-Aided Design, vol. 40, 2008, pp. 1040-1050.
Aremu et al., "A voxel-based method of constructing and skinning conformal and functionally graded lattice structures suitable for additive manufacturing", ScienceDirect, Additive Manufacturing, vol. 13, 2017, pp. 1-13.
Wang et al., "Concurrent design with connectable graded microstructures", ScienceDirect, Comput. Methods Appl. Mech. Engrg., vol. 317, 2017, pp. 84-101.

(56) References Cited

OTHER PUBLICATIONS

Andreassen et al., "Design of manufacturable 3D extremal elastic microstructure", ScienceDirect, Mechanics of Materials, vol. 69, 2014, pp. 1-10.
Aage et al., "Giga-voxel computational morphogenesis for structural design", Letter Research, Naure, vol. 550, Oct. 5, 2017, pp. 84-94.
Schumacher et al., "Microstructures to Control Elasticity in 3D Printing", ACM Transactions on Graphics, vol. 34, No. 4, Article 136, Aug. 2015, 13 pages.
Fryazinov et al., "Multi-scale space-variant FRep cellular structures", ScienceDirect, Computer-Aided Design, vol. 45, 2013, pp. 26-34.
Yoo, Dongjin, "New paradigms in internal architecture design and freeform fabrication of tissue engineering porous scaffolds", ScienceDirect, Medical Engineering & Physics, vol. 34, 2012, pp. 762-776.
Wang et al., "Topological design and additive manufacturing of porous metals for bone scaffolds and orthopaedic implants: A review", ScienceDirect, Biomaterials, vol. 83, 2016, pp. 127-141.
Alexandersen et al., "Topology optimisation of manufacturable microstructural details without length scale separation using a spectral coarse basis preconditioner", ScienceDirect, Comput. Methods Appl. Mech. Engrg., vol. 290, 2015, pp. 156-182.
Zhu et al., "Two-Scale Topology Optimization with Microstructures", ACM Transactions on Graphics, vol. 36, No. 5, Article 164, Jul. 2017, 16 pages.
Bendsøe et al., "Generating Optimal Topologies in Structural Design Using a Homogenization Method", Computer Methods in Applied Mechanics and Engineering, vol. 71, No. 2, 1988, pp. 197-224.
Zhou et al., "The COC algorithm, Part II: Topological, geometrical and generalized shape optimization", Computer Methods in Applied Mechanics and Engineering, vol. 89, 1991, pp. 309-336.
Bendsøe et al., "Material interpolation schemes in topology optimization", Archive of Applied Mechanics, vol. 69, 1999, pp. 635-654.
Wang et al., "A level set method for structural topology optimization", ScienceDirect, Comput. Methods Appl. Mech. Engrg., vol. 192, 2003, pp. 227-246.
Allaire et al., "Structural optimization using sensitivity analysis and a level-set method", ScienceDirect, Journal of Computational Physics, vol. 194, 2004, pp. 363-393.
Wang et al., "An extended level set method for shape and topology optimization", ScienceDirect, Journal of Computational Physics, vol. 221, 2007, pp. 395-421.
Wei et al., "An 88-line MATLAB code for the parameterized level set method based topology optimization using radial basis functions", Structural and Multidisciplinary Optimization, Feb. 13, 2018, 19 pages.
Wang et al., "Radial basis functions and level set method for structural topology optimization", International Journal for Numerical Methods in Engineering, vol. 65, 2006, pp. 2060-2090.
Luo et al., "A level set-based parameterization method for structural shape and topology optimization", International Journal for Numerical Methods in Engineering, vol. 76, 2008, pp. 1-26.
Luo et al., "Shape and topology optimization of compliant mechanisms using a parameterization level set method", ScienceDirect, Journal of Computational Physics, vol. 227, 2007, pp. 680-705.
Li et al., "Topological shape optimization design of continuum structures via an effective level set method", Cogent Engineering, vol. 3, No. 1, 2016, pp. 1-14.
Li et al., "A level set method for topological shape optimization of 3D structures with extrusion constraints", Computer Methods in Applied Mechanics and Engineering, vol. 283, Jan. 1, 2015, 47 pages.
Bernard et al., "Variational B-spline level-set: a linear filtering approach for fast deformable model evolution", IEEE Transactions on Image Processing, vol. 18, No. 6, Jun. 2009, pp. 1179-1191.
Unser et al., "Fast B-spline Transforms for Continuous Image Representation and Interpolation", IEEE Transactions on Pattern Analysis & Machine Intelligence, vol. 13, No. 3, Mar. 1991, pp. 277-285.
Bajaj et al., "Smooth Surface Constructions via a Higher-Order Level-Set Method", 10th IEEE International Conference on Computer-Aided Design and Computer Graphics, 2007, 1 page.
Rouhani et al., "Implicit B-Spline Surface Reconstruction", IEEE Transactions on Image Processing, vol. 24, No. 1, 2015, pp. 1-12.
Frenzel et al., "Three-dimensional mechanical metamaterials with a twist", Science, Research|Report, vol. 358, Nov. 24, 2017, pp. 1072-1074.
Zheng et al., "Ultralight, Ultrastiff Mechanical Metamaterials", Science, vol. 344, Issue 6190, Jun. 20, 2014, pp. 1373-1377.
Meza et al., "Strong, lightweight, and recoverable three-dimensional ceramic nanolattices", Science, Research|Reports, vol. 345, Issue 6202, Sep. 12, 2014, pp. 1322-1326.
Bauer et al., "Approaching theoretical strength in glassy carbon nanolattices", Nature Materials, vol. 15, 2016, pp. 1-8.
Florijin et al., "Programmable Mechanical Metamaterials", Physical Review Letters, vol. 113, 2014, pp. 175503-1-175503-5.
Frenzel et al., "Tailored Buckling Microlattices as Reusable Light-Weight Shock Absorbers", Advanced Materials, 2016, pp. 1-6.
Wadley, Haydn N.G, "Multifunctional periodic cellular metals", Philosophical Transactions of the Royal Society of London A, vol. 364, 2006, pp. 31-68.
Rashed et al., "Metallic Microlattice Materials: A Current State of the Art on Manufacturing, Mechanical Properties and Applications", Materials & Design, vol. 95, 2016, 44 pages.
Wang et al., "Design of graded lattice structure with optimized mesostructures for additive manufacturing", Materials & Design, vol. 142, Mar. 15, 2018, pp. 1-26.
Shah et al., "Parametric study of development of Inconel-steel functionally graded materials by laser direct metal deposition", ScienceDirect, Materials & Design, vol. 54, 2014, pp. 531-538.
Ajdari et al., "Dynamic crushing and energy absorption of regular, irregular and functionally graded cellular structures", ScienceDirect, International Journal of Solids and Structures, vol. 48, 2011, pp. 506-516.
Wang et al., "Thermal shock resistance of functionally graded materials", ScienceDirect, Acta Materialia, vol. 52, No. 17, 2004, pp. 4961-4972.
Samadhiya et al., "Characterization of discretely graded materials using acoustic wave propagation", ScienceDirect, Computational Materials Science, vol. 37, 2006, pp. 20-28.
Rosen, David W., "Computer-Aided Design for Additive Manufacturing of Cellular Structures", Computer-Aided Design and Applications, vol. 4, No. 5, 2007, pp. 585-594.
Tamburrino et al., "The Design Process of Additively Manufactured Mesoscale Lattice Structures: A Review", Journal of Computing and Information Science in Engineering, vol. 18, Dec. 2018, 16 pages.
Vogiatzis et al., "Topology Optimization of Multi-Material Negative Poisson's Ratio Metamaterials Using a Reconciled Level Set Method", Computer-Aided Design, vol. 83, 2017, 33 pages.
Zhou et al., "Design of graded two-phase microstructures for tailored elasticity gradients", Journal of Materials Science, vol. 43, No. 15, 2008, pp. 5157-5167.
Radman et al., "Topology optimization of functionally graded cellular materials", Journal of Materials Science, vol. 48, 2013, pp. 1503-1510.
Svanberg, Krister, "The Method of Moving Asymptotes—A New Method for Structural Optimization", International Journal for Numerical Methods in Engineering, vol. 24, 1987, pp. 359-373.
Nocedal et al., "Numerical Optimization", Springer, 1999, 651 pages.
Verhoosel et al., "Image-based goal-oriented adaptive isogeometric analysis with application to the micro-mechanical modeling of trabecular bone", Computer Methods in Applied Mechanics and Engineering, vol. 284, Feb. 1, 2015, 45 pages.

(56) References Cited

OTHER PUBLICATIONS

Xie et al., "A Simple Evolutionary Procedure for Structural Optimization", Computers & Structures, vol. 49, No. 5, 1993, pp. 885-896.

\* cited by examiner

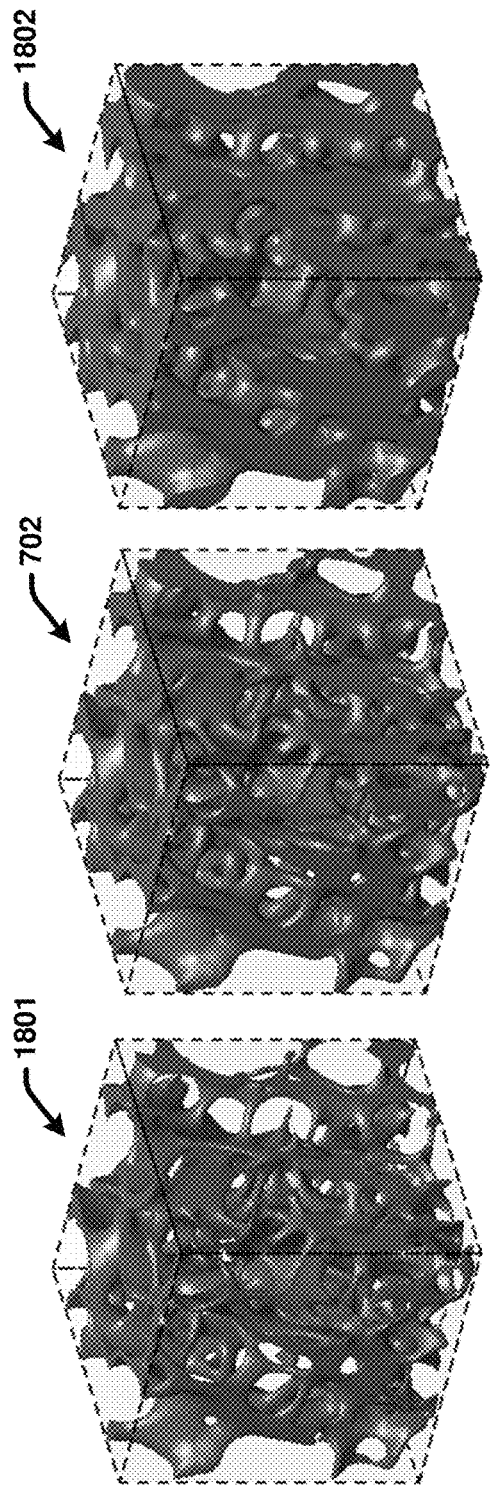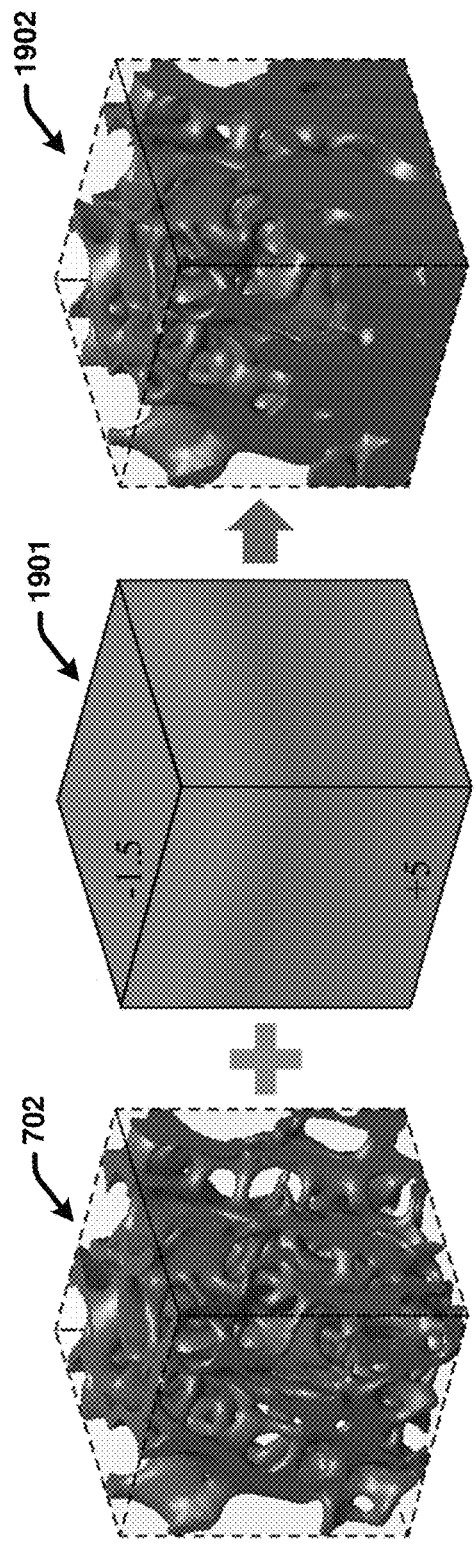
FIG. 18
FIG. 19

METHODS OF HIGH-DEFINITION CELLULAR LEVEL SET IN B-SPLINES FOR MODELING AND TOPOLOGY OPTIMIZATION OF THREE-DIMENSIONAL CELLULAR STRUCTURES

RELATED APPLICATION

This application claims priority to U.S. Provisional Patent Application No. 62/766,683 filed on Oct. 31, 2018 and entitled "METHODS OF HIGH-DEFINITION CELLULAR LEVEL SET IN B-SPLINES FOR MODELING AND OPTIMIZATION OF THREE DIMENSIONAL CELLULAR STRUCTURES." The entirety of the aforementioned application is incorporated by reference herein.

TECHNICAL FIELD

This application relates to computer-implemented techniques for modeling and topology optimization of three-dimensional cellular structures using the high-definition cellular level stet in B-Splines (HD-CLIBS) method.

BACKGROUND

Cellular materials and structures, also referred to as architecture materials or meta-materials, are defined as structures composed of downscale microstructures with geometric features that can span several dimensional orders from tens of nanometers to sub-millimeters. Cellular materials have great application potential in a variety of industries including aerospace, automobile, and medical industries, used as for instance, light-weight design structures, energy absorption structures, and implant scaffolds. For instance, the gradual variation in the composition of cellular materials can reduce the stress concentration effects near the interface between different phases and thus can be used to relieve the "stress shielding" phenomenon for orthopedic implants. A decreased density distribution of honeycomb cellular structures in the crushing direction can also be used to enhance the energy absorption at early crushing stages. Other applications can also be found in thermal insulation and acoustical wave attenuation.

By utilizing microstructures as the building blocks, cellular structural materials can be designed with extraordinary physical properties that were previously inaccessible, such as ultra-strong mechanical performance properties with relatively low densities. These microstructures can have complex internal configurations which can be designed to exhibit a much broader property range than their constituent materials. In addition, by tailoring the configurations in the microscale, remarkable multifunctional responses can also be achieved. With advancements in modern fabrication techniques, such as additive manufacturing and three-dimensional printing, fabrication of such cellular structures with complex and multiscale geometric features becomes possible and affordable, which also stimulates the research and development of the cellular structures.

However, cellular structures with highly tailored or extreme physical properties cannot be easily modeled and designed with existing computer-aided design (CAD) methods because the feature sizes of the cellular structures can span over several length scales. The most convenient approach in the computational design of cellular materials is to define the microstructures in the material with a periodic array of identical unit cells. The design problem thus is transformed into a topology optimization problem to optimize the material distribution within the design space of a single unit cell to achieve better structural performance. In the so-called inverse homogenization approach, the homogenization theory is applied to approximate the effective properties of the material.

While the topology optimization of periodic microstructures has been studied in depth and for a variety of physical properties, the greater potential is in optimized cellular materials and structures with spatially-varying microstructures and associated physical properties. When cellular structures are designed with spatially-varying microstructures, local requirements on material or structural properties can be best achieved and satisfied. Therefore, they are expected to have a better mechanical performance or multi-functionalities compared with the periodically repeated cellular structures. However, it is even harder to create cellular structures with variable microstructures since each microstructure may have its own configuration. In this regard, a key issue in topology optimization of cellular structures is the representation scheme for modeling variable microstructures while each microstructure could have its own configuration. A widely used method for realizing this purpose is to first characterize the microstructures via explicit parameters and then adjust the cellular structure by changing the microstructure parameters. For this method, the microstructural cells are defined prior to the structural design. In this regard, their topologies are fixed during the design, and no post-design operations can be applied to the cellular structure for customizing or optimizing the microstructures, which greatly limits the design flexibility. In addition, the parametric representation method cannot adequately model microstructures involving general types of internal features as well as their geometric variations. Therefore, the resulting cellular structures can have only limited gains in structural performance or in multi-functionalities.

Additionally, when designing cellular structures with spatially-variable microstructures, it is difficult while crucial to guarantee the geometric connectivity between adjacent cells. When simply using topology optimization to optimize each individual cell, the neighboring cells do not necessarily form an integral part, causing deterioration in physical properties. Any unconnected cells cannot bear external load and will cause fabrication difficulties in manufacturing. Existing works addressing this critical issue typically focus on pursuing geometric connectivity conditions on the adjacent microstructural cells, such as imposing geometric constraints, applying predetermined connectors, or employing sequential filtering. However, these piece-meal approaches essentially impose a severe design space restriction with a large set of geometric constraints, thus compromising the performance of the optimized design. Consequently, they substantially reduce the capability of the design optimization, if still considered as topology optimization, and they cannot be readily extended to three-dimensional cellular structures. Therefore, many newly designed artificial materials cannot be adopted as cellular structures, which limits gains in structural performance and functionality.

SUMMARY

The following presents a summary to provide a basic understanding of one or more embodiments of the invention. This summary is not intended to identify key or critical elements or delineate any scope of the different embodiments or any scope of the claims. Its sole purpose is to present concepts in a simplified form as a prelude to the more detailed description that is presented later.

In one or more embodiments described herein, systems, computer-implemented methods, apparatus and/or computer program products are described that provide a general geometric model for topology optimization of general solid and/or cellular structures with spatially-varying microstructures as well as optimized shape and topology in three-dimensions. This model naturally guarantees geometric connectivity with a defined level of smoothness at the boundaries between any neighboring microstructural cells. Using this model, the topology optimization process simultaneously optimizes the solid domain of the structure as well as the physical properties of all structural cells that comprise the cellular structure. This design model is referred to as a "high-definition cellular level set in B-Splines Splines," model, hereinafter "HD-CLIBS", (or simply CLIBS in short). This design model employs the basic concept of level set method, while its application is generalized onto a set of subdomain cells that partition the entire design domain for the structure under optimization, potentially leading to high-definition cellular/solid structures.

According to an embodiment, a system is provided that comprises at least one processor, and at least one memory that stores executable instructions that, when executed by the at least one processor, facilitate performance of operations, comprising receiving volumetric data defining a structure, and generating a three-dimensional model of the structure based on the volumetric data. In this regard, the generating comprises partitioning a global design domain for the structure into subdomain cells in three-dimensions, defining cellular level set functions for respective subdomain cells of the subdomain cells, and defining parameters of the cellular level set functions using B-spline basis functions for the respective subdomain cells.

In implementations, the generating further comprises initializing the cellular level set functions using a fast B-spline interpolation method or a fast discrete B-spline convolution method to determine B-spline coefficients for the B-spline basis functions based on the volumetric data, resulting in initialized cellular level set functions. With these implementations, the generating further comprises assembling the initialized cellular level set functions into a global level set function for the structure, and reconstructing the volumetric data based on the global level set function, resulting in a transformation of the volumetric data into the three-dimensional model. In another implementation, the generating comprises determining B-spline coefficients for the B-spline basis functions based on the volumetric data using a fast B-spline interpolation method or a fast discrete B-spline convolution method, resulting in defining internal geometric properties of the subdomain cells, determining values of the cellular level set functions using the B-spline coefficients, resulting in defining level set representations of the subdomain cells, and assembling the level set representations in accordance with a global level set function for the structures, resulting in a transformation of the volumetric data into the three-dimensional model.

In some embodiments, the generating further comprises, for the respective subdomain cells, defining a rectilinear grid with regular spacing in respective directions of the three-dimensions, locating knot vectors of the B-spline basis functions on the rectilinear grid, and setting first and last knots in the respective directions to be fully repeated with highest multiplicity.

In some implementations, the three-dimensional model comprises a first high-definition cellular level set in B-splines (HD-CLIBS) model, and the operations further comprise connecting the first HD-CLIBS model with a second HD-CLIBS model, constraining boundary B-spline coefficients associated with boundary faces between neighboring subdomain cells of the first HD-CLIBS model and the second HD-CLIBS model to achieve a defined order differentiable of continuity between the first HD-CLIBS model and the second HD-CLIBS model. The operations can further comprise dividing a subdomain cell of the subdomain cells into two or more cells by inserting a repeating knot into a knot sequence of a B-spline basis function of the B-spline basis functions defined for the subdomain cell.

In one or more embodiments, the operations further comprise controlling properties of the three-dimensional model by adjusting B-spline coefficients and/or knot vectors of the B-spline basis functions. In this regard, the operations can further comprise adjusting geometric properties of the three-dimensional model by adjusting B-spline coefficients of the B-spline basis functions. For example, the adjusting can comprise independently adjusting geometric properties of the subdomain cells by independently adjusting subsets of B-spline coefficients respectively associated with the subdomain cells. The adjusting can also comprise performing adjustment operations comprising dilation, erosion, grading, and blending operations.

In various embodiments, the operations further comprise optimizing a topology of the three-dimensional model in accordance with a defined optimization function by independently adjusting the B-spline coefficients for the respective subdomain cells using as a sequence of discrete convolution operations. With these embodiments, the optimizing comprises determining a solution to the optimization function without applying the Hamilton-Jacobi equation or a linear system with an interpolation matrix. In some implementations, the optimizing comprises applying a re-normalization scheme to bound a gradient norm of the cellular level set functions by a defined value.

In some embodiments, elements described in the disclosed systems can be embodied in different forms such as a computer-implemented method, a computer program product, or another form.

DESCRIPTION OF THE DRAWINGS

FIG. 18 illustrates the erosion and dilation operations for manipulating cellular structures modeled as HD-CLIBS models in accordance with one or more embodiments of the disclosed subject matter.

FIG. 19 illustrates the grading function for manipulating cellular structures modeled as HD-CLIBS models in accordance with one or more embodiments of the disclosed subject matter.

DETAILED DESCRIPTION

Figure 1:
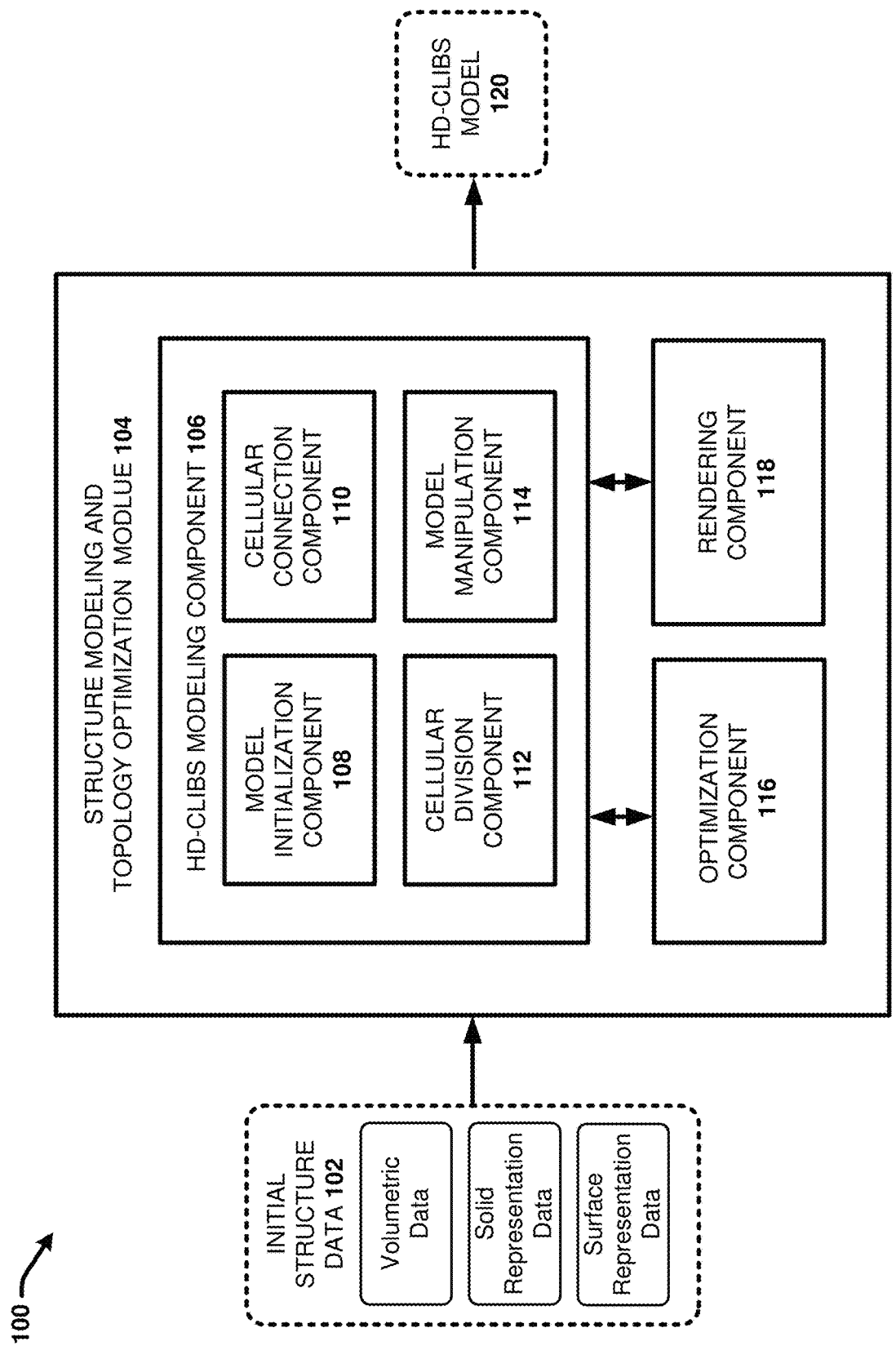
FIG. 1 illustrates a block diagram of an example, non-limiting system for modeling and topology optimization of three-dimensional cellular structures using the high definition cellular level stet in B-Splines (HD-CLIBS) method in accordance with one or more embodiments of the disclosed subject matter.

The following detailed description is merely illustrative and is not intended to limit embodiments and/or application or uses of embodiments. Furthermore, there is no intention to be bound by any expressed or implied information presented in the preceding Summary section or in the Detailed Description section.

The disclosed subject matter is directed to systems, computer-implemented methods, apparatus and/or computer program products are described for modeling and optimizing high definition structures, including cellular and solid structures, using a type of level set modeling technique referred to as cellular level set in B-splines (CLIBS), or high definition cellular level set in B-splines (HD-CLIBS). This modeling technique results in a general geometric model for topology optimization of solid and/or cellular structures with spatially-varying microstructures and provides for efficiently and effectively optimizing the shape and topology of solid and/or cellular structures in three dimensions.

With the subject HD-CLIBS modeling technique, the entire design domain for the solid/cellular structure in question is first subdivided into a set of connected volumetric cells in three dimensions. The resolution of the volumetric cells can be determined adaptively or in relation to the scale and size in the anticipated structural features, potentially leading to high definition with large scale data and computation. On each subdomain cell, a level set function is defined respectively, such that the entire set of the level set functions comprise the global level set function over the entire global domain. These level set functions defined for the respective subdomain cells are thus referred to herein as "cellular level set functions.". This contrasts with the conventional level set method, where a single, global level set function captures the interior and the boundary of the whole structure.

In addition, on each subdomain cell, an implicit B-spline function is employed to define the cellular level set function for representing the structural material domain of the cell. Benefiting from the intrinsic properties of the implicit B-splines, this parametric representation offers several useful properties and powerful functionalities to build and modify a solid/cellular structure in the modeling process and to conduct topology optimization. These processes are directly dealt with in terms of the B-spline coefficients with great numerical efficiency. For example, in one or more embodiments, a fast interpolation technology is used to initialize the implicit B-Spline based level set functions to generate an initial geometric model of a structure with negligible computational cost. Connection and division operations can then be used to adjust the discretization layout and hierarchy of the initial structure. A series of additional adjustment operations, including erosion, dilation, grading and blending functions are further provided to modify the modeled structure in an easy and intuitive way.

More importantly, by employing a parameterization scheme that defines implicit B-spline basis functions for each subdomain cell, constraints on the relevant B-spline coefficients can be imposed to naturally maintain geometric continuities at the connection faces between neighboring cells during adjustment operations (e.g., when dividing the structure, combining structures, eroding the structure, dilating the structure, blending the structure, and other structural manipulations). In this regard, by defining compatibility constraints on the parametric coefficients of the B-spline basis functions of the neighboring cells, their geometric connectivity up to a specified order of smoothness can be controlled, for example, with a defined differentiable C orerd (e.g., a zero-order differentiable $C^0$, a first-order differentiable $C^1$ a second-order differentiable $C^2$, etc.).

The disclosed subject matter further provides enhanced topology optimization techniques for cellular structures modeled using the HD-CLIBS method based on optimization of the B-spline coefficients. In this regard, while the model construction can be carried out with the fast B-spline interpolation, the topology optimization involves a sequence of discrete B-spline convolutions. In one or more embodiments, the optimization process involves conducting adjoint sensitivity analysis, deriving the shape derivative, and employing the steepest descent algorithm to update the coefficients. In particular, based on the shape derivatives, the steepest descent scheme is readily devised for updating the B-spline coefficients and for evolving the level set functions of all cells and optimizing the physical properties of all cells as well as the global structure according to the design objective and specified constraints. During the optimization, several manipulations on the coefficients can be applied to generate different types of structures, including single scale structures, periodic cellular structures, and layered cellular structures. By virtue of implicit B-splines, the updating of the optimization variables in terms of the B-spline coefficients can be carried out recursively, without involving solution for a linear algebraic system. Thus, the resulting optimization process is substantially efficient, scalable, and readily implemented on large-scale parallel computing platforms.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details. The proposed modeling and optimization techniques are highly scalable and provide for high definition modeling and optimization applications on large-scale computing platforms.

Turning now to the drawings, FIG. 1 illustrates a block diagram of an example, non-limiting system 100 for modeling and topology optimization of three-dimensional cellular structures using the HD-CLIBS method in accordance with one or more embodiments of the disclosed subject matter. Embodiments of systems described herein can include one or more machine-executable components embodied within one or more machines (e.g., embodied in one or more computer-readable storage media associated with one or more machines). Such components, when executed by the one or more machines (e.g., processors, computers, computing devices, virtual machines, etc.) can cause the one or more machines to perform the operations described.

For example, system 100 includes a structure modeling and topology optimization module 104 that can be and include one or more computer/machine executable components. In the embodiment shown, the structure modeling and topology optimization module 104 includes several computer/machine executable components, including a HD-CLIBS modeling component 106, an optimization component 116 and a rendering component 118. These computer/machine executable components (and other described herein) can be stored in memory (not shown) associated with the one or more machines (not shown). The memory can further be operatively coupled to at least one processor (not shown), such that the components (e.g., the structure modeling and topology optimization module 104 itself, the HD-CLIBS modeling component 106, the optimization component 116, the rendering component 118, and other components described herein), can be executed by the at least one processor to perform the operations described. Examples of said and memory and processor as well as other suitable computer or computing-based elements, can be found with reference to FIG. 32, and can be used in connection with implementing one or more of the systems or components shown and described in connection with FIG. 1 or other figures disclosed herein.

In various embodiments, based on initial structure data 102 for a structure (e.g., volumetric data, solid representation data, surface representation data, or the like), the HD-CLIBS modeling component 106 can generate a geometric model (e.g., a HD-CLIBS model 120) of the structure in accordance with the disclosed HD-CLIBS (or CLIBS)

method or modeling scheme. For example, the geometric model can include a graphical geometric model of an object or structure that can be visually rendered with via a display (e.g., using the techniques described herein), stored in memory, manufactured, printed (e.g., using three-dimensional printing technology), or the like. The HD-CLIBS modeling component 106 (and the optimization component 116) can also provide various interactive computer graphics tools for designing, modifying and optimizing geometric structures generated based on the HD-CLIBS modeling scheme. The HD-CLIBs modeling technique can be used to generate both two-dimensional and three-dimensional models of solid structures and cellular structures. In various embodiments, the disclosed HD-CLIBS modeling technique is particularly applied to generate high-definition three-dimensional representations of cellular structures with spatially varying microstructures. A geometric model or representation generated, designed or otherwise designed in accordance with the HD-CLIBS (or CLIBS) method/scheme described herein is referred to hereafter as an HD-CLIBS model (or simply a CLIBS model).

In this regard, the subject HD-CLIBS method for representing/modeling the geometric properties of a structure is based on the concept of the level set method for shape and topology optimization. In the level set method, the structural interfaces are implicitly expressed by the zero level of a higher-dimensional level set function, which naturally accommodates topology changes in the material domains by dynamic changes in the level set function.

Figure 2:
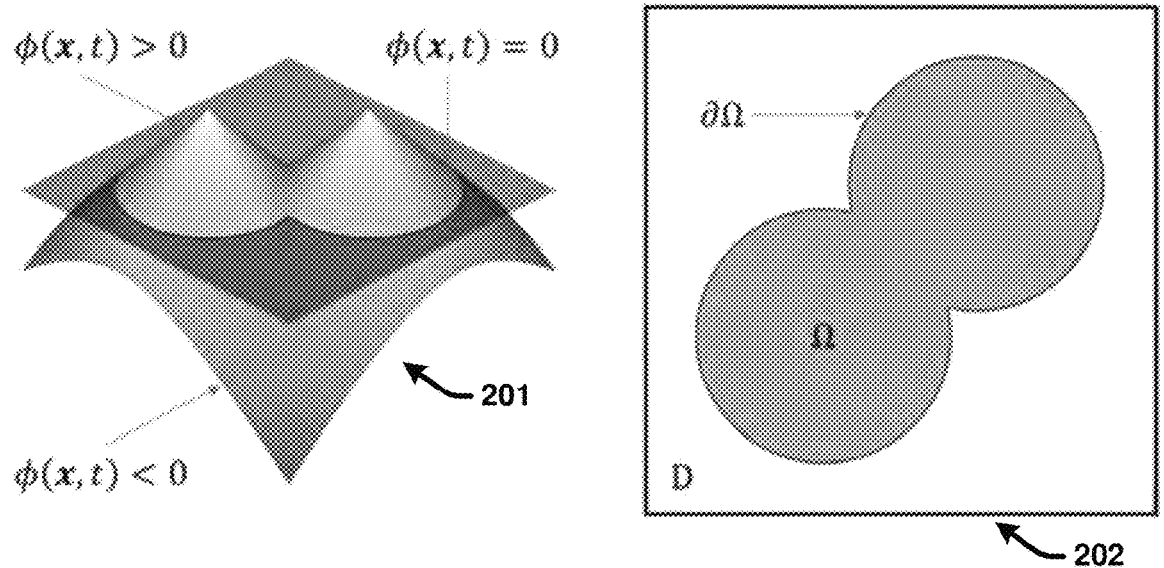
FIG. 2 illustrates the classical level set representation method in accordance with one or more embodiments of the disclosed subject matter.

FIG. 2 illustrates the classical level set representation method in accordance with one or more embodiments of the disclosed subject matter. In this regard, FIG. 2 presents a three-dimensional representation (e.g., part 201) of a two-dimensional structure with a single global level set function in the form of a signed distance function. In accordance with the classical level set representation method, the three-dimensional structure of part 202 is implicitly represented by the global level set function of part 201. In this regard, the general three-dimensional structure of an object (e.g., part 201) is represented by a single global level set function, where the geometrical model of the structure is captured implicitly by Equation 1:

$$\begin{cases} \phi(x, t) > 0 & \forall x \in \Omega \backslash \partial \Omega \\ \phi(x, t) = 0 & \forall x \in \partial \Omega \\ \phi(x, t) < 0 & \forall x \in D \backslash \Omega \end{cases} \qquad \text{Equation 1}$$

where $x=\{x, y, z\} \in R^3$ represents the coordinates of a point within the design domain D; t denotes the pseudo-time for evolution of the level set function; $\partial \Omega$ represents the boundary of the structure; $\Omega$ denotes the structure's material domain, respectively.

By using the global level set function of Equation 1, the evolution of the structural boundary is transformed into an updating of the zero curve (for a two-dimensional structure) or surface (for three-dimensional structure) of the level set function implicitly. In the conventional level set method, the evolution of the level set function is achieved by solving the following Hamilton-Jacobi partial differential equation (Equation 2 below) as follows:

$$\frac{\partial \phi}{\partial t} - V^n |\nabla \phi| = 0, \; V^n = V \cdot \left(-\frac{\nabla \phi}{|\nabla \phi|}\right), \qquad \text{Equation 2}$$

where V=dx/dt and $V^n$ is the normal velocity representing the level set dynamic evolution. The signed distance function is the most commonly used function for the level set function $\phi$, which is differentiable almost everywhere and its gradient satisfies the eikonal equation. Efficient algorithms for calculating the signed distance function include the fast-marching method and the narrow band method, constructing the single function over the entire design domain D.

The subject HD-CLIBS modeling technique introduces a new adaptation of the classical level set method referred to herein as the cellular level set representation method. In contrast to the conventional level set mode using a single global level set function $\phi$ shown in FIG. 2, in accordance with the cellular level set representation method, the entire design domain D and the global structural domain are partitioned into a set of two or more connected subdomain cells in three dimensions. On each subdomain cell, a separate level set function is defined respectively, such that the entire set of the level set functions comprises the global level set function over the entire global domain.

Figure 3:
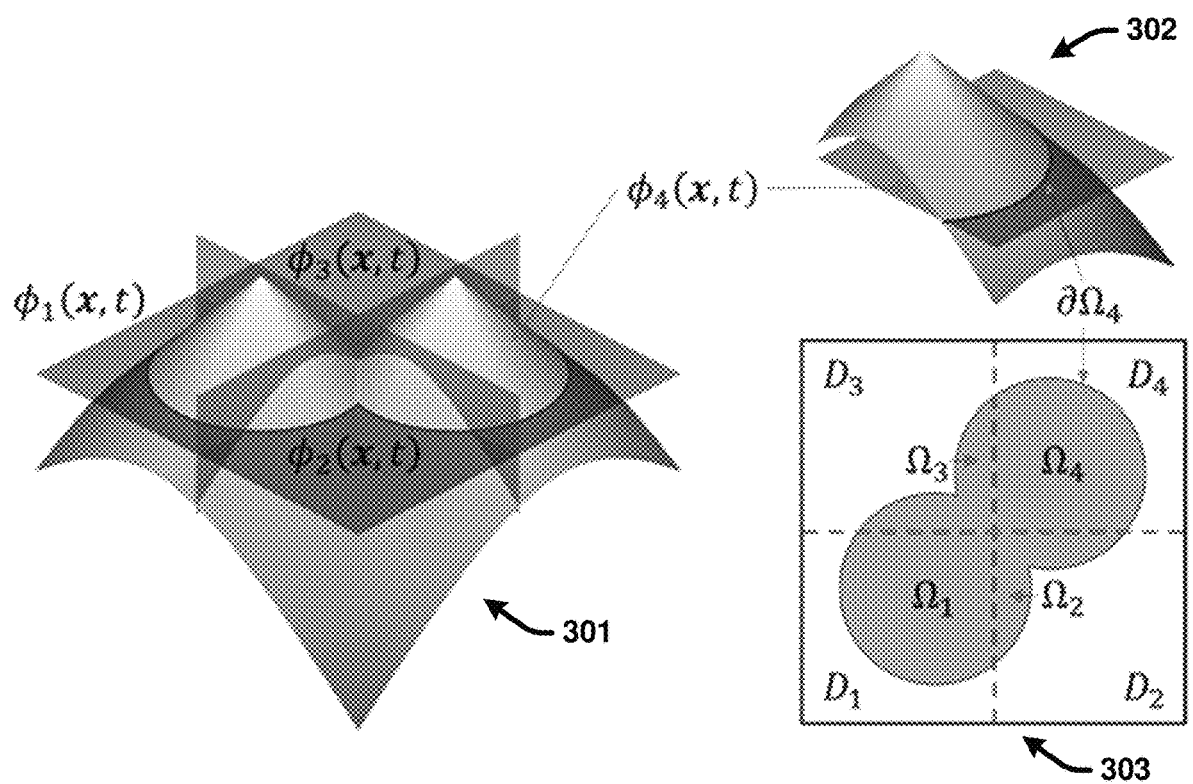
FIG. 3 illustrates the cellular level set representation method in accordance with one or more embodiments of the disclosed subject matter.

In this regard, in one or more embodiments, in association with generating an HD-CLIBS model in accordance with the HD-CLIBS method, the HD-CLIBS modeling component 106 can apply the cellular level set representation method by initially partitioning the global design domain D and the global structural domain $\Omega$ into M subdomain cells $D_s$ and microstructures $\Omega_s$ (s=1, . . . , M), respectively, in accordance with Equation 3 as follows:

$$D = \bigcup_{s=1}^{M} D_s, \; \Omega = \bigcup_{s=1}^{M} \Omega_s \cup \partial \Omega_s, \qquad \text{Equation 3}$$

where $\partial \Omega_s$ are the boundaries of the microstructures. On each of the open and bounded subdomain cell $D_s$, as illustrated in FIG. 3, a level set function $\phi_s$ is defined to represent the microstructure within the cell, in accordance with Equation 4:

$$\begin{cases} \phi_s(x, t) > 0 & \forall x \in \Omega_s \backslash \partial \Omega_s \\ \phi_s(x, t) = 0 & \forall x \in \partial \Omega_s \\ \phi_s(x, t) < 0 & \forall x \in D_s \backslash \Omega_s \end{cases} \qquad \text{Equation 4}$$

According to the level set concept, the subdomain level set function $\phi_s$ could be dynamically evolved on its subdomain cell $D_s$ with the governing Hamilton-Jacobi (H-J) Equation 5 below:

$$\frac{\partial \phi_s(x, t)}{\partial t} - V_s^n(x, t) |\nabla \phi_s(x, t)| = 0, \qquad \text{Equation 5}$$

where $V_s^n$ is the outward-normal velocity field of the subdomain level set function $\phi_s$. Therefore, the total set of the subdomain level set functions comprise the global level set function over the entire global domain D. These level set functions $\phi_s$ on subdomain cells are referred to hereinafter as cellular level set functions. With this design domain discretization, the feature size of the subdomain cell can be refined to an ultra-fine scale, thus producing designs with high definition and extraordinary details.

Figure 4:
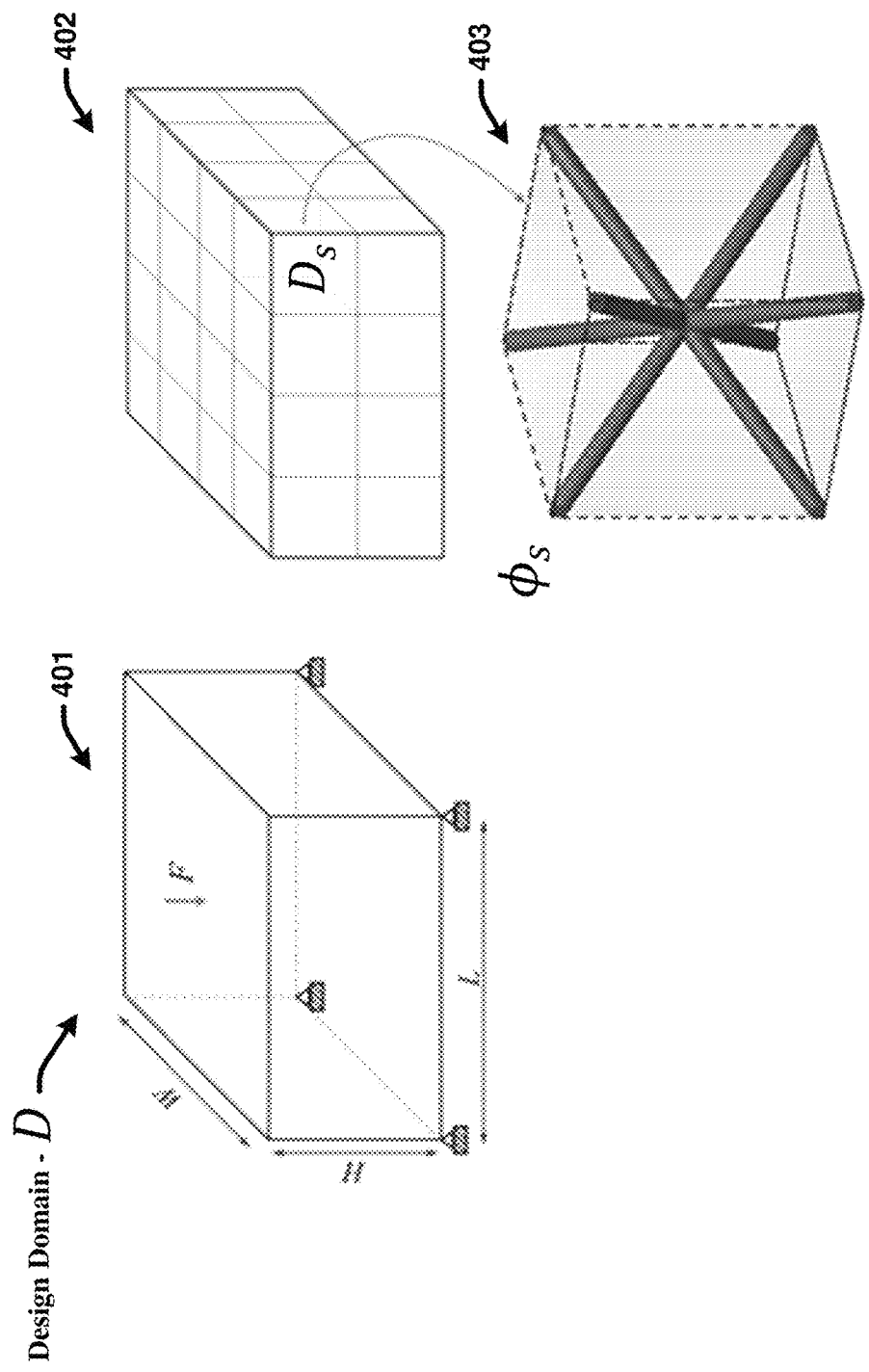
FIG. 4 illustrates an example of the loading and boundary conditions for the cellular structure design and the discretization of the design domain into cells in accordance with one or more embodiments of the disclosed subject matter.

FIG. 3 illustrates the cellular level set representation method in accordance with one or more embodiments of the disclosed subject matter. With reference to FIGS. 2 and 3, in accordance with the cellular level set representation method, the global level set function ϕ of part 201 becomes an assembly of subdomain level set functions ϕ$_1$, ϕ$_2$, ϕ$_3$, ϕ$_4$, and the global structure part 301 is an assembly of the subdomain structures 302. In this regard, FIG. 3 presents a cellular level set representation on subdomain cells for representing the global structure 303, wherein part 301 depicts the assembled level set function, part 302 depicts one subdomain level set function, and part 303 depicts the structure as represented by the CLIBS model FIG. 4 presents a high-level flow diagram 400 illustrating the overall discretization scheme of the subject HD-CLIBS modeling technique as applied to three-dimensional structures in accordance with the one or more embodiments described herein. As shown in FIG. 4, first the entire design domain D 401 is discretized into multiple subdomain cells D$_s$ 402 of a defined volumetric resolution (e.g., number and size). The resolution of the volumetric cells can be determined adaptively or in relation to the scale and size in the anticipated structural features. A separate cellular level set function ϕ$_s$ is further defined to represent the microstructure within each subdomain cell 403.

With the classical level set method with a single global function ϕ, encounter many issues associated solving the Hamilton-Jacobi equation with a discrete scheme, including issues with re-initialization, velocity extension, and satisfying the Courant-Friedrichs-Lewy (CFL) condition for numerical stability. In addition, existing parametrization schemes for the global level set function ϕ require contracting dense or modest-sparse global interpolation matrices on the entire design domain. Therefore, techniques that involve parameterization of a single global level set function ϕ result in high computation costs when calculating the dynamic changes in shape and topology optimization. Benefiting from the intrinsic properties of the implicit B-Splines, by defining implicit B-spline function for each of the cellular level set functions ϕ$_s$, this parametric representation shows much greater flexibility in modeling solid and/or cellular structures and in providing functionalities for designing and optimization of the solid and/or cellular structures with low computational costs.

To further improve upon the deficiencies of the classic level set modeling technique, in addition to partitioning the entire design domain D of the global structure under optimization is into a set of subdomain cells D$_s$ in three dimensions and defining a cellular level set function ϕ$_s$ for each subdomain cell (e.g., such that the entire set of the level set functions comprise the global level set function over the entire global domain), the subject HD-CLIBS modeling technique further uses an implicit B-spline function for the cellular level set function ϕ$_s$ for each subdomain cell for representing the structural material domain of the subdomain cells.

In various embodiments, the implicit B-spline function used for each cellular level set function ϕ$_s$, is expressed as the linear combination of B-spline basis functions for the respective model dimensions. In this regard, for the general three-dimensional model, the tensor-product B-spline function, of degree p in x direction, degree q in y direction, and degree r in z direction, is a trivariate piecewise polynomial function of the form of Equation 6 as follows:

$$\phi_s(x, t) = \sum_{i=0}^{n} \sum_{j=0}^{m} \sum_{k=0}^{l} c_{i,j,k}^s(t) N_{i,j,k}^s(x), \quad \text{Equation 6}$$

wherein $c_{i,j,k}^s(t)$ form an array of $(n+1) \times (m+1) \times (l+1)$ B-spline coefficients for the level set function, and wherein $N_{i,j,k}^s(x)$ is the trivariate B-spline function in the form of tensor-product of Equation 7, $$N_{i,j,k}^s(x) = B_{i,p}^s(x) B_{j,q}^s(y) B_{k,r}^s(z) \quad \text{Equation 7,}$$

while $B_{i,p}^s(x)$, $B_{j,q}^s(y)$ and $B_{k,r}^s(z)$ are the B-spline basis functions defined on the knot vectors in x, y, and z directions, respectively.

The knot vectors of the B-splines are located on a grid spanning the fixed subdomain cell D$_s$, with a regular spacing h in each of the three directions respectively. Thus, the cellular level set function ϕ$_s$ is parameterized with the coefficients $c_{i,j,k}^s$ as the parameters, while its boundary is delineated by the level set equation on the subdomain cell in accordance with Equation 8 below:

$$\phi_s(x, t) = \sum_{i=0}^{n} \sum_{j=0}^{m} \sum_{k=0}^{l} c_{i,j,k}^s(t) B_{i,p}^s(x) B_{j,q}^s(y) B_{k,r}^s(z) = 0, \quad \text{Equation 8}$$

for $x \in \Gamma_s = \partial \Omega_s, s = 1, \ldots, M$.

The implicit trivariate B-spline model is general, as the coefficients $c_{i,j,k}^s$ define the variables for parametric modelling and design on the subdomain cells. In various embodiments, although these coefficients are not customarily associated with any spatial coordinates of the grid, they can be reviewed as control parameters for ϕ$_s$ at the so-called Greville abscissae control points.

The implicit B-spline basis functions have been noted for several attractive properties, including compact local support and a tight bound on its gradient norm. In the field of image processing, implicit B-spline basis functions have been used as image models for segmentation and registration due to their intrinsic properties. For instance, a fast B-spline interpolation formulation has been developed for efficient surface reconstructions from volumetric data. Furthermore, the B-spline basis functions are locally supported, and the support domain can be adjusted by knot manipulations. Therefore, user interactions are easily accommodated for controlling properties of the reconstructed surfaces such as local smoothness.

For example, without loss of generality, a univariate B-spline function of degree p in x direction within a one-dimension unit cell is expressed as follows, $$\phi(x) = \sum_{i=0}^{n} B_{i,p}(x) c_i, \quad \text{Equation 9}$$

wherein $c_i$ is the B-spline coefficient and the basis function $B_{i,p}(x)$ can be formed recursively as follows:

$$B_{i,0}(x) = \begin{cases} 1 & x \in [x_i, x_{i+1}) \\ 0 & \text{eise} \end{cases}, \text{ and} \quad \text{Equation 10}$$

-continued $$B_{i,p}(x) = \frac{x - x_i}{x_{i+p} - x_i} B_{i,p-1}(x) + \frac{x_{i+p+1} - x}{x_{i+p+1} - x_{i+1}} B_{i+1,p-1}(x),$$ Equation 11 and
wherein $x_i$ is the i-th value of a knot sequence X={$x_0$, $x_1$, $x_2$, . . . , $x_N$}.

If a knot value is unique, it is a simple knot. When only simple knots are used, all the basis functions will share the same shape. When a knot value is repeated by S times, it is a repeated knot with multiplicity S. For example, a knot sequence for S=3 is $x_0$=$x_1$=$x_2$=0. Further, the multiplicity cannot be higher than p+1 and N=n+p+1. All these properties are generalized to the trivariate B-spline basis function $N_{i,j,k}(x)$, owing to the tensor product in the three-dimensional case of Equation 7.

With reference again to FIG. 1, in the embodiment shown, the HD-CLIBS modeling component 106 includes model initialization component 108, cellular connection component 110, cellular division component 112 and model manipulation component 114 to provide various features and functionalities associated with designing, generating, modifying and optimizing geometric models of solid and cellular structures in accordance with the HD-CLIBS modeling method/scheme described above.

In one or more embodiments, the model initialization component 108 can generate an initial HD-CLIBS model of a structure based on initial structure data 102 for the structure (e.g., volumetric data, solid representation data, surface representation data, or the like) in accordance with the HD-CLIBS modeling method described above. At a high level, the initial construction of a three-dimensional HD-CLIBS model based on the initial structure data 102 involves partitioning the global design domain D for the three-dimensional structure to be generated based on the initial structure data 102 into subdomain cells $D_s$ and subdividing the global level set function φ for the three-dimensional structure into cellular level set functions for each of the subdomain cells $φ_s$, and determining the B-Spline coefficients for the respective B-spline basis functions used for the cellular level set functions. In this regard, the model initialization component 108 can define the subdomain cells and initialize the level set function φ for the model by determining the trivariate B-spline coefficients for each subdomain cell.

In various embodiments, the model initialization component 108 can apply predefined and/or default boundary conditions for the cellular structure design and the discretization of the design space to facilitate determining/defining of the subdomain cells (e.g., that controls the number and dimensions of the cells). In one or more embodiments, the modeling/design constraints for the HD-CLIBS model can be based on a rectangular grid. For example, as shown in FIG. 4, the global design domain D can comprise a rectangular grid that can be subdivided into discrete cells of equal dimensions in accordance with a defined volume ratio, (m)×(p)×(n), which is 2×4×4 in the embodiment shown. It should be appreciated that the discretization scheme can vary such that the respective cells have the same dimensions. Thus in various embodiments, the model initialization component 108 can generate the disclosed HD-CLIBS models based on a design domain that comprises a defined rectilinear grid spanning the fixed subdomain spanning the fixed $D_s$ further span within the rectangular grid with a regular spacing h in each of the three directions respectively and the knot vectors of the B-splines are located on the grid. In some embodiments, at the first and the last knots in each direction, the knots are set to be fully repeated with the highest multiplicity respectively, for example, p+1 in x direction. This specification in multiplicity of knots provides for maintaining connectivity between the cellular level set functions of the two neighboring cells at their common face, thus guaranteeing a required geometric smoothness in the cellular structures between the adjacent cells.

The mechanism applied by the model initialization component 108 for generating the initial HD-CLIBS model can vary based on the type of the initial structure data 102. In one or more embodiments, if the initial structure data 102 comprises volumetric data, such as computed tomography (CT) scan data, point cloud data, or other image data that has been defined using a volumetric representation, the model-initialization component 108 can compute the HD-CLIBS model of the structure by partitioning the volumetric data into subdomain cells in accordance with the defined/default boundary/discretization constraints, determining the B-spline coefficients in each subdomain cell, determining the values/shapes of the subdomain level set functions $φ_s$ for each subdomain cell, and building the model by assembling the values/shapes of subdomain level set functions $φ_s$. Into the global level set function φ. This is essentially a problem of model reconstruction. In this regard, if initial structure data 102 comprises volume data, the model initialization component 108 can generate the initial construction of the HD-CLIBS model using the input volume data essentially by transforming the volumetric data in its input format (e.g., a point cloud or the like), into the format defined for the subject HD-CLIBS model.

In other implementations, in which the initial structure data 102 comprises a solid or surface representation (e.g., a CAD model) of the structure to be modeled, the model initialization component 108 can first build the signed distance function for the model, as in the case of traditional level set representation shown in FIG. 2. The model initialization component 108 can then perform a discretization of the signed distance function to generate a discrete volumetric data corresponding to the initial structure data 102. The model initialization component 108 can then process the discrete volumetric data in accordance with the techniques for processing volumetric input data described above to generate the initial HD-CLIBS model.

In various embodiments, the model initialization component 108 can employ a fast-interpolation method to determine the B-Spline coefficients for each subdomain cell. For example, in some embodiments, for trivariate B-splines up to a threshold cubic degree, (e.g., p=3), the model initialization component 108 can employ a fast B-spline interpolation function to determine the B-spline coefficients. The fast B-spline interpolation function can also be extended to cases including repeated knots. For B-splines of higher orders (e.g., relative to a defined threshold order), the model initialization component 108 can determine the B-spline coefficients using a fast-discrete B-spline convolution function. Moreover, since the trivariate B-spline basis functions are tensor products for the three dimensions, this convolution can be performed as a sequence of simple one-dimension convolutions. Therefore, this construction process is computationally efficient, particularly in comparison to any $L^2$-projection or collocation methods.

Figure 5:
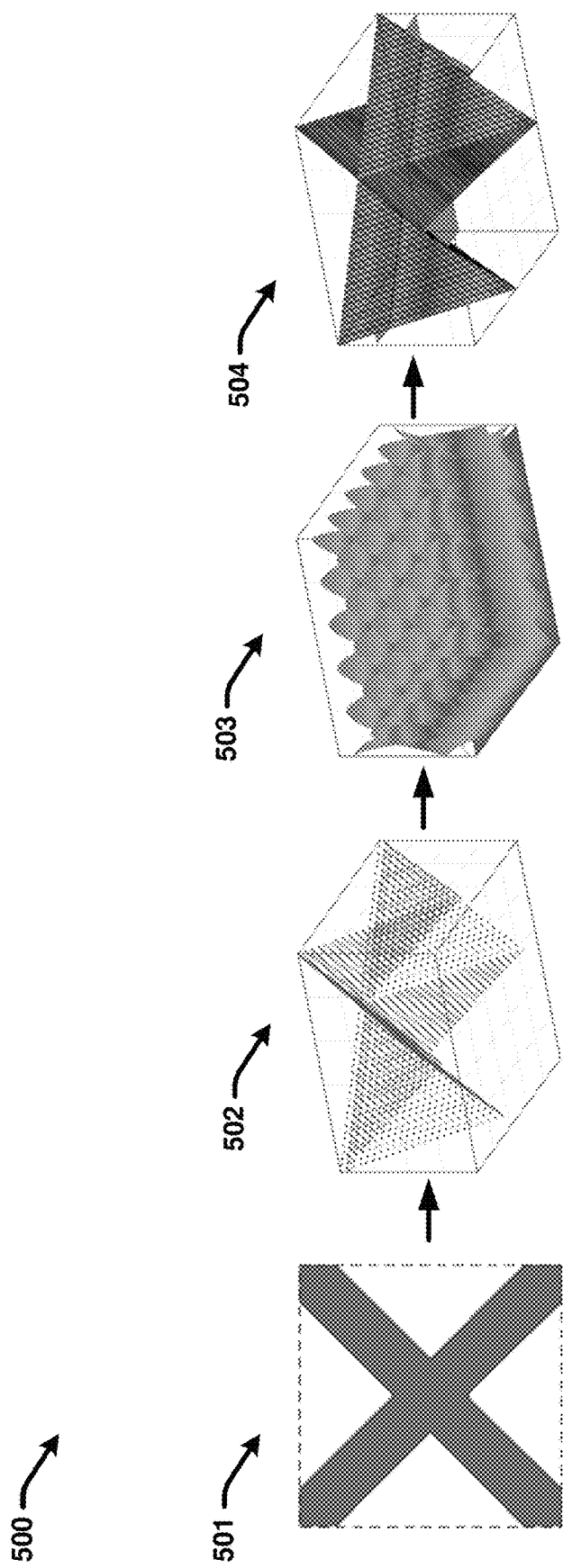
FIG. 5 illustrates a flow diagram of an example implementation of the model initialization process in which the initial structure data comprises a CAD model in accordance with one or more embodiments of the disclosed subject matter.

FIG. 5 illustrates a flow diagram of an example implementation of the model initialization process 500 in which the initial structure data 102 comprises a CAD model in accordance with one or more embodiments of the disclosed subject matter. First, with a given CAD model 501 and a defined boundary/discretization scheme for the target structure, the model initialization component 108 can calculate the signed distance values with a uniform Euler mesh. Part 502 illustrates the extracted samples of the corresponding signed distance function. On the same mesh, the model initialization component 108 can further build the B-spline basis functions supported by repeated knots and calculate their coefficients using fast B-spline interpolation, resulting in an implicit B-spline function 503 that interpolates the signed distance field. The model initialization component 108 can then assemble the B-spline basis functions to reconstruct/initialize the global level set function for the model to generate the initial HD-CLIBS model 504 for the structure.

Figure 6:
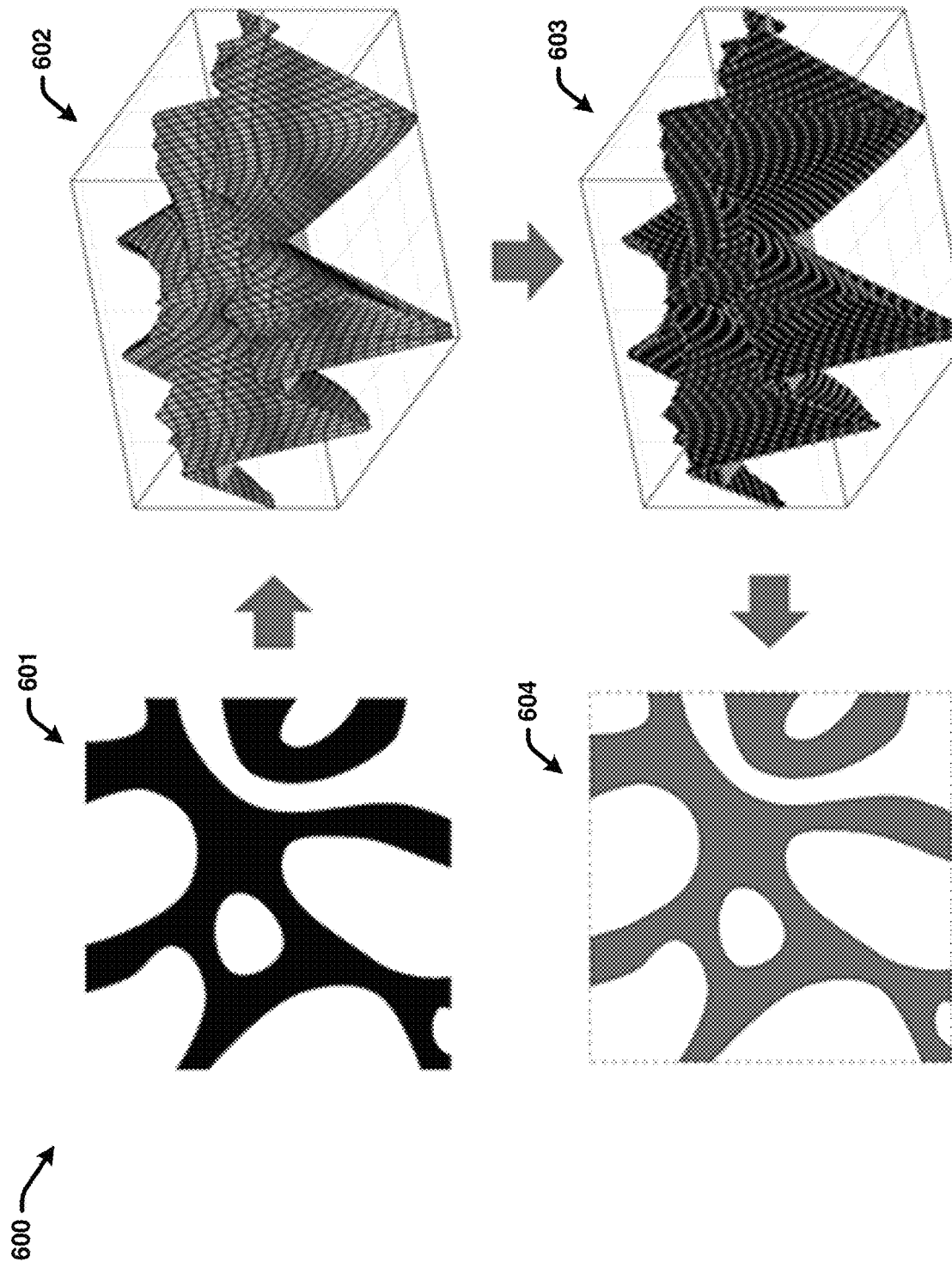
FIG. 6 illustrates a flow diagram of an example implementation of the model initialization process in which the initial structure data comprises two-dimensional image data in accordance with one or more embodiments of the disclosed subject matter.

FIG. 6 illustrates a flow diagram of an example implementation of the model initialization process 600 in which the initial structure data 102 comprises two-dimensional image data in accordance with one or more embodiments of the disclosed subject matter. In this example implementation, a two-dimensional HD-CLIBS model 604 is generated (e.g., using a two-dimensional fast B-spline interpolation). In the embodiment shown, the initial structure data comprises a binary image 601 originally representing a bone sample obtained by CT scanning. In accordance with this example implementation, using a defined a defined boundary and discretization scheme for the target structure (which in this example is 50×50 samples) the model initialization component 108 can build a signed distance function for the model using a uniform Euler mesh. Using the same mesh, the model initialization component 108 can build the B-spline basis functions supported by repeated knots and calculate the B-spline coefficients using fast B-spline interpolation to generate the interpolated structure 603. At last, and the bone geometry is reproduced from the interpolated structure 603 as its zero-level set to generate the two-dimensional HD-CLIBS model 604.

Figure 7:
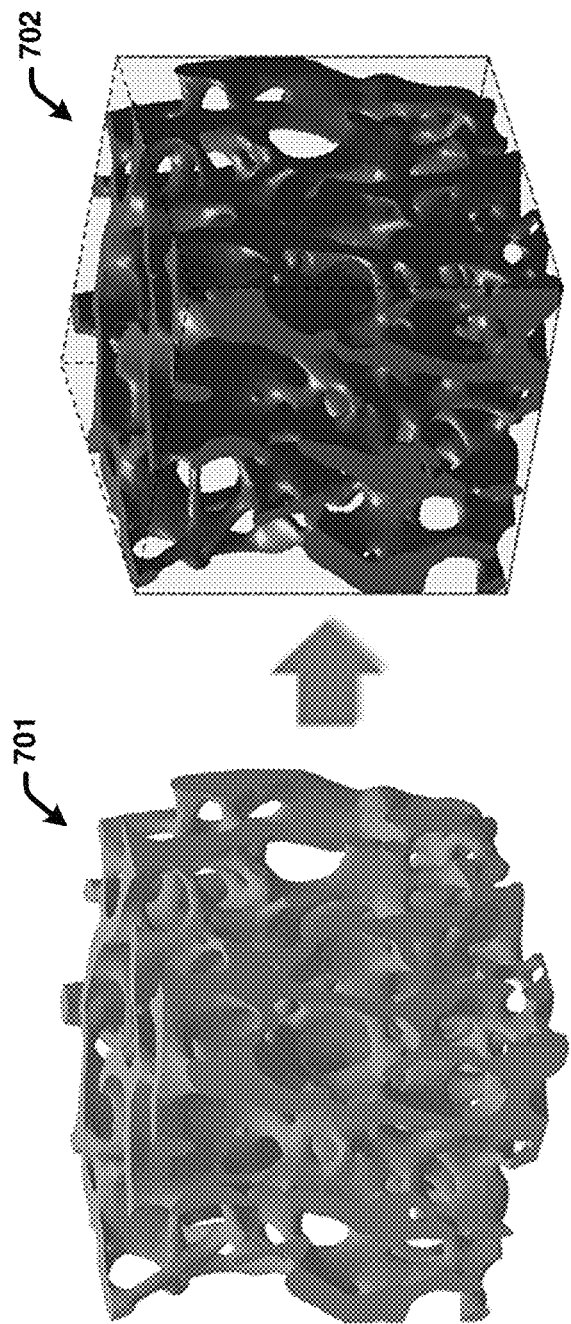
FIG. 7 illustrates two additional example implementations of the model initialization process in which the initial structure data comprises volumetric data in accordance with one or more embodiments of the disclosed subject matter.
Figure 7:
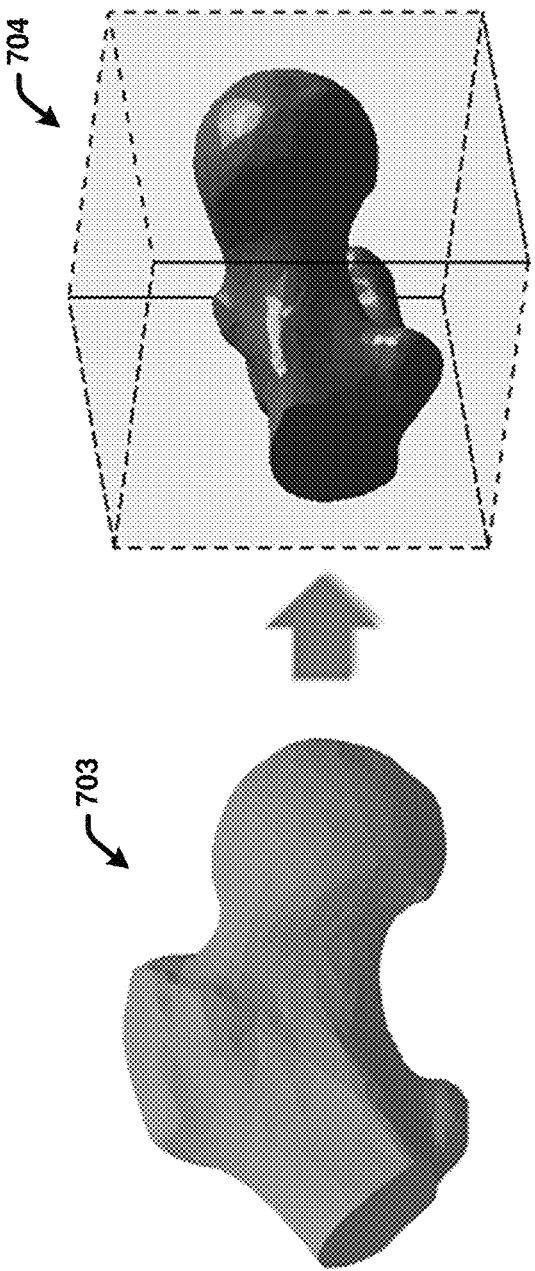

FIG. 7 illustrates two additional example implementations of the model initialization process in which the initial structure data 102 comprises volumetric data in accordance with one or more embodiments of the disclosed subject matter. In accordance with these examples, the resulting HD-CLIBS models (e.g., model 702 and model 704) are three-dimensional (volumetric) models. In the top example, the initial structure data comprises a cellular volumetric model 701 of a piece cancellous bone. In the lower example, the initial structure data comprises a solid volumetric model 703 of a piece cancellous bone sample whose boundaries are modeled with triangular meshes. Model 702 illustrates the reconstructed HD-CLIBS representation of the volumetric model 701, and model 704 illustrates the reconstructed HD-CLIBS representation of the volumetric model 703. For example, in various embodiments, to generate the HD-CLIBS representations (e.g., models 702 and 704), using defined boundary constraints for the rectilinear design domain and a discretization scheme (e.g., which in this case was 100×100×100), the model initialization component 108 can build the trivariate B-spline basis functions for each subdomain cell (e.g., on 100×100×100 samples) using the fast interpolation function. The model initialization component 108 can then assemble the respective B-spline basis functions to generate the global level set function. In this regard, models 702 and 704 are the reconstructed structures represented by the zero level sets of the implicit B-spline basis functions.

Figure 8:
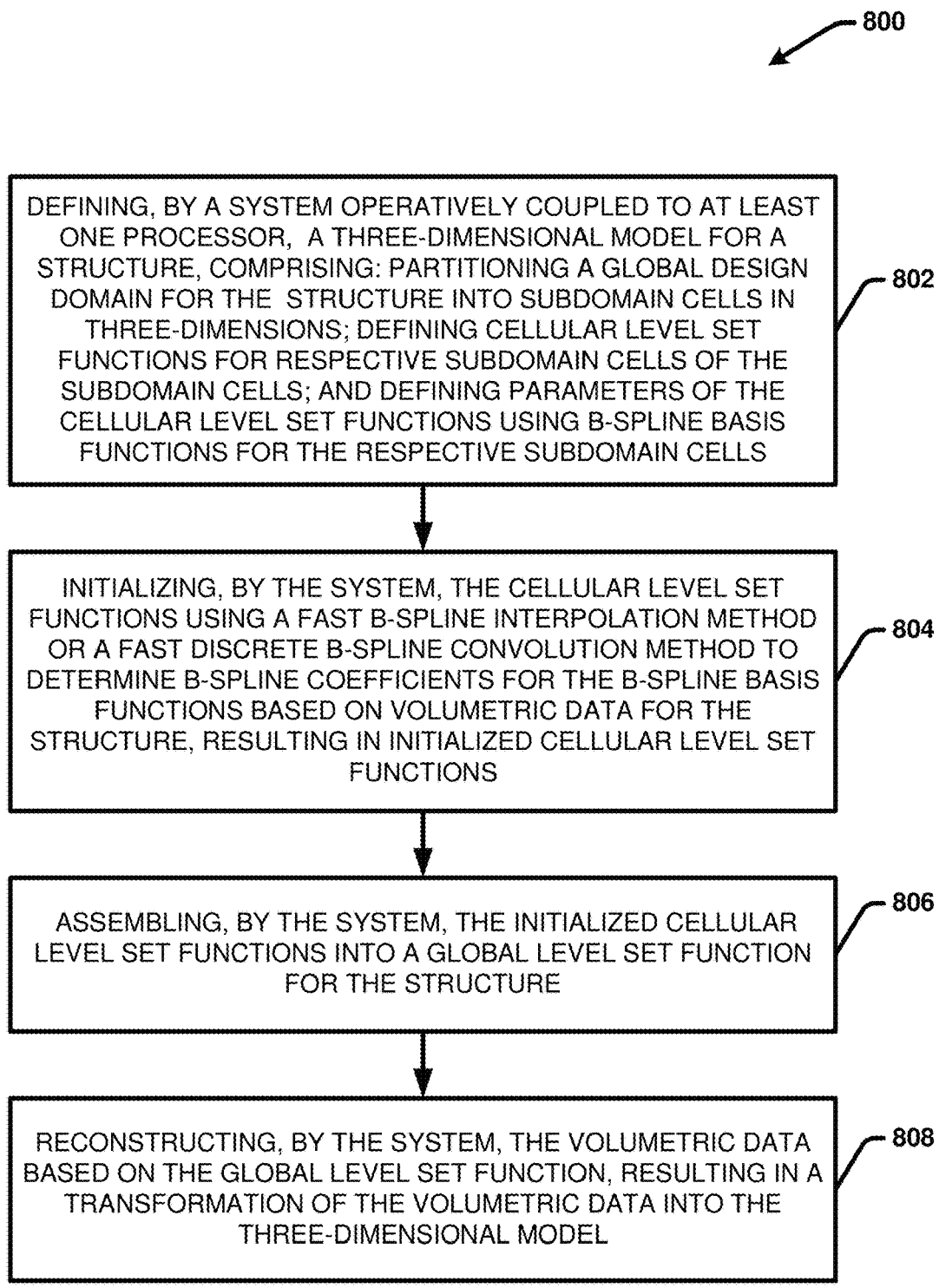
FIG. 8 illustrates an example, high-level flow diagram of a computer-implemented process for modeling three-dimensional cellular structures using the HD-CLIBS method in accordance with one or more embodiments of the disclosed subject matter.

FIG. 8 illustrates an example, high-level flow diagram of a computer-implemented process 800 for modeling three-dimensional cellular structures using the HD-CLIBS method in accordance with one or more embodiments of the disclosed subject matter. In various embodiments, method 800 can be performed by the model initialization component 108. Repetitive description of like elements employed in other embodiments described herein is omitted for sake of brevity.

At 802, a system operatively coupled to at least one processor (e.g., system 100), defines a three-dimensional model for a structure, comprising: partitioning a global design domain for the structure subdomain cells in three-dimensions; defining cellular level set functions for respective subdomain cells of the subdomain cells; and defining parameters of the cellular level set functions using B-spline basis functions for the respective subdomain cells. At 804, the system initializes the cellular level set functions using a fast B-spline interpolation method or a fast-discrete B-spline convolution method to determine B-spline coefficients for the B-spline basis functions based on the volumetric data, resulting in initialized cellular level set functions. At 806, the system assembles the initialized cellular level set functions into a global level set function for the structure, and at 808, the system reconstructs the volumetric data based on the global level set function, resulting in a transformation of the volumetric data into the three-dimensional model (e.g. an HD-CLIBS model 120).

In accordance with modeling process 800, the boundaries of the design domain and the discretization scheme for the subdomain cells can be predefined. For example, in various implementations, the global design domain for the structure can be based on a rectilinear design domain of a defined length (L), width (W) and height (H), (e.g., L=4, H=2, and W=2), and divided in to rectilinear cells in accordance with a defined discretization scheme (e.g., 4×2×2 unit cells). The discretization scheme can further define a rectilinear grid spanning the subdomain cells with regular spacing h in each of the dimensional directions (e.g., each cell can have a 16×16×16 grid of equal spacing). For the purpose of maintaining connectivity between the cellular level set functions of the two neighboring cells at their common face, knot vectors of the cubic B-splines are located on the rectilinear grid and set to be fully repeated at the first and last knots in each direction with the highest multiplicity, such as for example, p+1 in x direction.

With reference again to FIG. 1, once an initial HD-CLIBS model has been generated, the cellular connection component 110, the cellular division component 112 and the model manipulation component 114 can provide various tools for further adapting and interacting with the initial model based on manipulating the B-spline coefficients.

In various embodiments, the cellular connection component 110 can facilitate connecting two or more HD-CLIBS model units together to generate a connected model in manner that maintains geometric connectivity between adjacent units. In particular, for any cellular model, an essential requirement is the capability to specify and maintain geometric connectivity of the represented structure between any neighboring cells at their adjacent faces. The mature of the subject HD-CLIBS model with a volumetric representation being represented by implicit B-spline basis functions allows for geometric connectivity with specified smoothness across any neighboring cells by adjusting the B-spline coefficients related to the repeated boundary knots. This is achieved by constraining the trivariate coefficients $c_{i,j,k}^s$ in the cellular level set functions $\phi_s(x)$ associated with the boundary faces connecting two neighboring cells.

For example, without loss of generality, consider a univariate B-spline function of degree p in x direction within a one-dimension unit cell with a knot sequence $X=\{x_0, x_1, x_2, \ldots, x_N\}$ and a degree of the univariate is set to p=3. The two adjacent cells are simply denoted by symbols of + and −, respectively. At the starting boundary node of one cell, $x_0^+$, it is a repeated knot. Similarly, for the neighboring cell to be connected at the same position, its ending boundary knot $x_n^-$ is also repeated. With the use of cubic B-spline basis functions, it can be proved that the geometric connectivity of the two adjacent one-dimensional cells at their joint position is achieved up to second order differentiable when the following relations are, respectively, satisfied among the B-spline coefficients:

$$c_0^+ = c_n^-, \text{ for } C^0 \text{ continuity};\qquad\qquad\text{Equation 12,}$$

$$c_1^+ c_0^+ = -c_{n-1}^- + c_n^-, \text{ for } C^1 \text{ continuity};\qquad\qquad\text{Equation 13,}$$

$$c_2^+ - 3c_1^+ + 2c_0^+ = c_{n-2}^- - 3c_{n-1}^- + 2c_n^-, \text{ for } C^2 \text{ continuity; and}\qquad\text{Equation 14.}$$

In accordance with this example in which p=3, $C^0$ continuity can be guaranteed when Equation 12 is satisfied, $C^1$ continuity can be guaranteed when equation 13 is satisfied, and $C^2$ continuity can be guaranteed when equation 14 is satisfied. These conditions for geometric connectivity across adjacent cells could be easily generalized for any other order of B-splines as well. FIGS. 9-12 provide various examples illustrating cellular connection of HD-CLIBS models in a manner that maintains geometric connectivity between adjacent cellular units.

Figure 9:
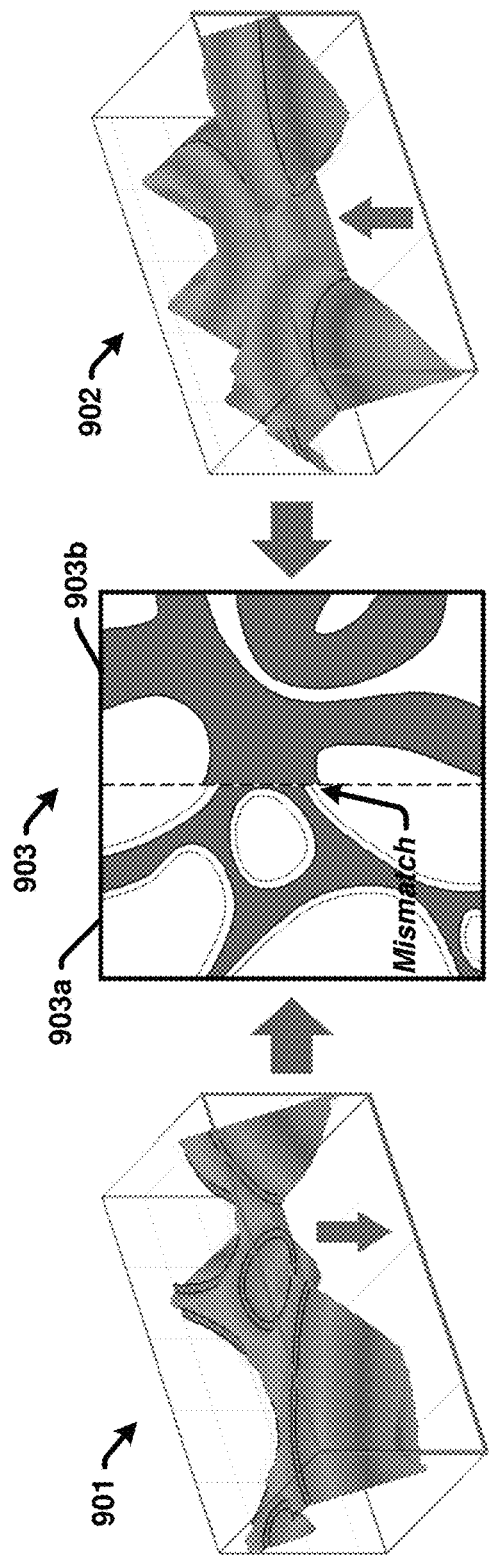
FIG. 9 illustrates the geometric assembly of two HD-CLIBS object models into a cellular structure in two-dimensions in accordance with one or more embodiments of the disclosed subject matter.

FIG. 9 illustrates the geometric assembly of two HD-CLIBS object models into a cellular structure in two-dimensions in accordance with one or more embodiments of the disclosed subject matter. As shown in FIG. 9, a first two-dimensional object 903a is constructed with its cellular level set bivariate function shown as unit 901 and a second two-dimensional object 903b is constructed with its cellular level set bivariate function shown as unit 902. In one implementation, unit 901 was constructed from an erosion operation of a given two-dimensional structure, while unit 902 was result of a dilation operation from the same structure. Such erosion and dilation operations are discussed in greater detail infra with reference to FIG. 18. In the zero level of the respective level set function, the two objects embedded in unit 901 and 902 are assembled along a chosen side to form a new cellular structure 903. In accordance with this example, the assembled object has geometric mismatch (i.e., a step) at the connection between the two cells 903a and 903b.

The geometric discontinuity of the geometric mismatch, as shown in this example can be eliminated by enforcing the geometric connectivity conditions defined in Equations 12, 13 and 14 on the B-spline coefficients. For example, the cellular connection component 110 can change the bivariate coefficients of the cellular level set functions (e.g., the B-spline coefficients) as the average of, denoted as $(c_0^+)^*$ and $(c_n^-)^*$, such that Equation 15 below is satisfied to guarantee the $C^0$ continuity at the connection face.

$$(c_0^+)^* = (c_n^-)^* = (c_0^+ + c_n^-)/2 \qquad\qquad\text{Equation 15.}$$

Moreover, the cellular connection component 110 can select the new coefficients $(c_0^+)^*$, $(c_1^+)^*$, $(c_2^+)^*$, $(c_n^-)^*$, $(c_{n-1}^-)^*$ and $(c_{n-2}^-)^*$ to satisfy the same as well in accordance with Equation 16 below, thus satisfying all the continuity conditions of Equations 12, 13 and 14 and yielding a $C^2$ continuity.

$$(c_0^+)^* = (c_1^+)^* = (c_2^+)^* = (c_n^-)^* = (c_{n-2}^-)^* = (c_0^+ + c_n^-)/2 \qquad\text{Equation 16.}$$

Figure 10:
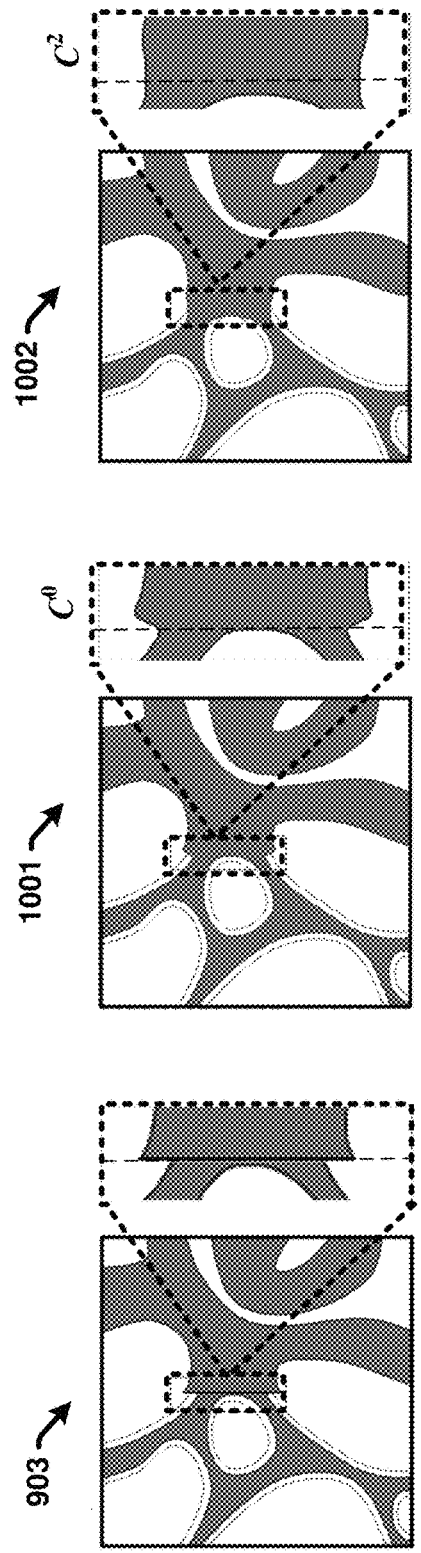
FIG. 10 compares the geometric continuities when connecting two objects are assembled into a cellular structure under different continuity constraints in accordance with one or more embodiments of the disclosed subject matter.

FIG. 10 compares the geometric continuities when connecting object 903a and 903b into the cellular structure under different continuity constraints in accordance with one or more embodiments of the disclosed subject matter. In this regard, cellular structure 903 shows the mismatch between two objects when non connectivity constraints are applied, cellular structure 1001 shows improved alignment between objects 903a and 903b when $C^0$ continuity constraints area applied, and cellular structure 1002 shows even greater improved alignment between objects 903a and 903b when $C^2$ continuity constraints are applied. It should be noticed that the geometric continuity conditions of Equations 12, 13 and 14 may be satisfied in other selected forms for the B-spline coefficients, and here a simple one is used for illustration.

Figure 11:
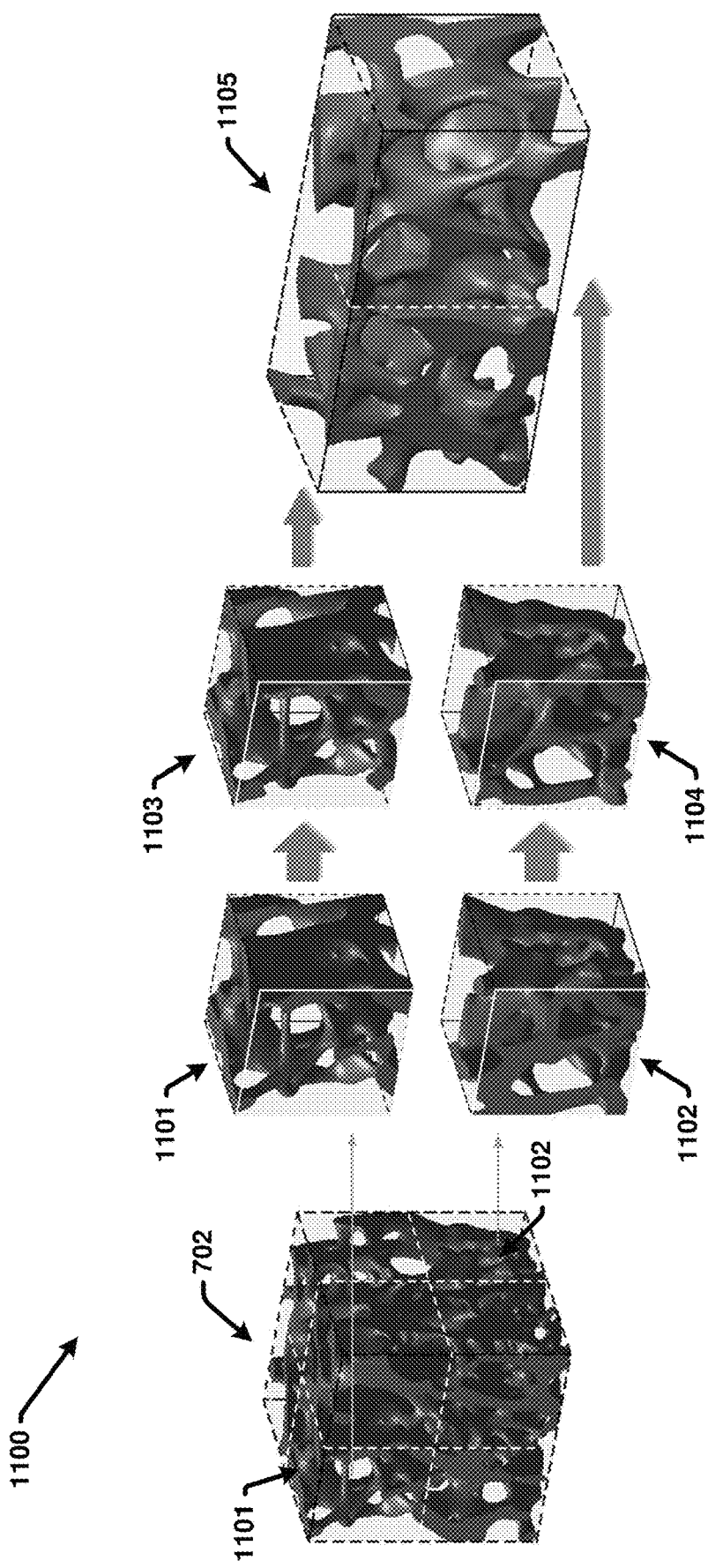
FIG. 11 illustrates the geometric assembly of two, three-dimensional HD-CLIBS object models into a three-dimensional cellular in accordance with one or more embodiments of the disclosed subject matter.

FIG. 11 illustrates the geometric assembly 1100 of two, three-dimensional HD-CLIBS object models into a three-dimensional cellular in accordance with one or more embodiments of the disclosed subject matter. In accordance with this three-dimensional example, model 702 of FIG. 7 is subdivided into eight cellular units of equal dimensions. Two totally disconnected cells, cell 1101 and cell 1102, are further extracted from opposite corners (e.g., one at the top-left corner and the other at the bottom-right corner). If these two cells were directly connected side to side without performing any adjustment to their B-spline coefficients, it is likely that geometric mismatches would exist at the connecting faces of the cells. In the embodiment shown, the constraint conditions of Equation 16 are applied to each cell on the selected faces of each cell to be adjoined to change their geometries, resulting in adjusted cell 1103 and adjusted cell 1104, respectively. Finally, the two cells are connected at the selected faces, producing a combined cellular structure 1105 with when $C^2$ continuity across the adjacent face.

The cellular connection component 110 can further apply the continuity constraints of Equations 12, 13, 14 or 16 to generate periodic cellular structures with a defined level of continuity (e.g., $C^0$, $C^1$, $C^2$) across the adjoined faces. In this regard, a periodic structure can consist of a single unit cell that is periodically distributed within the structure as a plurality of connected repeating units. The cellular connection component 110 can generate a periodic structure by generating a plurality of the same cellular units (e.g., as HD-CLIBS models) and applying the geometric continuity conditions of Equations 12, 13 and/or 14 (e.g., collectively Equation 16) to the opposite faces of the cells in the direction of periodic repetition. It is worth noting that not only the periodicity is provided, but also a higher order continuity (e.g., $C^2$ for example) in the periodic connections is readily accommodated by virtue of the HD-CLIBS model.

Figure 12:
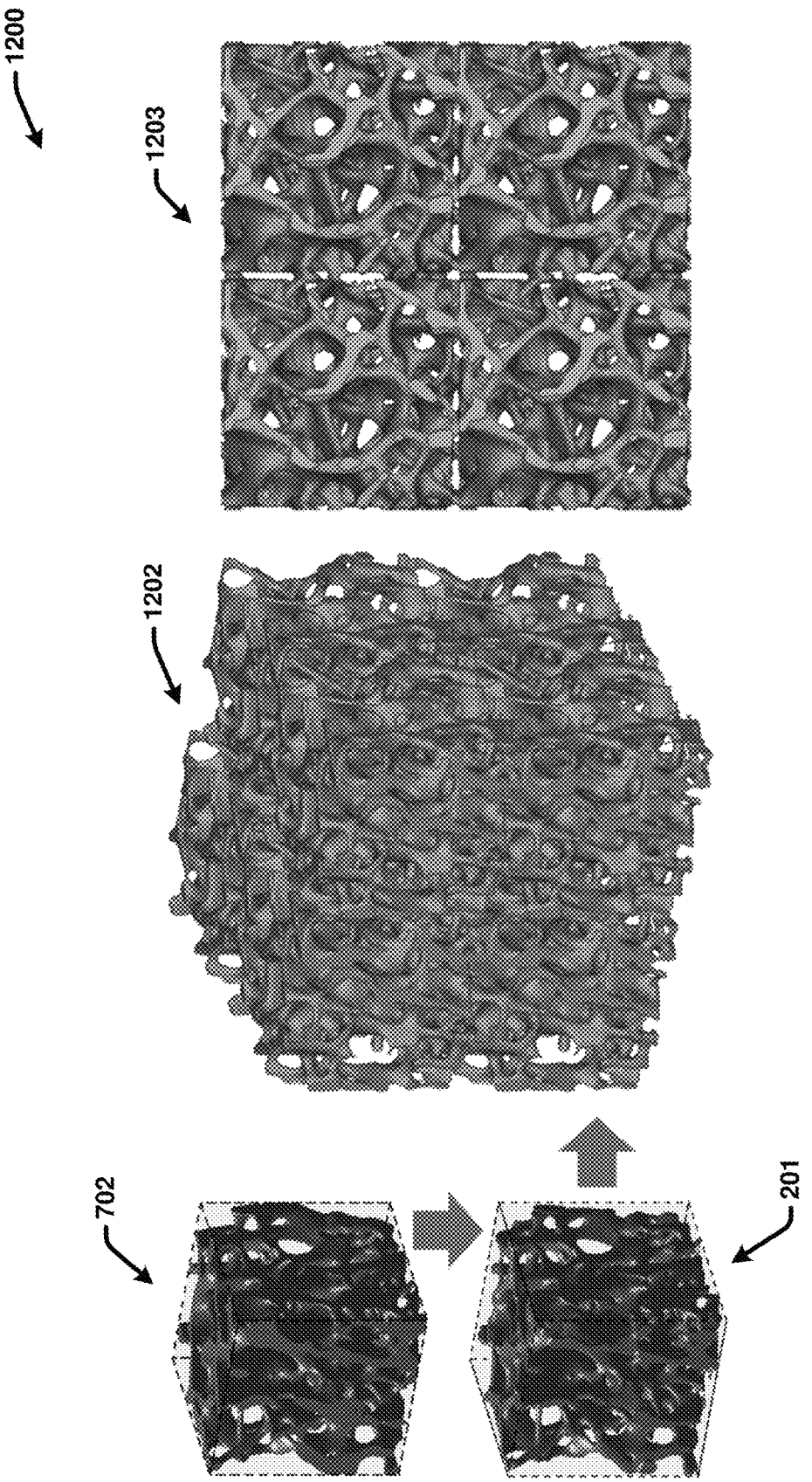
FIG. 12 illustrates the geometric assembly of a three-dimensional cellular structure composed of eight repeating cubic units in accordance with one or more embodiments of the disclosed subject matter.

FIG. 12 illustrates an example geometric assembly process 1200 of a three-dimensional periodic cellular structure composed of eight repeating cubic units in accordance with one or more embodiments of the disclosed subject matter. In the embodiment shown, the three-dimensional HD-CLIBS model of the cancerous bone shown in FIG. 7, model 702, is used as the initial cellular unit. Then, the $C^2$ continuity condition of Equation 16 is applied on the B-spline coefficients for the first knot and the last knot associated with the opposite faces in each of the three directions respectively by making changes as follows:

$$(c_0)^* = (c_1)^* = (c_2)^* = (c_n)^* = (c_{n-1})^* = (c_{n-2})^* = (c_0 + c_n)/2 \qquad(1)$$

Equation 17

Transforming the initial cell into adjusted cell 1201. After repeating and adjoining the adjusted cell 1201 cell into a 2×2×2 array of the cells, a new periodic cellular structure 1202 is constructed which has $C^2$ continuity at the boundaries of connected cells. The top view 1203 of a new periodic cellular structure 1202 delineates smooth connections on the common boundaries of the periodic structure.

With reference again to FIG. 1, the cellular division component 112 can further provide for subdividing an HD-CLIBS model 120 into smaller cellular structures by dividing any subdomain cell into two or multiple cells. With the trivariate B-spline function, the cellular division component 112 can achieve this by inserting a specific knot with sufficient multiplicity into the knot sequence. For example, when the knot of the univariate B-spline basis function defined for a cell is repeated for p+1 times, the effect is that the cell domain is divided into two subdomains in the corresponding direction, and all the basis functions in the corresponding univariate B-spline function are separated into two groups. The basis functions in each group are supported within the subdivided new subdomain and there is no basis function that can span across the inserted knot. This means that the coefficients of the B-spline basis functions in one group can only control the shape of the B-spline in the corresponding subdomain cell and they have no influence on the shape of the other subdomain cell, and vice versa. In this regard, the cellular division component 112 can divide a cell into two cells by splitting the original B-spline function for the cell into two independent B-spline basis functions. With this technique, the cellular division component 112 can divide any cell into smaller cells, which can provide an effective tool for local refinement on the geometry representation.

Figure 13:
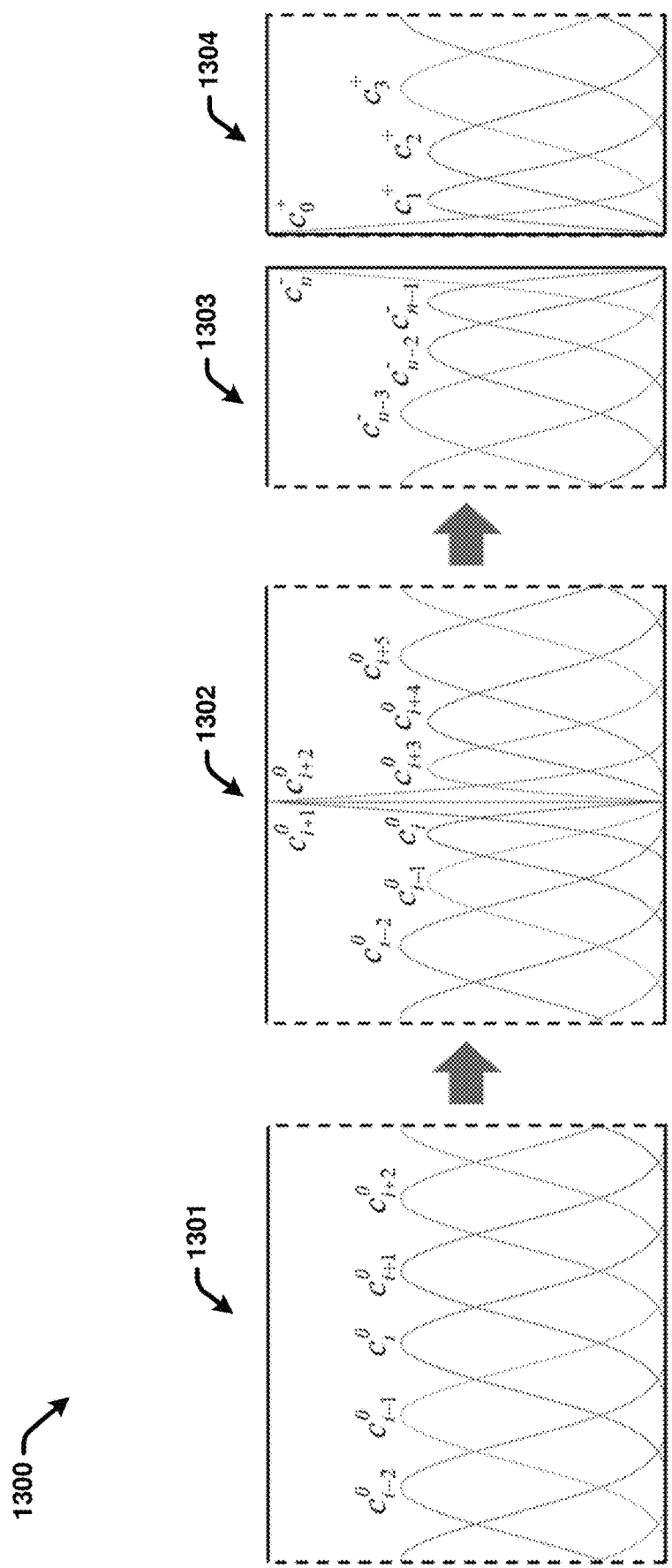
FIG. 13 shows the variation of the B-Spline basis function after knot insertion and its usage in cell division in accordance with one or more embodiments of the disclosed subject matter.

In particular, FIG. 13 presents graphs illustrating the variation of the B-Spline basis function after knot insertion and its usage in cell the division in accordance with one or more embodiments of the disclosed subject matter. In the embodiment shown, a basic cell division process 1300 is demonstrated using a one-dimension cubic B-spline for simplicity of illustration. Graph 1301 illustrates the original B-spline basis functions for an original cell, which consists of series of coefficients $c_i$. Graph 1302 illustrates the newly generated coefficients after insertion of a repeated knot. In particular, in Graph 1302, a new knot is inserted repeating for four times in the middle of the cell. As a result, a new series of basis functions are created and their new coefficients are generated. Graphs 1303 and 1304 respectively correspond to the two new cells after cell division with geometric continuity at the splitting face. The resulting two divided new cells are denoted by symbols of + and −, respectively. The B-spline coefficients of the newly created cells are given as by Equation 18 for the left cell and Equation 19 for the right cell, as shown in the last plot.

$$c_n^- = c_{i+1}^0,\ c_{n-1}^- = c_i^0,\ c_{n-2}^- = c_{i-1}^0,\ c_{n-3}^- = c_{i-2}^0 \qquad \text{Equation 18.}$$

$$c_n^+ = c_{i+2}^0,\ c_{n-1}^+ = c_{i+3}^0,\ c_2^+ = c_{i+4}^0,\ c_3^+ = c_{i+5}^0 \qquad \text{Equation 19.}$$

In a similar fashion and by virtue of the tensor product of the trivariate B-spline basis function in the HD-CLIBS model, the cellular division component can easily extend and apply the cell division process 1300 two-dimensional and three-dimensional structures with similar assignments for the coefficients for $c_{i,j}$ for two-dimensional structures, and $c_{i,j,k}$ for three-dimensional structures, respectively.

Figure 14:
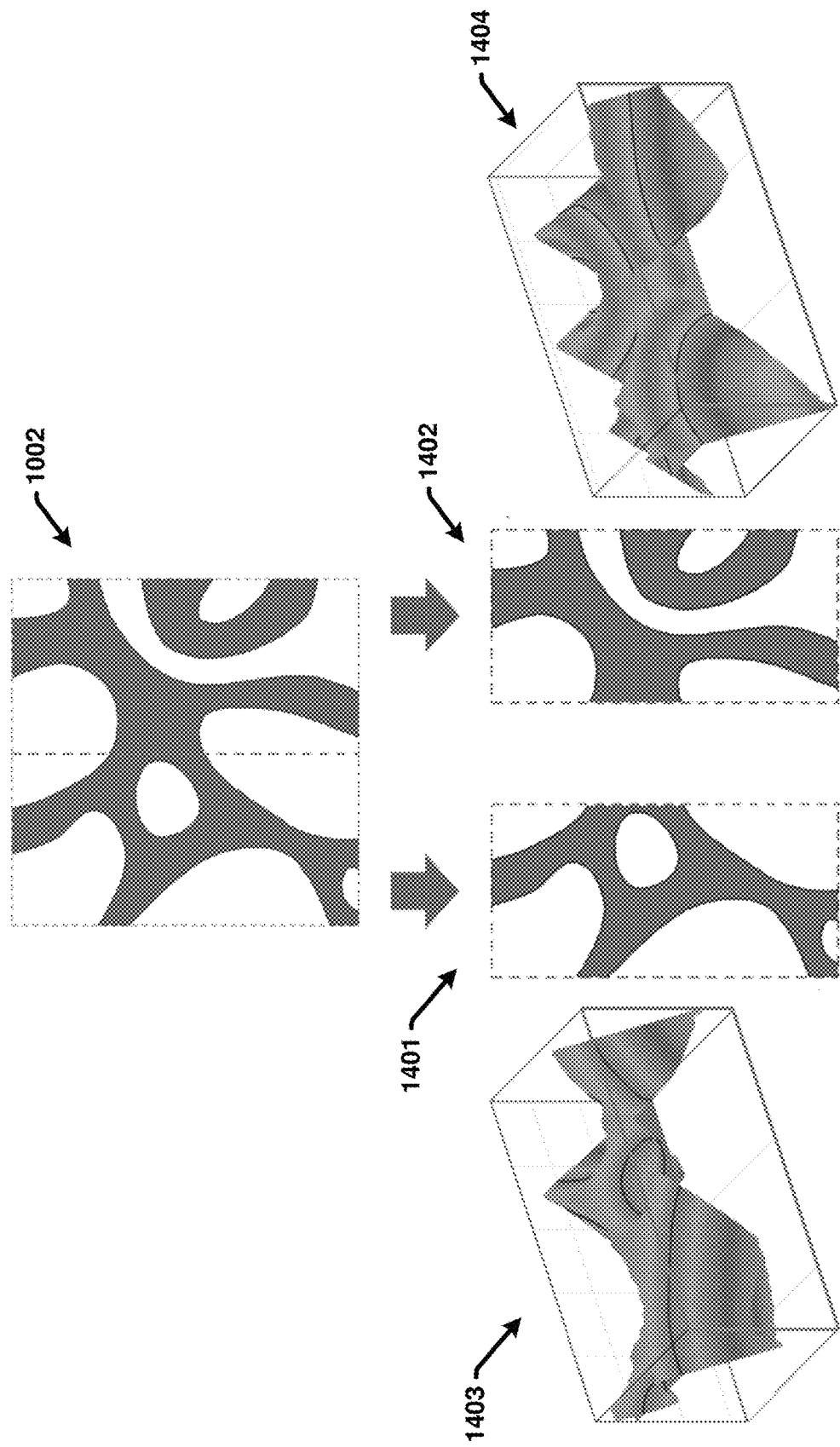
FIG. 14 illustrates an example two-dimensional implementation of the cellular division function in accordance with one or more embodiments of the disclosed subject matter.

FIG. 14 illustrates an example two-dimensional implementation of the cellular division function in accordance with one or more embodiments of the disclosed subject matter. In the embodiment shown in FIG. 14, the cellular structure 1002 is used as the starting structure. In accordance with this example, cellular structure 1002 is equally portioned into two subdomain cells in the horizontal direction, subdomain cell 1401 and subdomain cell 1402. According to the cell division algorithm, two new implicit B-spline basis functions are generated in the new subdivided cells respectively. Model 1403 is the corresponding three-dimensional HD-CLIBS model representing the new B-spline function of subdomain cell 1401, and model 1404 is the corresponding three-dimensional HD-CLIBS model representing the new B-spline function of subdomain cell 1402. This division operation can further be followed by applying it in the other direction (vertical direction), which will result in splitting the two subdomain cells 1402 and 1402 into four-quad cells, as illustrated in FIG. 15.

Figure 15:
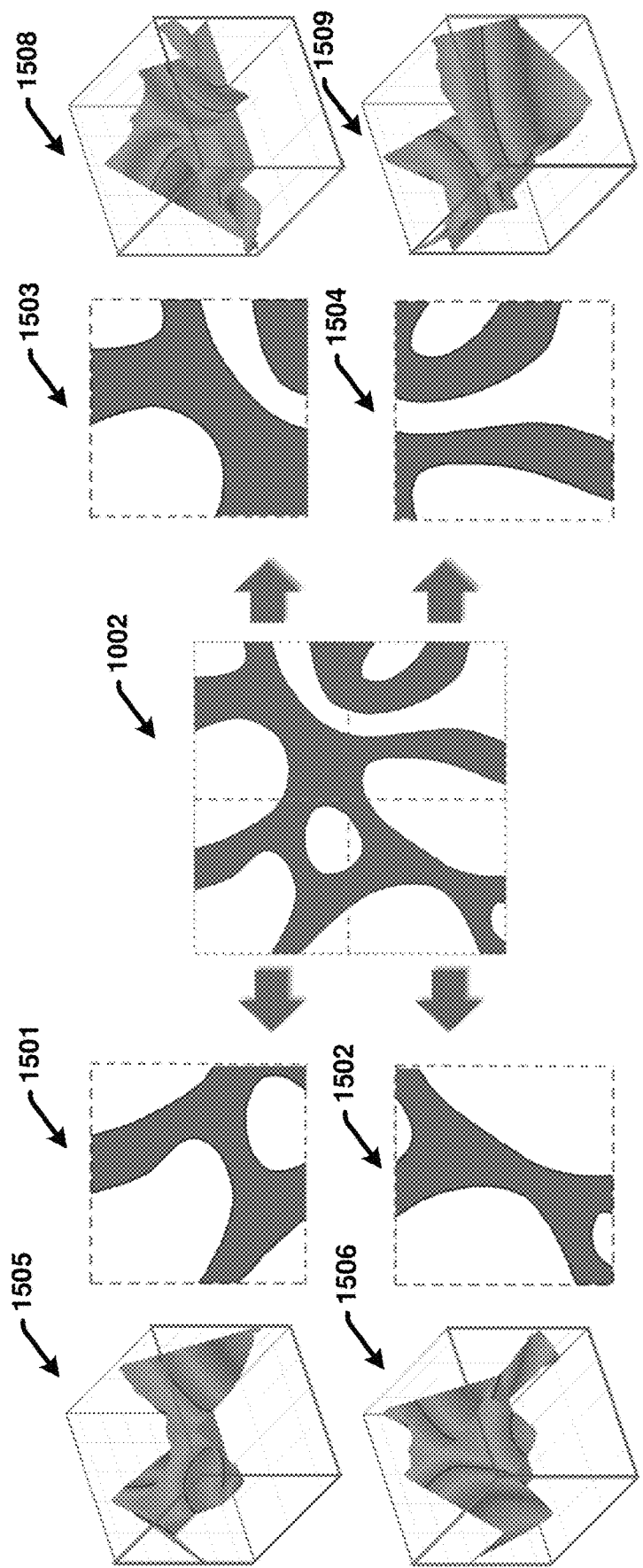
FIG. 15 illustrates another example two-dimensional implementation of the cellular division function in accordance with one or more embodiments of the disclosed subject matter.

In this regard, FIG. 15 illustrates another example two-dimensional implementation of the cellular division function in accordance with one or more embodiments of the disclosed subject matter. In accordance with this example, cellular structure 1002 is equally portioned into four subdomain cells, respectively identified as subdomain cell 1501, subdomain cell 1502, subdomain cell 1503 and subdomain cell 1504. According to the cell division algorithm, four new implicit B-spline basis functions are generated in the new subdivided cells respectively. Model 1505 is the corresponding three-dimensional HD-CLIBS model representing the new B-spline function of subdomain cell 1501, model 1506 is the corresponding three-dimensional HD-CLIBS model representing the new B-spline function of subdomain cell 1502, model 1508 is the corresponding three-dimensional HD-CLIBS model representing the new B-spline function of subdomain cell 1503, and model 1509 is the corresponding three-dimensional HD-CLIBS model representing the new B-spline function of subdomain cell 1504. This division process can similarly be applied to partition a three-dimensional cell as well, as shown in FIG. 16.

Figure 16:
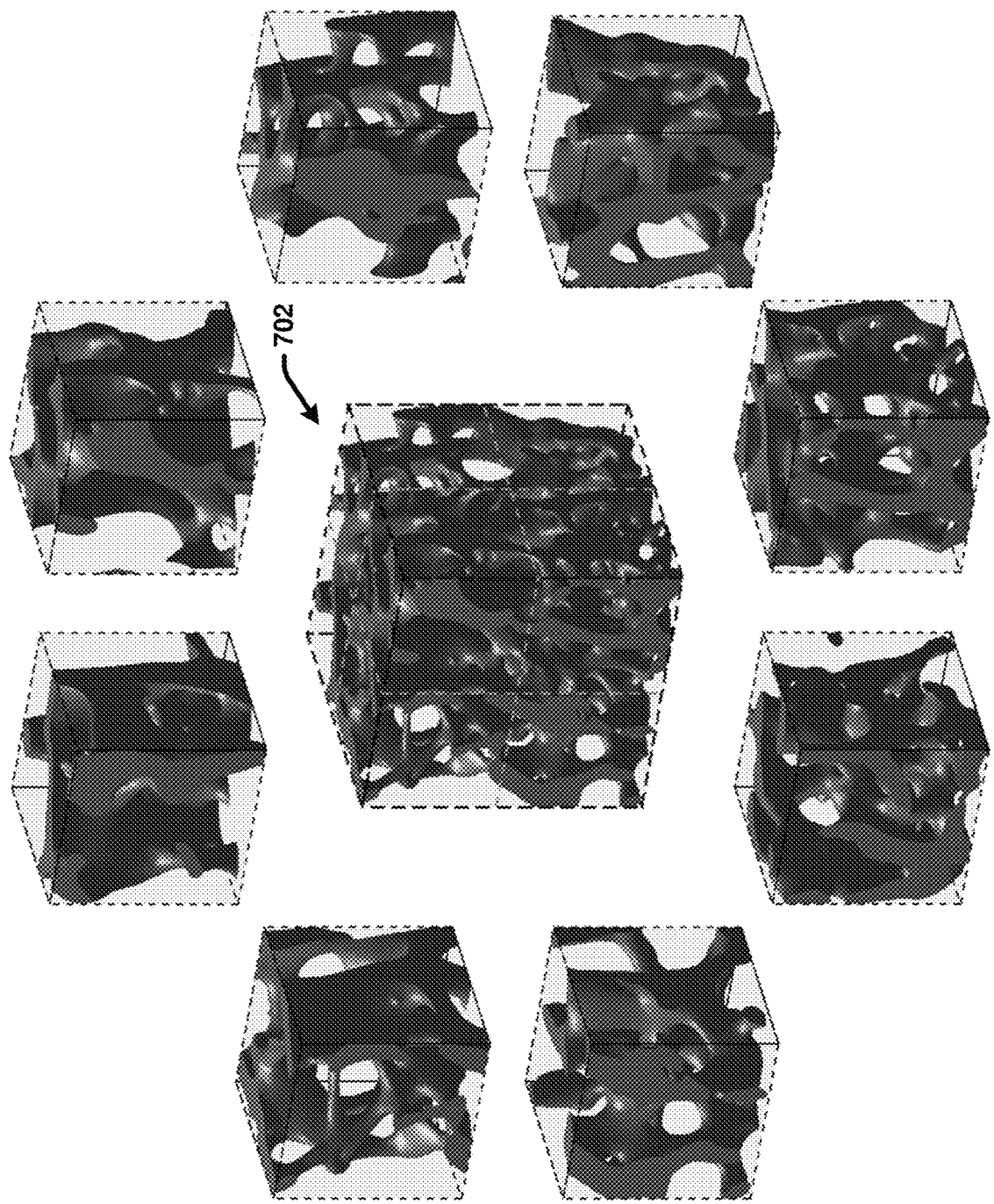
FIG. 16 illustrates an example three-dimensional implementation of the cellular division function in accordance with one or more embodiments of the disclosed subject matter.

In this regard, FIG. 16 illustrates an example three-dimensional implementation of the cellular division function in accordance with one or more embodiments of the disclosed subject matter. As shown in FIG. 16, model 702, the reconstructed HD-CLIBS model of the trabecular bone cell, is equally split into eight cells as 2×2×2 cubes. As illustrated via FIG. 16, the disclosed cellular division process provides an excellent mechanism for interior structure inspection and facilitates local geometric modifications without influencing the neighboring regions.

Figure 17:
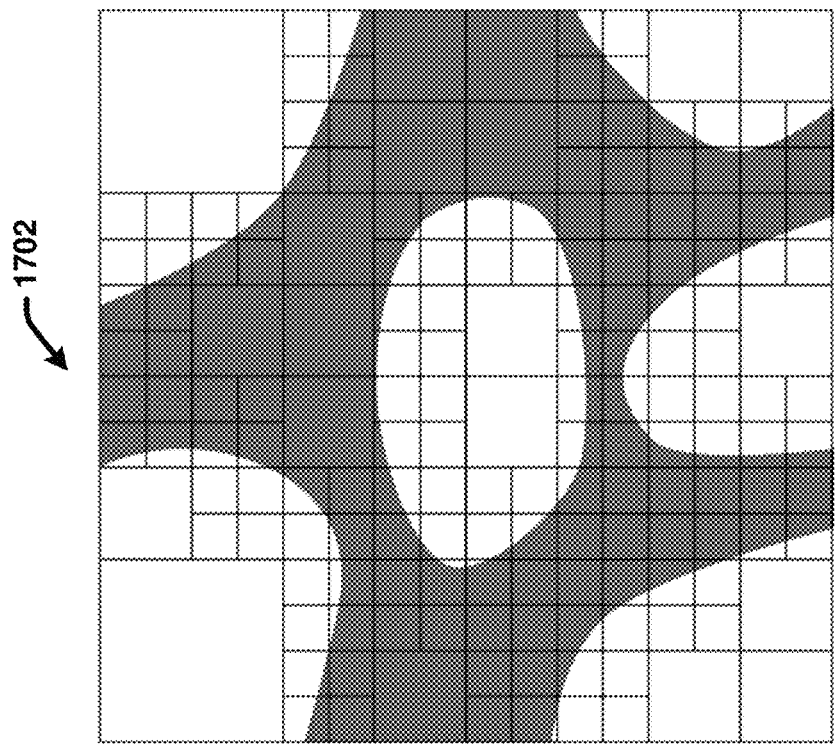
FIG. 17 illustrates the change from a uniform cell discretization to a non-uniform cell discretization based on the subject division and connection operations in accordance with one or more embodiments of the disclosed subject matter.
Figure 17:
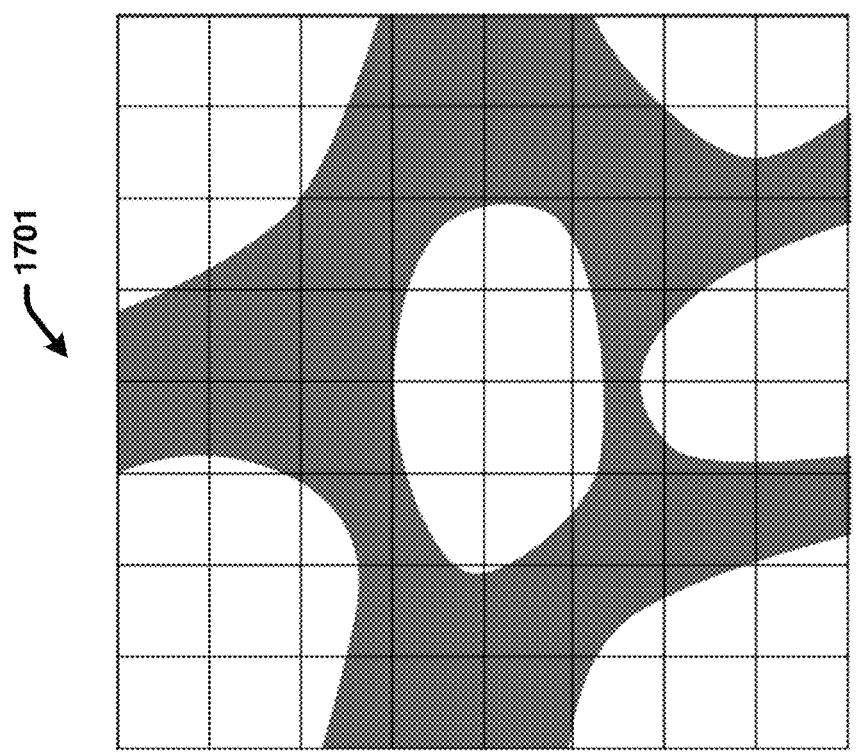

In addition to physically dividing and connecting cells, the division and connection functionalities also offer users effective and flexible tools to logically change the cell layout and hierarchy inside the cellular structure, as illustrated in FIG. 17.

In particular, FIG. 17 illustrates the change from a uniform cell discretization to a non-uniform cell discretization based on the subject division and connection operations in accordance with one or more embodiments of the disclosed subject matter. As illustrated in FIG. 17, an original cellular structure 1701 in two-dimensions is uniformly divided into 8×8 cells. Typically, this discretization is fixed during the initial cellular structure design (e.g., during initial construction of the HD-CLIBS representation of the cellular structure). However, by applying the cellular division and/or connection operations to the cellular structure post initialization, the HD-CLIBS modeling component 106 can easily adjust the cell layout by manipulating the knots and coefficients of the corresponding B-spline basis functions for the respective cells. As a result, new cellular structure 1702 with a hierarchical discretization schemed with different cell sizes can be generated. This provides for generating two-dimensional and three-dimensional cellular structure models will spatially varying microstructures.

Further, the sizes of the subdomain cells could be chosen or refined at a small scale, thus producing designs in high definition with fine structural features and details that could be 200 times more than current state-of-the-art techniques. Such designs are the solution to optimization problems that may have millions or billions of design variables in terms of the parametric coefficients of the cellular level set in B-Splines. Therefore, the high-definition cellular level set in B-Splines technique (HD-CLIBS) would extend structural-topology optimization to a supercomputer environment.

With reference again to FIG. 1, the implicit trivariate B-spline basis functions of a HD-CLIBS model 120 are essentially a parameterization of the level set function. By adjusting the coefficients $c_{i,j,k}^s$ (s=1, ..., M) of the B-spline basis functions of the cells, one can manipulate and modify the structure. In addition, since the basis function is locally supported, the influence of the coefficients is limited in a domain determined by the knot span and the degree p. In this regard, in addition to the cellular connection and division operations discussed above, the model manipulation component 114 can provide a variety of additional manipulation operations for manipulating or adjusting an HD-CLIBS model 120 based on adjusting the B-spline coefficients of one or more subdomain cells. Some additional manipulation operations provided by the model manipulation component 114 include but are not limited to, dilation and erosion operations, grading operations and blending operations. These additional operations are exemplified and discussed with reference to FIGS. 18-24.

In this regard, FIG. 18 illustrates the erosion and dilation operations for manipulating cellular structures modeled as HD-CLIBS models in accordance with one or more embodiments of the disclosed subject matter. The erosion and dilation operations are exemplified using model 702 as the initial HD-CLIBS model, the reconstructed HD-CLIBS model of the trabecular bone cell introduced in FIG. 7. Repetitive description of like elements employed in respective embodiments is omitted for sake of brevity.

First, based on the initialized B-spline function, the model manipulation component 114 can change the global feature thickness by adding or subtracting a positive constant on the coefficients simultaneously. As shown in FIG. 18, subtracting from the original coefficients of model 702 will erode the features of the original model and result in a new model 1801 with a lower density. Conversely, adding to the coefficients will dilate the features and increase the cell density, resulting in a new model 1802 with increased density. Alternatively, the coefficients can be adjusted in a graded way so as to achieve a graded transition inside the model, as shown in FIG. 19.

In this regard, FIG. 19 illustrates the grading function for manipulating cellular structures modeled as HD-CLIBS models in accordance with one or more embodiments of the disclosed subject matter. In the embodiment shown, a grading pattern is defined for the global design domain of the model as shown in part 1901. For example, part 1901 indicates that the lower subdomain cells are to be dilated up to an increase of +5, while the uppermost subdomain cells are to be eroded up to a degree of −1.5. This grading pattern further indicates that the coefficients of the subdomain cells are to be gradually adjusted from +5 to −1.5. When this grading pattern is applied to the corresponding subdomain cells of model 702, the model 702 is transformed into model 1902 which has an interior graded pattern. The graded pattern can also be applied to the cellular structure composed of multiple cells.

Figure 20:
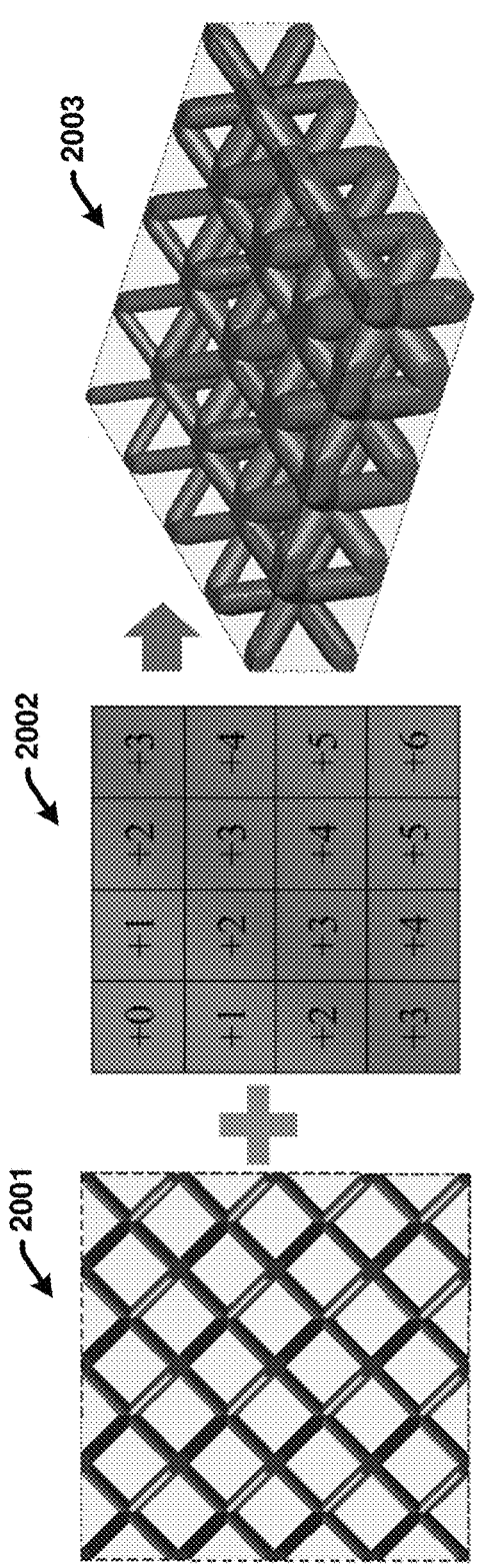
FIG. 20 illustrates the generation of a graded cellular structure using the grading function for manipulating cellular structures modeled as HD-CLIBS models in accordance with one or more embodiments of the disclosed subject matter.

For example, FIG. 20 illustrates the generation of a graded cellular structure using the grading function for manipulating cellular structures modeled as HD-CLIBS models in accordance with one or more embodiments of the disclosed subject matter. As shown in FIG. 20, when a graded pattern 2001 is assigned to the cellular structure 2002 composed of 4×4 cells, a graded cellular structure 2003 is generated with full connection between each cell.

Figure 21:
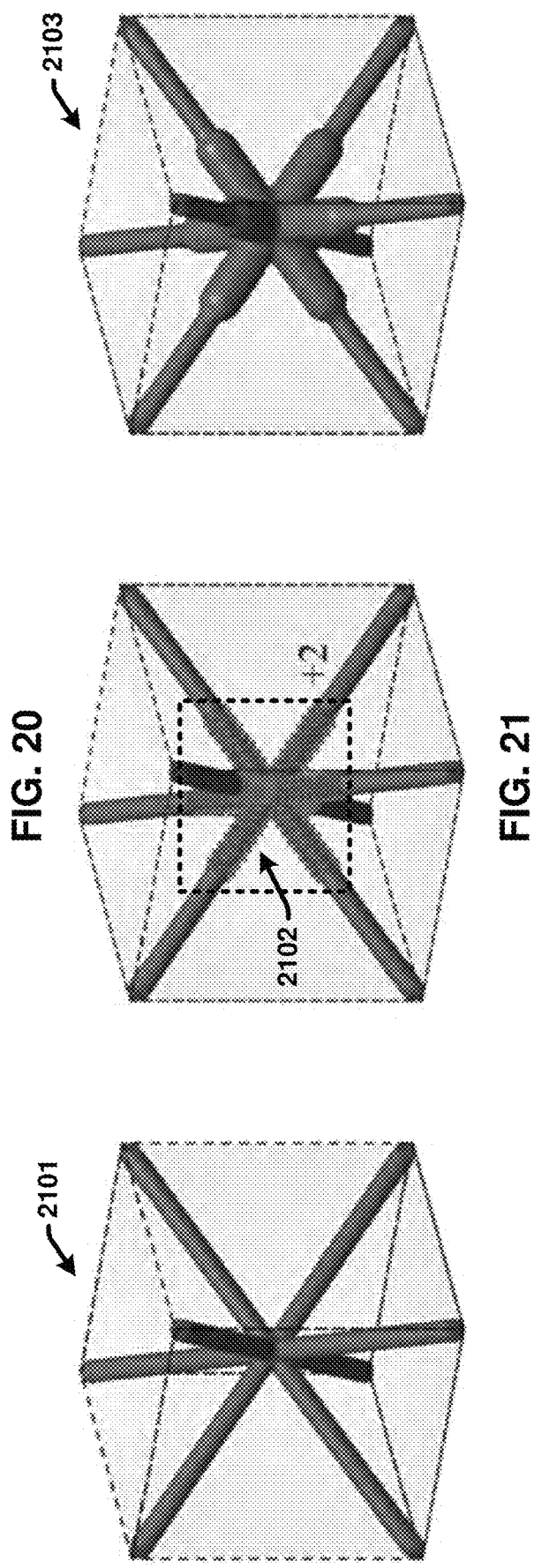
FIG. 21 illustrates the local modification of independent cells of a composite cellular structure modeled as an HD-CLIBS model in accordance with one or more embodiments of the disclosed subject matter.

These erosion/dilation and grading operations can also be applied to individual subdomain cells of an HD-CLIBS model by changing the trivariate coefficients, since each basis function is locally supported. For example, FIG. 21 illustrates the local modification of independent cells of a composite cellular structure 2101 modeled as an HD-CLIBS model in accordance with one or more embodiments of the disclosed subject matter. As shown in FIG. 21, in order to dilate only features highlighted in area 2102 in the center of cellular structure, then only the coefficients for the subdomain cells included area 2102 can be increased. The resulting structure 2103 illustrates dilation of the coefficients for only the subdomain cells included in area 2012 while those located outside are kept unchanged.

Figure 22:
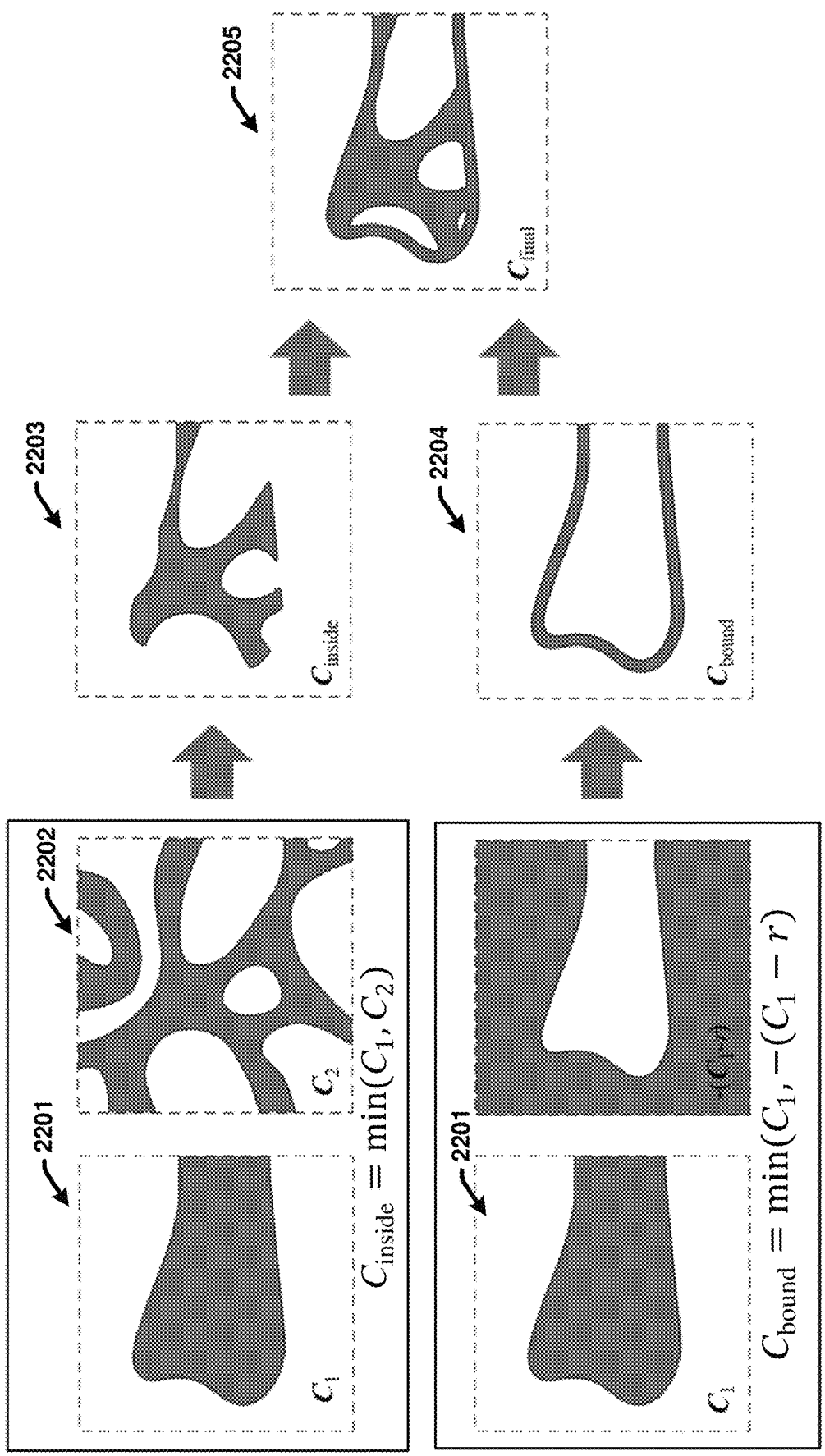
FIG. 22 illustrates a two-dimensional example of a blending function for combining two or more cellular structures modeled as HD-CLIBS models in accordance with one or more embodiments of the disclosed subject matter.

The model manipulation component 114 can also blend different cells together by manipulating the trivariate coefficients, as exemplified in FIG. 22.

In this regard, FIG. 22 illustrates a two-dimensional example of a blending function for combining two or more cellular structures modeled as HD-CLIBS models in accordance with one or more embodiments of the disclosed subject matter. As shown in FIG. 22, two initial two-dimensional HD-CLIBS model cells are given, including a first cell 2201 that depicts a solid femur bone sample with model coefficients $C_1$, and a second cell 2202 that depicts a cellular cancellous bone sample with coefficients $C_2$. In accordance with this example blending operation, the model manipulation component 114 can blend the first cell 2201 and the second sell 2202 together to generate a new cell 2205 as follows.

First, the model manipulation component 114 can generate the inside part 2300 for the new cell 2206 by applying a min operation on the two sets of coefficients in accordance with Equation 20 as follows:

$$C_{inside}=\min(C_1, C_2) \quad \text{Equation 20.}$$

Then, the model manipulation component 114 can generate the boundary skin part 2204 by another min operation of 21, where r is the parameter to control the thickness of the skin.

$$C_{bound}=\min(C_1,-(C_1-r)) \quad \text{Equation 21.}$$

Finally, the model manipulation component 114 can generate the new cell 2205 combining these two parts with a max operation in accordance with Equation 22.

$$C_{final}=\max(C_{inside},C_{bound}) \quad \text{Equation 22.}$$

In this regard, using the coefficients of $C_{final}$, the model manipulation component 114 can generate a blended cell (e.g., new cell 2205) that preserves the shape of cell 2201 and is filled with the details of cell 2202, and is covered by the skin with thickness controlled by r. This blending operation can be easily extended to three-dimensional cases, a shown in FIGS. 23 and 24.

Figure 23:
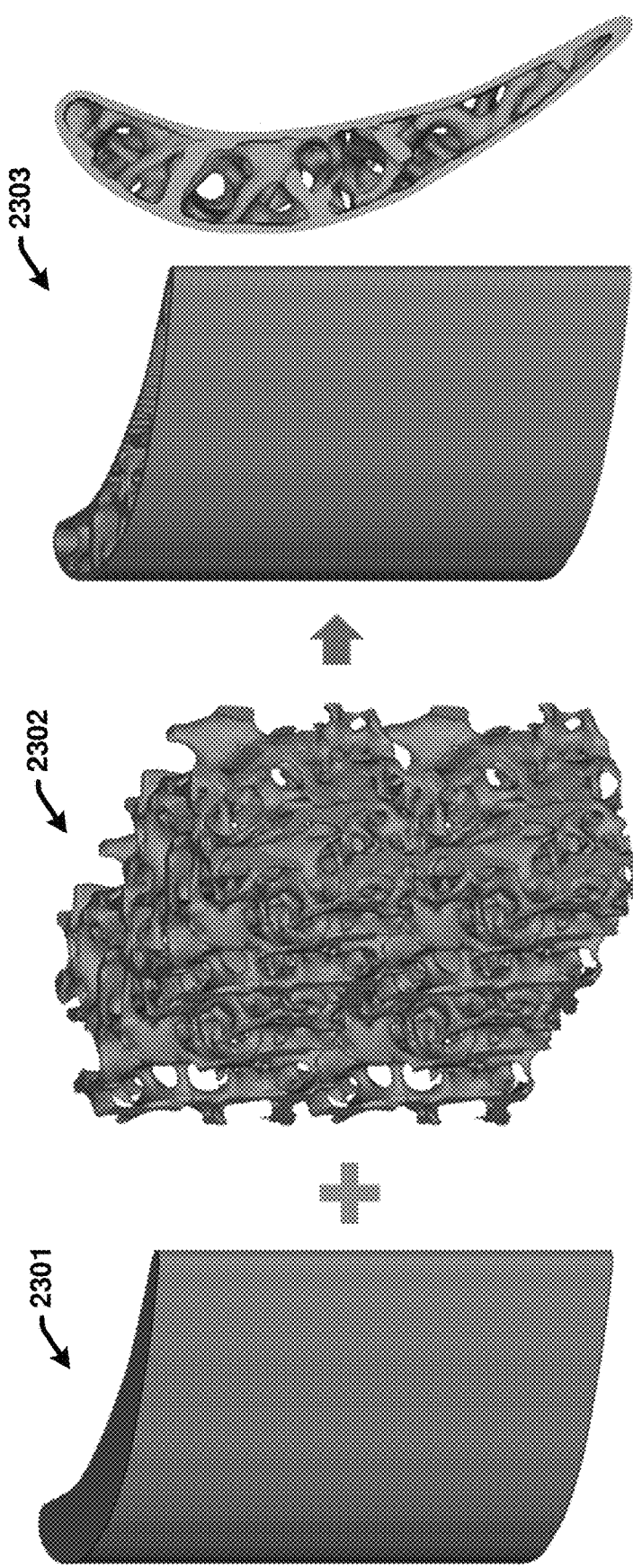
FIG. 23 illustrates a three-dimensional example of a blending function for combining two or more cellular structures modeled as HD-CLIBS models in accordance with one or more embodiments of the disclosed subject matter.
Figure 24:
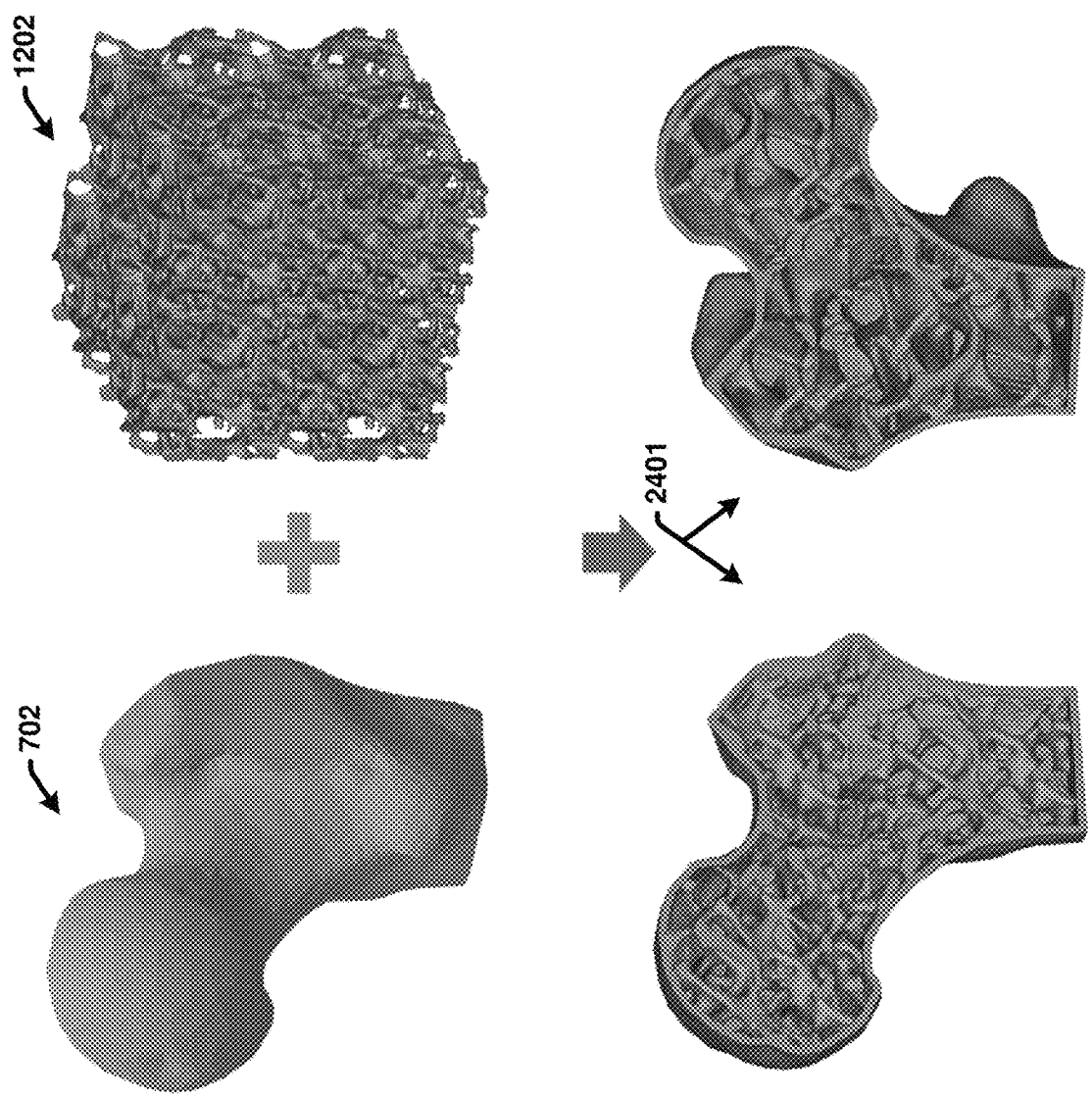
FIG. 24 illustrates another three-dimensional example of a blending function for combining two or more cellular structures modeled as HD-CLIBS models in accordance with one or more embodiments of the disclosed subject matter.

In this regard, FIGS. 23 and 24 illustrate three-dimensional examples of a blending function for combining two or more cellular structures modeled as HD-CLIBS models in accordance with one or more embodiments of the disclosed subject matter. In the embodiment shown in FIG. 23, a simplified blade model 2301 is filled with the bone tissue modelled with an HD-CLIBS model 2302 that is composed of 2×1×2 of periodic cells, resulting in blended structure 2303. In FIG. 24, the solid volumetric model 703 (presented in FIG. 7) of a real femur bone sample is used for illustration. In this example, the solid region 703 is filled with bone tissue of periodic cellular structure 1202 (e.g., an HD-CLIBS model that is composed of 2×2×2 of periodic cells, as discussed with reference to FIG. 12), resulting in blended structure 2401. In addition, if more microstructures are preferred, the bone sample can be built with more periodic cells. The model manipulation component 114 can also locally adjust the relative density of the interior microstructures according to practical requirements using the dilation/erosion and grading operations.

With reference again to FIG. 1, in addition to the various techniques described for generating and adapting HD-CLIBS models discussed with reference to the HD-CLIBS modelling component 106, the structure modelling and topology optimization module 104 can further include optimization component 116 to facilitate optimizing the topology of solid and cellular structures modelled using the HD-CLIBS technique. Topology optimization is a mathematical and computational method originally developed for optimizing material distribution in order to achieve better structural performance of a solid structure with the given design domain, objective function, and constraints. Benefiting from the intrinsic properties of the implicit B-Splines, by defining implicit B-spline function for each of the cellular level set functions $\phi_s$, this parametric representation shows much greater flexibility for topology optimization of solid and cellular structures with lower computational costs relative to the classical level set method.

In particular, the HD-CLIBS model described herein operates on a set of cellular subdomains partitioning the global design domain D, while the material domain of the structure within each cell is captured by its own level set function $\phi_s$. In contrast to the use of a single global level set function in the classical level set method, the optimization component 116 can carry out the dynamic evolution of the level set function on each subdomain cell separately and in parallel. Moreover, the optimization component 116 can exploit the parameterization of the HD-CLIBS model with the trivariate B-spline basis functions in the structural topology optimization process. Thus, using the HD-CLIBS modeling techniques discussed herein, the optimization component 116 can perform a topology optimization process that provides substantial technological improvements for optimizing the structural properties of solid and cellular structure CAD models.

For example, in various embodiments, based on the HD-CLIBS parametric model, the optimization component 116 can formulate the topology optimization problem as a restriction of the variation problem onto the space spanned by the B-splines (e.g., as a projection onto the B-spline space). Consequently, the optimization component 116 can determine the optimization solution directly in terms of an iteration of the B-spline coefficients independently, without any need to solve the Hamilton-Jacobi Equation or any linear system with an interpolation matrix, as is required in the classical level set method. The fast B-spline construction scheme is also readily deployable for the calculations of the sensitivities of the B-spline coefficients. This technique transforms the sensitivity integrals, as always processed in the conventional level set approaches, into a discrete convolution operation. Further, since the B-spline basis functions are separable in the three-dimensions, as a tensor product, the optimization component 116 can perform this convolution for three-dimensional structures as a sequence of simple three one-dimensional convolutions.

In addition, the combination of the cellular discretization scheme (e.g., portioning the design space into cellular subdomains) and the level-set representation with implicit trivariate B-spline basis functions opens a horizon for efficient computation in parallel processing, especially on a high-performance computing platform with CPU or GPU multiple cores. It should be noted that the HD-CLIBS model maintains geometric continuity among the microstructural cells perfectly and easily. This means that the HD-CLIBS model has great potential in design and optimization of cellular, lattice, and functionally graded materials and structures. In that context, the sizes of the subdomain cells could be chosen or refined at a small scale, thus producing designs in high definition with fine structural features and details that could be hundreds of times more than current state-of-the-art techniques. Such designs are the solution to optimization problems that may have millions or billions of design variables in terms of the parametric coefficients. Therefore, a high-definition cellular level set in B-splines implementation would extend the structural topology optimization to a supercomputer environment.

Figure 25:
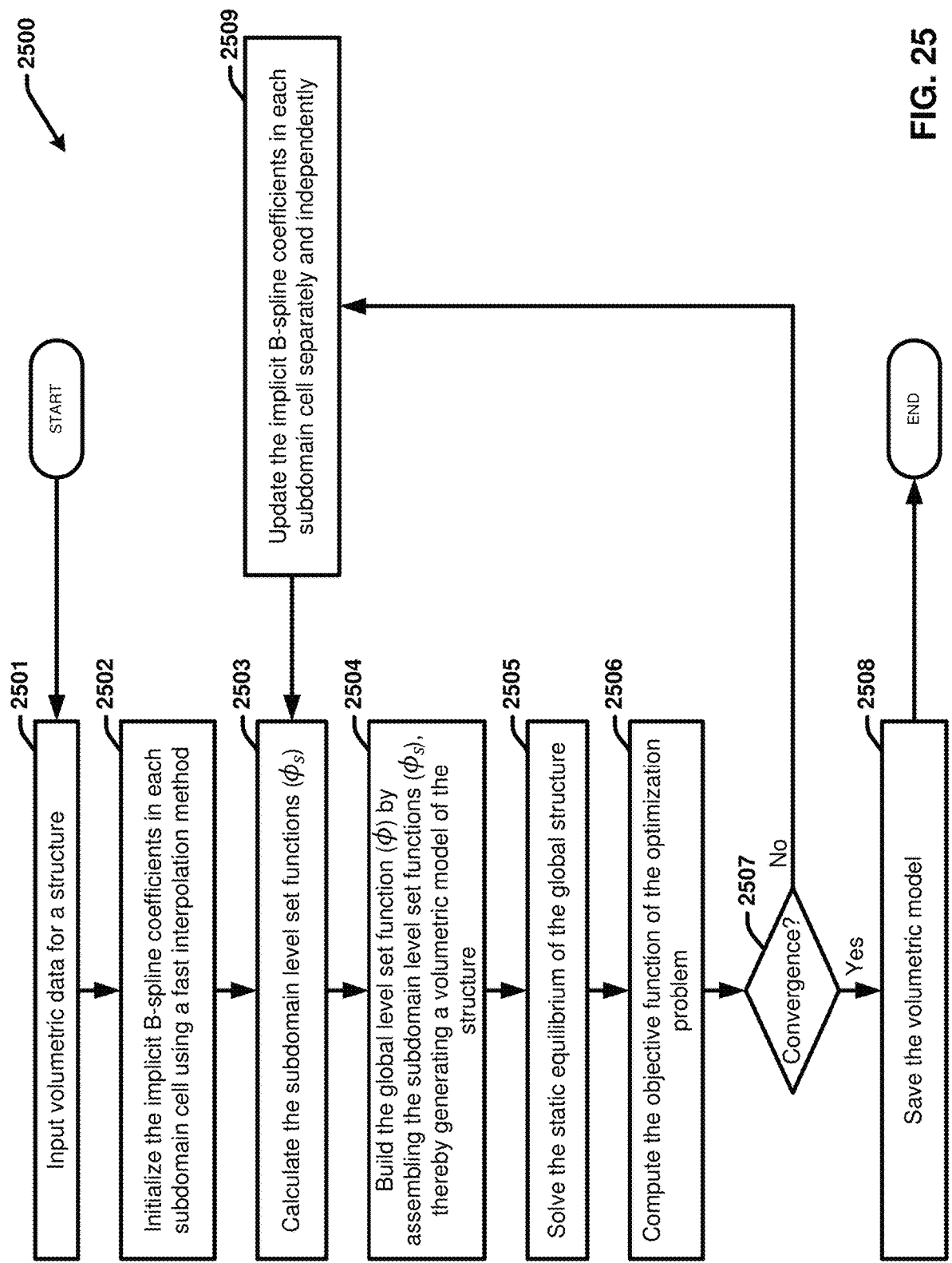
FIG. 25 presents a high-level flow-diagram of an example computer implemented topology optimization process based on the HD-CLIBS model in accordance with one or more embodiments of the disclosed subject matter.

FIG. 25 presents a high-level flow-diagram of an example computer implemented topology optimization process 2500 based on the HD-CLIBS modeling technique in accordance with one or more embodiments of the disclosed subject matter. In various embodiments, the optimization process 2500 can be executed by the HD-CLIBS modeling component 106 (e.g., using the model initialization component 108) and the optimization component 116. Repetitive description of like elements employed in respective embodiments is omitted for sake of brevity.

In accordance with optimization process 2500, the boundaries of the design domain and the discretization scheme for the subcellular domains can be predefined. For example, in various implementations, the global design domain for the structure can be based on a rectilinear design domain of a defined length (L), width (W) and height (H), (e.g., L=4, H=2, and W=2), and divided in to rectilinear cells in accordance with a defined discretization scheme (e.g., 4×2×2 unit cells). The discretization scheme can further define a rectilinear grid spanning the subdomain cells with regular spacing h in each of the dimensional directions (e.g., each cell can have a 16×16×16 grid of equal spacing). For the purpose of maintaining connectivity between the cellular level set functions of the two neighboring cells at their common face, knot vectors of the cubic B-splines are located on the rectilinear grid and set to be fully repeated at the first and last knots in each direction with the highest multiplicity, such as for example, p+1 in x direction. Depending on the optimization function/objective used (which can vary), other predefined design constraints for the structure can include (but are not limited to) the Young's modulus of the material, the Poisson's ratio, the maximum volume ratio, the knot span, and the loading conditions. Using this model, the topology optimization process simultaneously optimizes the solid domain of the structure as well as the physical properties of all structural cells that comprise the cellular structure.

In this regard, the optimization process 2500 can begin with the initial model initialization and construction process described with reference to the model initialization component 108 and FIG. 8. In this regard, at 2501, volumetric data for a structure can be received (e.g., by the model initialization component 108) and/or generated from a surface and/or a solid representation of the structure (e.g., by building the signed distance function for the model and discretization of the signed distance function to generate the volumetric data). At 2502, the implicit B-spline coefficients in each subdomain cell can be initialized by the fast interpolation method. The model initialization component 108 can then calculate the subdomain level set functions based on the B-spline coefficients at 2503 and build the global level set function by assembling the subdomain level set functions at 2504, thereby generating a (initial) volumetric model of the structure.

At 2505 and 2506, the optimization component 116 can then evaluate the topology of the volumetric model to determine whether the current structure shape and/or material properties of the model satisfy a defined optimization objective function for the optimal shape and/or material properties of the model under the design constraints of the HD-CLIBS model (e.g., with respect to the design domain/discretization scheme, the connectivity/continuity order required, loading constraints, etc.). The defined optimization objective function can vary. For example, in some implementations, the defined optimization objective function can comprise a structural mean-compliance problem. A detailed description of this implementation of optimization process using the structural mean-compliance problem is discussed below.

In this regard, in various embodiments, regardless of the optimization objective function employed, at 2505, the optimization component 116 can solve the static equilibrium of the global structure and compute the objective function of the optimization problem at 2506. At 2507, the optimization component 116 can determine whether convergence has been achieved. In other words, the optimization component 116 can determine whether the objective function of the optimization problem has been achieved and/or that additional manipulations of the B-spline coefficients does no not result in additional improvement to the solution of the objective function. If so, then the optimization process can end, and the volumetric model can be saved at 2508 (e.g., in suitable memory). The saved model can further be rendered (e.g., via the rendering component 118), constructed, printed (e.g., using 3D printing), combined with other models (e.g., using the cellular connection operations described herein), divided (e.g., using the cellular division techniques described herein), and/or further manipulated using the various manipulation operations described with reference to the cellular connection component 110, the cellular division component 112 and/or the model manipulation component 114.

If at 2507 the optimization component 116 determines that convergence has not been achieved, then the optimization component can adapt the shape and/or topology of the model better conform with the topology optimization objectives by independently adjusting the B-spline coefficients of one or more of the subdomain cells, recalculating the subdomain level set functions and re-constructing the global level set function for the model based on the adjusted B-spline coefficients, and re-evaluating the compliance of the updated model with respect to the optimization objective function. In this regard, the optimization process involves iteratively performing these steps until convergence is achieved.

In this regard at 2509, the optimization component 116 can update the implicit B-spline coefficients in each subdomain cell separately and independently. In various embodiments, this can involve a series of discrete B-spline convolution calculations, as discussed in greater detail infra. After the update, at 2503, the subdomain level set functions $\phi_s$, can be recalculated, and at 2504, the global domain level set function $\phi$ can be obtained by piecing together all the updated subdomain level set functions $\phi_s$. The optimization component 116 can re-solve the static equilibrium of the updated global structure at 2505 and compute the objective function of the optimization problem at 2506. At 2507, the optimization component 116 can again determine whether convergence has been achieved and continue or end the optimization process accordingly.

As noted above, in one or more embodiments, the optimization component 116 can apply a structural compliance minimization problem to illustrate the benefits of the disclosed HD-CLIBS model for topology optimization. Based on the level set description, the mathematical formulation of the structural compliance optimization problem could be given by Equation 23:

$$\text{Minimize:} \underset{\phi}{\ } J(u, \phi) = \int_D \varepsilon_{ij}(u) C_{ijkl} \varepsilon_{kl}(u) H(\phi) d\Omega \qquad \text{Equation 23}$$

$$\text{Subject to} \begin{cases} a(u, v, \phi) = l(v, \phi), v \in U \\ G(\phi) = \int_D H(\phi)d\Omega - V_{max} \leq 0 \\ u = \bar{u}, \quad \text{on } \partial\Omega_u \\ \sigma_{ij}^n = \bar{\sigma}_{ij}^n, \quad \text{on } \partial\Omega_\sigma \end{cases},$$

wherein $J(u, \phi)$) is the objective function, u the displacement field, $\varepsilon_{ij}$ the strain field represented by a second-order strain tensor, $C_{ijkl}$ the fourth-order elastic tensor of the solid material, H is the Heaviside function, and G is the volume constraint equation with $V_{max}$ representing the maximum allowable volume of the solid material. The static equilibrium equation is given in its weak variational form in terms of the energy bilinear form $a(u, v, \phi)$ and the load linear form $l(v, \phi)$, where v denotes the virtual displacement field in the kinematically admissible displacement field space U.

As is well known in the classical level set based topology optimization method, the Lagrange function is readily constructed and its derivative is simply expressed as follows:

$$L = \int_{\partial\Omega} g(x) V^n dx \qquad \text{Equation 24,}$$

with g representing the gradient density function defined by, $$g(x) = -\varepsilon_{ij}(u(x,t)) C_{ijkl} \varepsilon_{kl}(u(x,t)) + \lambda \qquad \text{Equation 25, and}$$

wherein in which λ is the Lagrangian multiplier to deal with the volume constraint in the formulation of Equation 23.

With the HD-CLIBS model, the optimization component 116 can carry out the topology optimization at the level of the subdomain cell $D_s$. According to the Hamilton-Jacobi Equation (e.g., Equation 5), the normal velocity field $V_s^n$ can be expressed as follows:

$$V_s^n(x, t) |\nabla \phi_s(x, t)| = \frac{\partial \phi_s(x, t)}{\partial t}, \text{ for } s = 1, \ldots, M. \qquad \text{Equation 26}$$

In this regard, from Equation 8, we have:

$$\frac{\partial \phi_s(x,t)}{\partial t} = \sum_{i=0}^{n}\sum_{j=0}^{m}\sum_{k=0}^{l} \dot{c}_{i,j,k}^s(t) B_{i,p}^s(x) B_{j,q}^s(y) B_{k,r}^s(z) = 0, \quad \text{Equation 27}$$

for $x \in \Gamma_s = \partial\Omega_s$.

Thus, substituting Equation 27 into Equation 26 yields Equation 28.

$$V_s^n(x,t) = \quad \text{Equation 28}$$

$$\frac{1}{|\nabla\phi_s(x,t)|}\sum_{i=0}^{n}\sum_{j=0}^{m}\sum_{k=0}^{l} \dot{c}_{i,j,k}^s(t) B_{i,p}^s(x) B_{j,q}^s(y) B_{k,r}^s(z),$$

for $s = 1, \ldots, M$.

Finally, substituting the normal velocity in Equation 28 into Equation 24, the Lagrange derivative becomes Equation 29 below:

$$\dot{L} = \quad \text{Equation 29}$$

$$\int_{\partial\Omega} \frac{g(x)}{|\nabla\phi_s(x,t)|} \left[\sum_{i=0}^{n}\sum_{j=0}^{m}\sum_{k=0}^{l} \dot{c}_{i,j,k}^s(t) B_{i,p}^s(x) B_{j,q}^s(y) B_{k,r}^s(z)\right] dx.$$

As in the general case of shape sensitivity analysis, this derivative is defined as a boundary integral on the boundary of the structure. It is customary to reformulate the derivative as a domain integral over the fixed design domain D by using the Heaviside function H($\phi$) and its derivative Dirac delta function $\delta(\phi)$. Then, the Lagrange derivative is transformed into Equation 30 below:

$$\dot{L} = \sum_{i=0}^{n}\sum_{j=0}^{m}\sum_{k=0}^{l} \dot{c}_{i,j,k}^s(t) \int_D g(x)\delta(\phi) B_{i,p}^s(x) B_{j,q}^s(y) B_{k,r}^s(z) dx. \quad \text{Equation 30}$$

For a minimization process, this Lagrange derivative should be kept negative. Thus, the steepest descent method can be used, yielding the required derivative of the coefficient $\dot{c}_{i,j,k}^s(t)$ as Equation 31 below, wherein $W(x) = -g(x)\delta(\phi(x))$.

$$c\dot{c}_{i,j,k}^s(t) = \int_{D_s} W(x) B_{i,p}^s(x) B_{j,q}^s(y) B_{k,r}^s(z) dx, \text{ for } s=1,\ldots,M \quad \text{Equation 31}$$

In accordance with the disclosed HD-CLIBS modeling process, the global structural domain D is partitioned into M subdomain cells $D_s$ ($s=1, \ldots, M$), such that $D = \cup_{s=1}^{M} D_s$ and $\partial\Omega = \cup_{s=1}^{M} \partial\Omega_s$. Strictly speaking, the shape derivative in Equation 29 is defined on the boundary $\partial\Omega$ of the structure, meaning that only the velocity field $V_s^n$ on each subdomain cell $D_s$ that contains a portion of the boundary is meaningful. Therefore, Equation 31 defines changes in the coefficients of the B-spline basis functions for those subdomain cells where $H(\phi) \neq 0$. For other cells, no changes would occur in their B-spline basis functions and their cellular level set functions are not necessary to change or evolve.

Thus, the gradient-descent method yields changes in the B-spline coefficients in accordance with Equation 32, wherein where $\Delta t$ is the iteration pseudo-time step:

$$c_{i,j,k}^s(t+1) = c_{i,j,k}^2(t) + \Delta t \, \dot{c}_{i,j,k}^s(t), \text{ for } s=1,\ldots,M \quad \text{Equation 32}$$

During the iteration process, the optimization component 116 can independently update the B-spline coefficients on each subdomain cell. After the updating, the optimization component can obtain the global domain level set function $\phi$ by piecing together all the subdomain level set functions $\phi_s$. In view of the above, it can be observed that computational complexity of the topology optimization with the HD-CLIBS model is substantially low. Therefore, topology optimization using the HD-CLIBS model can be directly applied to large-scale problems for three-dimensional cellular structures, overcoming many difficulties in conventional level set methods that are based on the global level set formulation.

The HD-CLIBS method results in numerical features that facilitate many efficient optimization computations, including discrete separable convolutions for gradient calculation, re-normalization, and other computational features as discussed below.

In the following discussions, we assume that the subdomain cells are made of rectilinear cells that partition the global design domain. For each subdomain cell, the degrees of the B-spine basis functions for all three directions are set to be p=q=r=3, meaning that the cubic B-splines are deployed. Moreover, the knots on the boundary faces of each cell are fully repeated, by four times. In this regard, the basis functions supported by the boundary knots are different with those fully supported by the interior knots. On a discrete rectilinear grid on the cell with equal spacing distance h, the practical computation of the HD-CLIBS based optimization relies on discretization of the gradient density function (x) or W(x) and the B-spline basis.

For the basis functions that are fully supported by simple knots, they share the same shape profile and can be regarded as an amplification and translation of the original basis function $\beta^3(x)$ supported by simple knots with unit space. Hence, we may denote these functions as $$\beta^3\left(\frac{x-x_i}{h_x}\right),$$

where $x_i$ is me i-th knot position and $h_x$ is the knot span or amplification ratio, and $i \in [3, 4, \ldots, n-4, n-3]$ for the cubic spline. Therefore, the derivatives of the B-spline coefficients of Equation 31 related to these basis functions become, in general three-dimensional as follows:

$$\dot{c}_{i,j,k}^s(t) = \int_{D_s} W(x) \beta^3\left(\frac{x-x_i}{h_x}\right)\beta^3\left(\frac{y-y_j}{h_y}\right)\beta^3\left(\frac{z-z_k}{h_z}\right) dx. \quad \text{Equation 33}$$

Further, the feature function W(x) can be discretized along the same sequences, often with a regularization process added, yielding its discrete version $W_h(x)$. This discretization scheme eventually gives rise to the convolution of the gradient density and the B-spline basis, in the form of Equation 34 as follows, where $\beta_h^3$ is the discrete version of $\beta^3$ and $D_{i,j,k}^s$ is the support domain of the basis function $N_{i,j,k}^s$:

$$\dot{c}_{i,j,k}^s = \sum_{x \in D_{i,j,k}^s} W_h(x) \beta_h^3\left(\frac{x-x_i}{h_x}\right)\beta_h^3\left(\frac{y-y_j}{h_y}\right)\beta_h^3\left(\frac{z-z_j}{h_z}\right). \quad \text{Equation 34}$$

Since the B-spline kernel is separable, the derivative can indeed be computed as a single series of three convolutions of the gradient density with a one-dimensional B-spline kernel. This convolution provides an efficient implementation of calculating the derivatives of the coefficients, thus, the evolution of the cellular level set through Equation 32.

In addition, with the B-spline kernel, each step of iteration in updating the B-spline coefficients can be viewed as a filtering operation. The B-spline kernel is known to behave as a low-pass filter, and it induces an intrinsic smoothing in the level set evolution and structural optimization. The effect of this smoothing process can be controlled explicitly through the degree and the knot spacing of the chosen B-spline basis functions. These properties are a highly useful utility for building a powerful design and optimization system for cellular structures for practical applications.

An additional feature of the trivariate B-spline representation comes from the bounding properties of the level set function. It is proven that the $l_\infty$ norm of the B-spline coefficients provides the following bound:

$$|\phi_s(x)| \leq \|c_{i,j,k}^s\|_\infty \qquad \text{Equation 35.}$$

The optimization component 116 can apply this bounding property to prevent steep gradients and to avoid re-initialization, which is often required in the classical level set implementation and is known to be problematic. Thus, in various embodiments, in each iteration step of the optimization process, the optimization component 116 can apply the following re-normalization scheme on the obtained coefficients:

$$\tilde{c}_{i,j,k}^s(t+1) := \frac{c_{i,j,k}^s(t+1)}{\|c_{i,j,k}^s(t+1)\|_\infty}. \qquad \text{Equation 36}$$

In effect, this operation imposes a bound on the level set function to the range [−1, 1]. It also makes the gradient norm of the level set function bounded by a certain value, thus, preventing inaccuracies in the numerical approximation. However, this normalization operation does not prevent the creation of new zero level formations in the optimization process, thus maintaining the topological flexibility of the level set representation.

In various example implementations of the topology optimization process, the Lagrangian multiplier λ can be calculated and updated according to the augmented Lagrangian multiplier scheme as follows:

$$\lambda_{i+1} = \begin{cases} \eta G_i & i \leq N_R \\ \lambda_i + \gamma_i G & i > N_R \end{cases}, \qquad \text{Equation 37}$$

where η is a parameter set for the first $N_R$ iterations, while $\gamma_i$ is updated by:

$$\gamma_{i+1} = \min(\gamma_i + \Delta\gamma, \gamma_{max}) \qquad \text{Equation 38, and}$$

in the further iterations during the optimization process, in which $\Delta\gamma$ and $\gamma_{max}$ are the increment and the upper limit of the parameter γ.

In other embodiments, the optimization component 116 can follow the classical framework to incorporate a regularized approximation for the Heaviside function and, particularly, the Dirac delta function defined in accordance with Equation 39, where α is a small positive number and Δ describes the width of numerical approximation.

$$\delta(\phi) = \begin{cases} \frac{3(1-\alpha)}{4\Delta}\left(1 - \frac{\phi^2}{\Delta^2}\right) & |\phi| \leq \Delta \\ 0 & |\phi| > \Delta \end{cases} \qquad \text{Equation 39}$$

Figure 26:
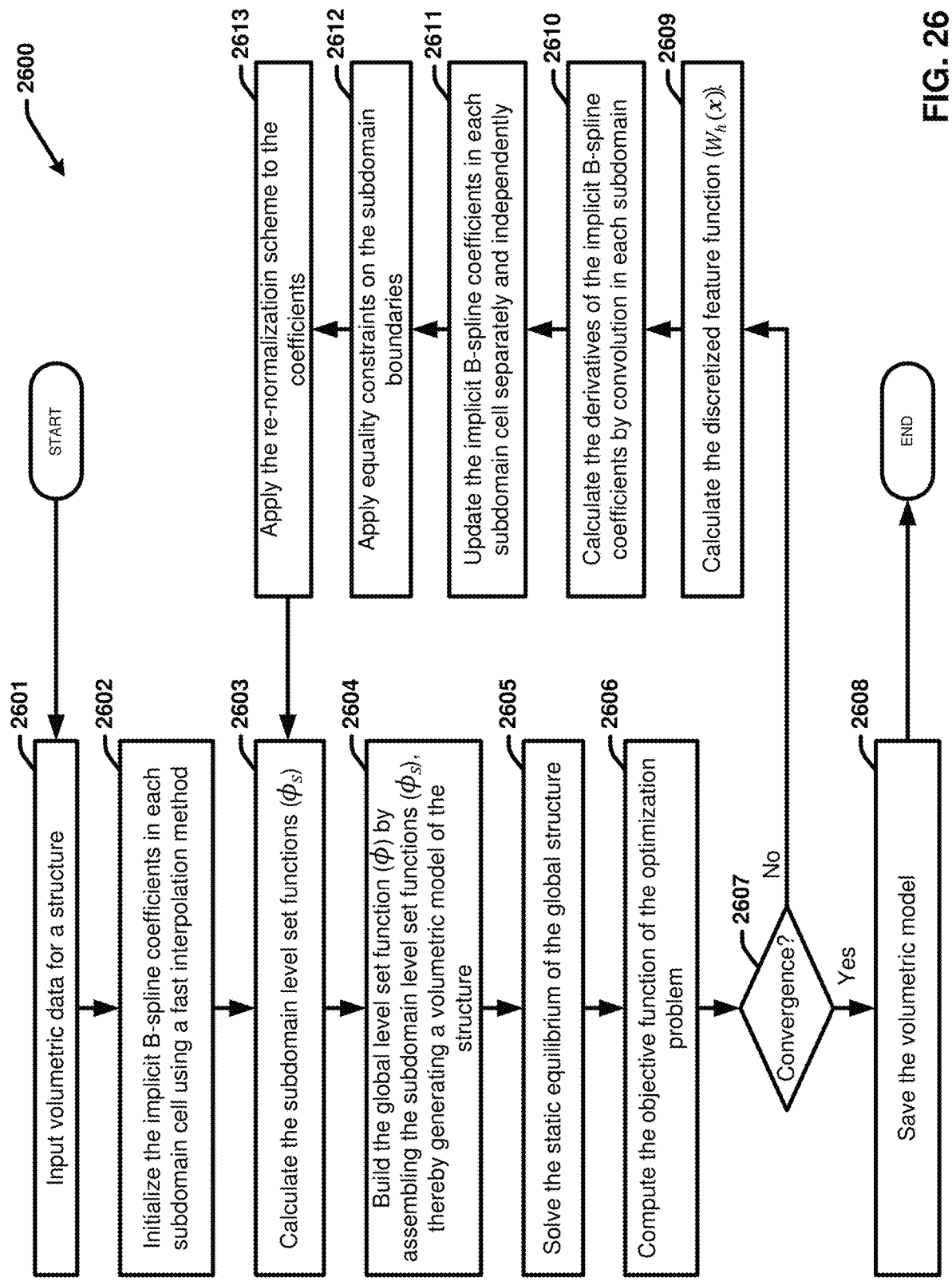
FIG. 26 presents a high-level flow-diagram of another example computer implemented topology optimization process based on the HD-CLIBS model in accordance with one or more embodiments of the disclosed subject matter.

FIG. 26 presents a flow-diagram of another example computer implemented topology optimization process 2600 based on the HD-CLIBS model in accordance with one or more embodiments of the disclosed subject matter. Process 2600 includes same or similar features as process 2500 with the addition of computational implementation details regarding the discrete separable convolutions for gradient calculation, re-normalization, and other computational features discussed above. Repetitive description of like elements employed in respective embodiments is omitted for sake of brevity.

In accordance with optimization process 2500, the boundaries of the design domain and the discretization scheme for the subcellular domains can be predefined. For example, in various implementations, the global design domain for the structure can be based on a rectilinear design domain of a defined length (L), width (W) and height (H), (e.g., L=4, H=2, and W=2), and divided in to rectilinear cells in accordance with a defined discretization scheme (e.g., 4×2×2 unit cells). The discretization scheme can further define a rectilinear grid spanning the subdomain cells with regular spacing h in each of the dimensional directions (e.g., each cell can have a 16×16×16 grid of equal spacing). For each subdomain cell, the degrees of the B-spine basis functions for all three directions are set to be p=q=r=3, meaning that the cubic B-splines are deployed. Moreover, the knots on the boundary faces of each cell are fully repeated (e.g., by four times). On a discrete rectilinear grid on the cell with equal spacing distance h, the practical computation of the HD-CLIBS based optimization relies on discretization of the gradient density function g(x) or W(x) and the B-spline basis. Depending on the optimization function/objective used (which can vary), other predefined design constraints for the structure can include (but are not limited to) the Young's modulus of the material, the Poisson's ratio, the maximum volume ratio, the knot span, and the loading conditions. Using this model, the topology optimization process simultaneously optimizes the solid domain of the structure as well as the physical properties of all structural cells that comprise the cellular structure.

In this regard, the optimization process 2600 can begin with the initial model initialization and construction process described with reference to the model initialization component 108 and FIG. 8. In this regard, at 2601, volumetric data for a structure can be received (e.g., by the model initialization component 108) and/or generated from a surface and/or a solid representation of the structure (e.g., by building the signed distance function for the model and discretization of the signed distance function to generate the volumetric data). At 2602, the implicit B-spline coefficients in each subdomain cell can be initialized by the fast interpolation method. The model initialization component 108 can then calculate the subdomain level set functions based on the B-spline coefficients at 2603 and build the global level set function by assembling the subdomain level set functions at 2604, thereby generating a (initial) volumetric model of the structure.

At 2605, the optimization component 116 can solve the static equilibrium of the global structure and compute the objective function of the optimization problem at 2606. At 2607, the optimization component 116 can determine whether convergence has been achieved. If so, then the optimization process can end, and the volumetric model can be saved at 2608 (e.g., in suitable memory). The saved model can further be rendered (e.g., via the rendering component 118), constructed, printed (e.g., using 3D printing), combined with other models (e.g., using the cellular connection operations described herein), divided (e.g., using the cellular division techniques described herein), and/or further manipulated using the various manipulation operations described with reference to the cellular connection component 110, the cellular division component 112 and/or the model manipulation component 114.

If at 2607 the optimization component 116 determines that convergence has not been achieved, then the optimization component can adapt the shape and/or topology of the model better conform with the topology optimization objectives by independently adjusting the B-spline coefficients of one or more of the subdomain cells, recalculating the subdomain level set functions and re-constructing the global level set function for the model based on the adjusted B-spline coefficients, and re-evaluating the compliance of the updated model with respect to the optimization objective function. In this regard, the optimization process involves iteratively performing these steps until convergence is achieved.

In various embodiments, the B-spline coefficients can be updated by calculating the discretized feature function at 2609. Then at 2610, the optimization component 1116 can calculate the derivatives of the implicit B-spline coefficients by convolution in each subdomain cell at 2509. At 2611, the optimization component 116 can update the implicit B-spline coefficients in each subdomain cell separately and independently. For example, B-spline coefficients can be updated using the steepest descent scheme, and other gradient based optimization methods, such optimization control (OC) methods, the method of moving asymptotes (MMA), or the like. In the embodiment shown, the updating can include applying equality constraints on the subdomain boundaries at 2612 and applying the re-normalization scheme to the coefficients at 2613.

After the update, at 2603, the subdomain level set functions $\phi_{scan}$ be recalculated, and at 2604, the global domain level set function $\phi$ can be obtained by piecing together all the updated subdomain level set functions $\phi_s$. The optimization component 116 can re-solve the static equilibrium of the updated global structure at 2605 and compute the objective function of the optimization problem at 2606. At 2607, the optimization component 116 can again determine whether convergence has been achieved and continue or end the optimization process accordingly.

FIGS. 27-32 illustrate three three-dimensional examples are presented of the disclosed techniques for optimization of solid and cellular structures as a demonstration and validation of the proposed CLIBS method.

As is well known, solving of the structural state equation, especially for three-dimensional large-scale or cellular structures, is extremely time-consuming in each optimization iteration when using the standard finite element method (FEM). Thus, in various embodiments, the optimization component 116 can employ the finite cell method (FCM) for linear elastic analysis of the structures. In this regard, with the subject cellular level set scheme, the global design domain is partitioned into a set of subdomain cells, usually in rectilinear elements. Therefore, it is highly natural to implement the finite cell method, as the underlining element hierarchy of the HD-CLIBS model is compatible with the requirements of the FCM technique.

In the typical FCM approach, the ersatz material distribution model is used, where the effective elasticity tensor for a void element is scaled down to a very small value, for example, $10^{-6}$ within the assembly of the entire cells. This strategy permits a more accurate scheme to use a multi-level scheme for evaluation of integrals over trimmed cells by recursive tessellation and simplex-based quadrature schemes. While the focus of this disclosure is not on the finite element modeling for structural analysis, the basic process of the finite cell method can be incorporated into the numerical examples presented in FIGS. 27-32. Alternately, the multi-node extended multiscale finite element method (EMsFEM) can be employed for improving the computational efficiency.

Figure 27:
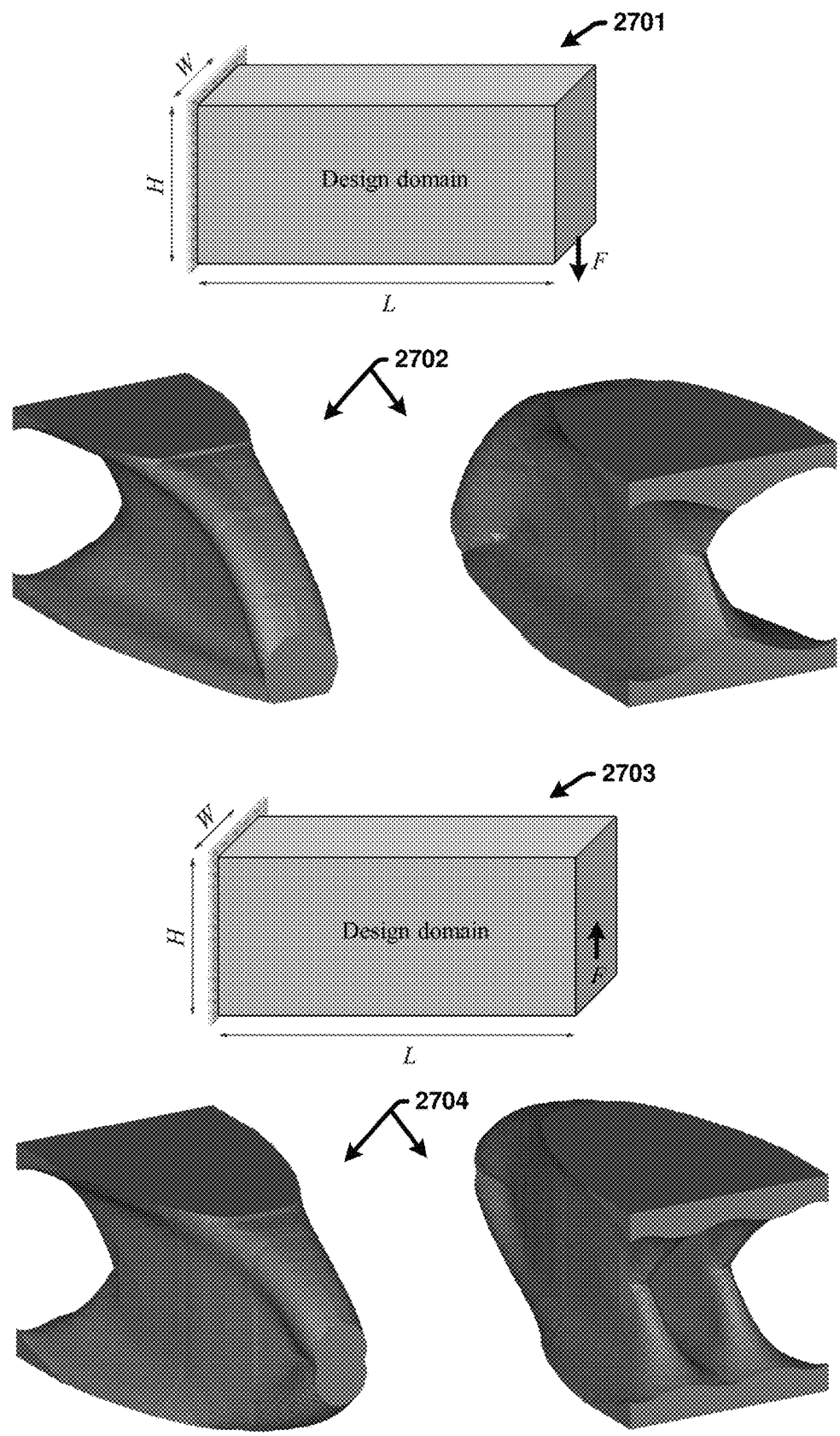
FIG. 27 illustrates the topology optimization results on an HD-CLIBS model of a solid cantilever beam under different boundary and load conditions in accordance with one or more embodiments of the disclosed subject matter.

In this regard, with reference initially to FIG. 27 illustrated are the topology optimization results on an HD-CLIBS model of a solid cantilever beam under different boundary and load conditions in accordance with one or more embodiments of the disclosed subject matter.

In the first example, a solid cantilever beam is to be optimized with a first rectilinear design domain of L=4, H=2 and W=2, as shown in FIG. 27. The Young's modulus of the material is given as $E_s=1$ and the Poisson's ratio as 0.3. The maximum volume ratio is set to be 0.3. Two different loading conditions are considered as different optimization cases, as shown via the first rectilinear design domain 2701 and the second rectilinear design domain 2703. In both cases, the design domain is divided into 4×2×2 unit cells with each cell having a 16×16×16 grid of equal spacing. The knots of the B-splines are located on the grid with a knot span of 0.0625. Cubic B-splines are used. As discussed above, the $C^0$ continuity conditions are applied among the connecting cells during the optimization. The topology optimization results in so-called organic designs 2702 and 2704. After a detailed inspection, it is easy to confirm that the geometric boundaries of the structures are fully connected on the common boundaries between any neighboring cells.

Figure 28:
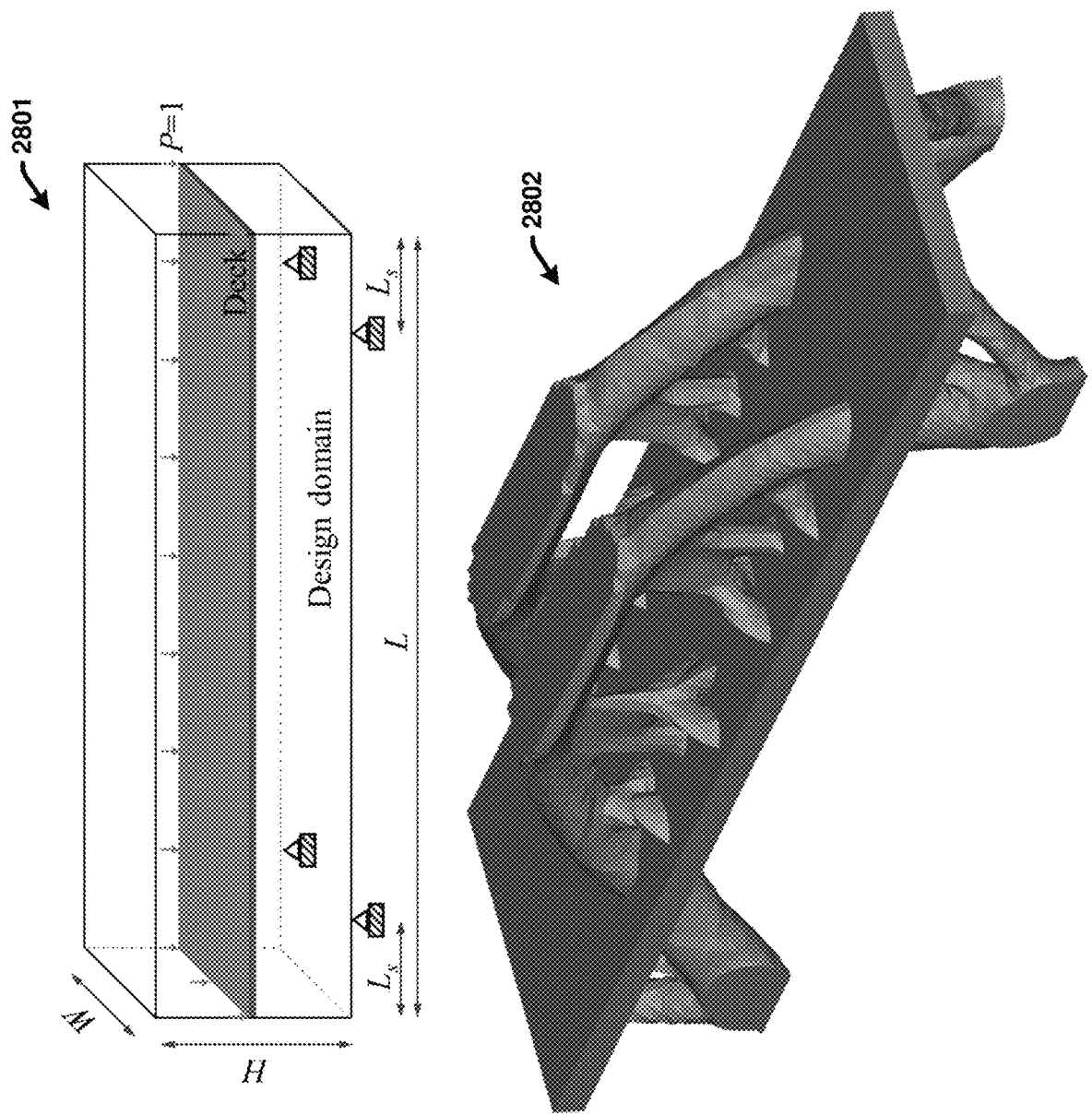
FIG. 28 illustrates the topology optimization results on an HD-CLIBS model of bridge under different boundary and load conditions in accordance with one or more embodiments of the disclosed subject matter.

FIG. 28 illustrates the topology optimization results on an HD-CLIBS model of bridge under different boundary and load conditions in accordance with one or more embodiments of the disclosed subject matter.

In this second example, a relatively complex case of a bridge design is considered in a design domain 2801 with L=16, H=4 and W=4, as shown in FIG. 28. The material properties and the maximum volume ratio remain the same as the first example. The bridge is fixed on the ground at four points with Ls=2. In addition, a bridge deck with the thickness of 0.125 is fixed during the optimization, where a set of uniform loads P=1 are applied. The design domain 2801 is divided into 16×4×4 unit B-spline cells with each cell having an 8×8×8 grid of equal spacing. The knots of the cubic B-splines are located on the grid with a knot span of 0.125. Due to the symmetry of the model, only ¼ of the design domain is selected for optimization. The $C^0$ continuity constraints are enforced among the connecting cells. An organic-shaped bridge 2802 is obtained from the topology optimization as shown in FIG. 28.

FIGS. 29-32 are directed to a final example of topology optimization of cellular structures with periodic cells and layered cells.

Figure 29:
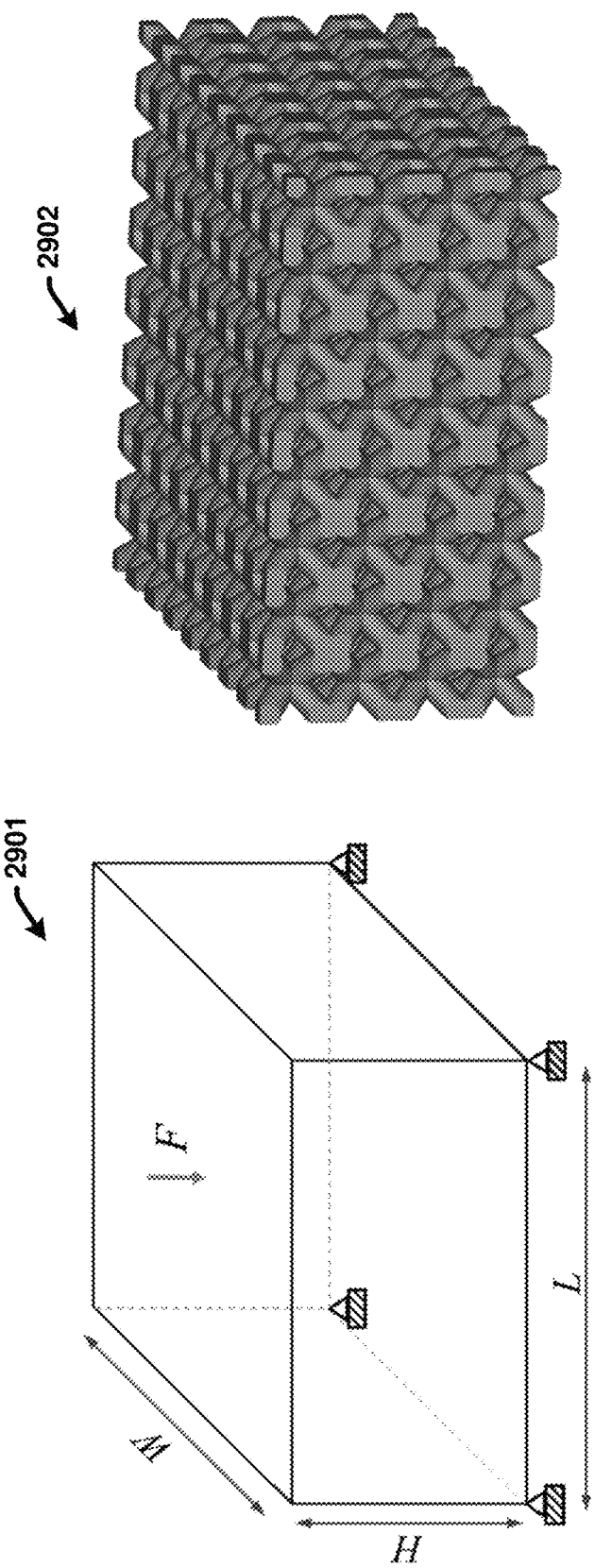
FIG. 29 illustrates an initial unit cell structure and initial boundary and load conditions for subsequent examples of topology optimization of cellular structures with periodic cells and layered cells in accordance with one or more embodiments of the disclosed subject matter.

FIG. 29 illustrates an initial unit cell structure and initial boundary and load conditions for subsequent examples of topology optimization of cellular structures with periodic cells and layered cells in accordance with one or more embodiments of the disclosed subject matter. As shown in FIG. 29, the dimensions of the design domain 2901 are L=8, W=8 and H=4, and the maximum volume ratio is set to 0.3. The global structure is fixed to the ground at the four bottom corners, while a concentrated load F=4 is imposed at the center of the top surface. The design domain is divided into 8×8×4 unit cells with a 16×16×16 grid of equal spacing on each cell for knot distribution of the cubic B-splines, with a knot span of 0.0625. Again, the $C^0$ continuity conditions are applied. Due to the structural symmetry, only ¼ of the design domain is selected for optimization.

Figure 30:
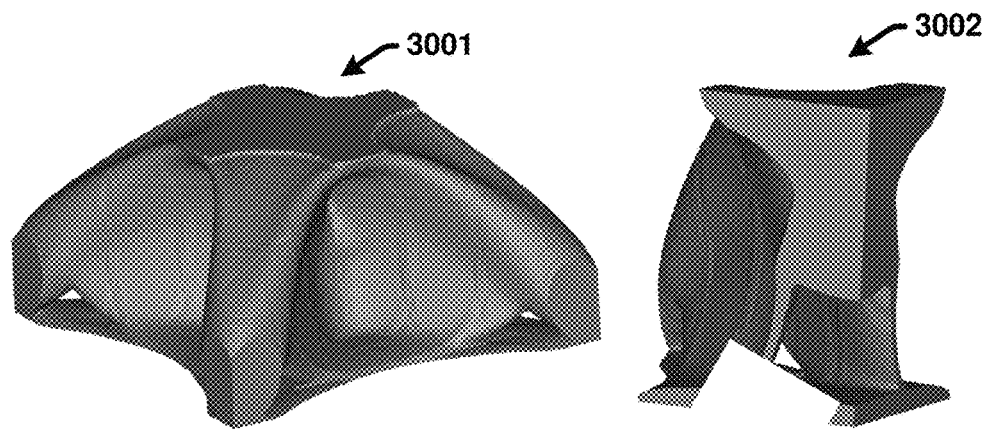
FIG. 30 illustrates an example one scale solid structure generated based on topology optimization of the initial unit cell structure in accordance with one or more embodiments of the disclosed subject matter.
Figure 31:
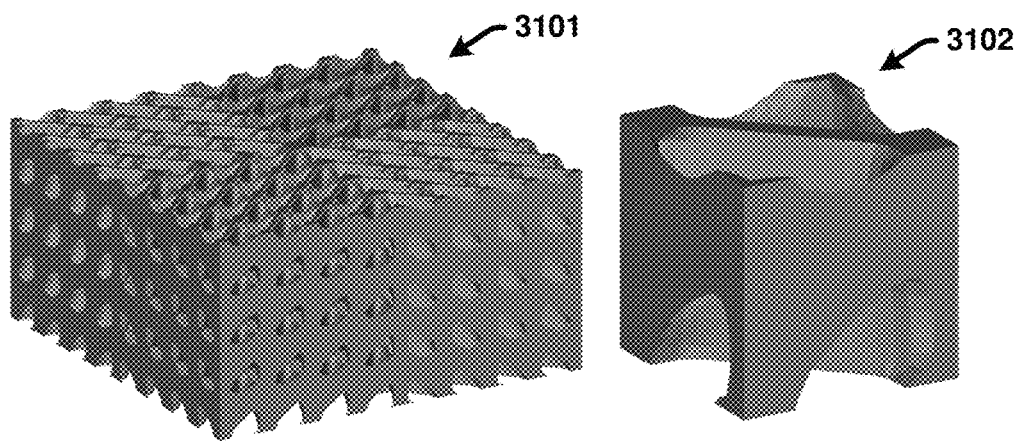
FIG. 31 illustrates an example periodic cellular structure generated based on topology optimization of the initial unit cell structure in accordance with one or more embodiments of the disclosed subject matter.
Figure 32:
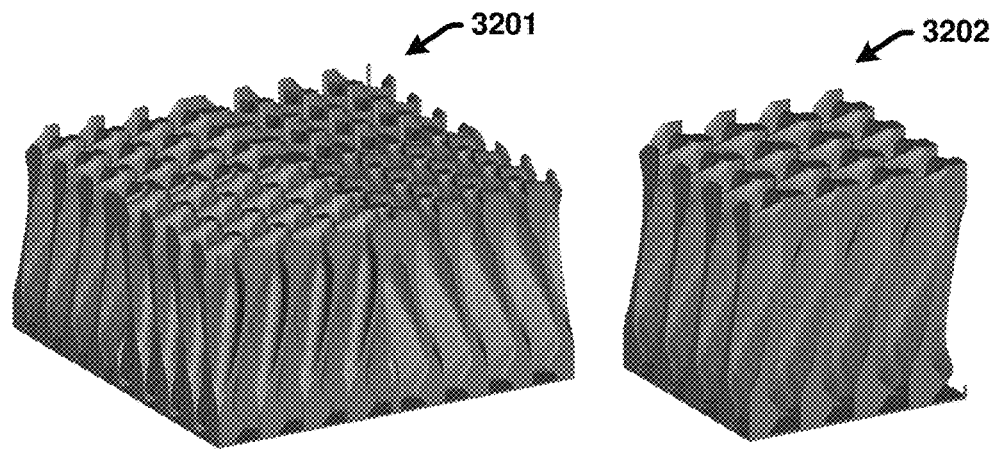
FIG. 32 illustrates an example layered cellular structure generated based on topology optimization of the initial unit cell structure in accordance with one or more embodiments of the disclosed subject matter.

The unit cell structure 2902 shown in FIG. 29 illustrates the initial structure for the topology optimization examples shown in FIGS. 30-32. The unit cell structure 2902 is a periodic cellular structure that comprises periodically repeated cells. For example, the periodic cellular structure can be built by first constructing a unit cell with the model initialization technique described with reference to the model initialization component 108 and FIG. 8 such that the unit has a relative volume fraction of 0.53 (FIG. 25 part 75). This unit cell is required to be periodic in all three directions, and it is placed into the 8×8×4 subdomain cells of the HD-CLIBS model. Then, the following three different optimization cases illustrated in FIGS. 30-32 are conducted using the unit cell structure 2902.

FIG. 30 illustrates an example one scale solid structure generated based on topology optimization of the initial unit cell 2902 structure in accordance with one or more embodiments of the disclosed subject matter. As a conventional structural topology optimization problem, the example shown in FIG. 32 consider the B-spline coefficients of all 8×8×4 B-spline cells as the design variables and no any other constraint is imposed on their cellular level set functions, except for the $C^0$ continuity conditions required for geometric continuity between connecting cells. In other words, the B-spline cells are free to change, as long as they maintain the $C^0$ connectivity. At the convergence of the optimization process, a one-scale solid structure 3001 is obtained with a characteristic organic shape as known for the conventional topology optimization. Some of the initial cellular cells become void, while the others become solid either in the interior or being cut by the boundary surface of the optimized structure. The overall material volume ratio changes to 0.30 as required, where material is distributed mainly in the diagonal direction to support the loading from the top and to transfer it to the four bottom supports. Part 3002 shows a cut-away quarter of the optimized structure 3001 for its topological configuration and its organic shape.

FIG. 31 illustrates an example periodic cellular structure generated based on topology optimization of the initial unit cell 2902 structure in accordance with one or more embodiments of the disclosed subject matter. In accordance with this example, by requiring the B-spline cells to remain periodic in all three directions, then the optimization process will not be allowed to eliminate any cell, but it will essentially optimize the unit cell to create an optimized cellular structure with repeated cell distribution. For example, as shown in FIG. 31, structure 3101 illustrates the optimized cellular structure, while part 3102 shows the optimized periodic cell. Clearly, the material in the optimized cell is re-distributed, mainly along vertical walls and a diagonal wall in the direction from the corner to the center of the loading. Since a quarter model of the structure is used for optimization, the assembled whole cellular structure is comprised of the four quarter parts with the diagonal directions aligned accordingly, as shown in structure 3101.

FIG. 32 illustrates an example layered cellular structure generated based on topology optimization of the initial unit cell structure 2902 in accordance with one or more embodiments of the disclosed subject matter. Layered structures have microstructures periodic or repetitive in one or two directions. The proposed HD-CLIBS method can be employed to design a layered structure by removing the periodic connectivity constraints on the B-spline cells in the direction of layered construction. Therefore, by doing so, an optimized layered cellular structure 3201 is obtained, as shown in FIG. 32. Part 3202 shows that the cells in each layer exhibit identical geometric configurations, since they are constrained to be periodic within the layer.

With reference again to FIG. 1, the rendering component 118 can further render or facilitate rendering the geometric models/representations generated by the structure modeling and topology optimization model 104 (e.g., the CLIBS model 118 and/or the optimized CLIBS model 120) via one or more device displays (not shown). In some implementations, the rendering component 118 can generate or provide a suitable graphical user interface (GUII) to facilitate receiving user input in association with generating, manipulating and/or otherwise interacting with the geometric models. For example, the rendering component 118 can generate a GUI that provides various CAD functions including designing, generating, manipulating (e.g., via cellular connections, cellular divisions, and other manipulations described herein), and optimizing solid and cellular HD-CLIBS models using the various features and functionalities of the HD-CLIBS modeling component 106 and the optimization component 116 discussed herein.

In this regard, although the HD-CLIBS modeling component 106 (and the components thereof), the optimization component 116 and the rendering component 118 are shown as integrated within a same module or computing "unit," it should be appreciated that the deployment architecture of system 100 is not limited to this configuration and can vary. For example, various features and functionalities of system 100 can be deployed using a distributed computing environment, wherein the one or more devices, modules and/or components of system 100 (and other systems described herein) can be provided in a distributed manner across various interconnected (via one or more networks) systems and devices (e.g., internal systems, the cloud, two or more dedicated servers, etc.). For example, system 100 can be deployed in a cloud architecture, a virtualized enterprise architecture, or an enterprise architecture wherein one the front-end components and the back-end components are distributed in a client/server relationship. With these embodiments, one or more features and functionalities of the system 100 can be deployed as a web-application, a cloud-application, a thin client application, a thick client application, a native client application, a hybrid client application, or the like. In addition, the combination of the cellular modeling (e.g., portioning the design space into cellular subdomains) and the level-set representation with implicit trivariate B-spline basis functions opens a horizon for efficient computation in parallel processing, especially on a high-performance computing platform with central processing units (CPU) and/or graphical processing units (GPU) with multiple cores. Thus, in some embodiments, one or more features and functionalities of the HD-CLIBS modeling component 106, the optimization component 116 and/or the rendering component 118 can be executed using a parallel processing environment (e.g., using two or more processing cores running in parallel).

As herein, the HD-CLIBS model 120 is a general volumetric representation method for 3D objects, which shows major advantages as a single geometric model for modeling, analysis and optimization, throughout the whole design cycle. Particularly, it is developed for the topology optimization of general solid or cellular structures with spatially-varying microstructures as well as optimized shape and topology in three dimensions. Using this model, the topology optimization process simultaneously optimizes the solid domain of the structure as well as the physical properties of all structural cells that comprise the cellular structure.

The HD-CLIBS model 120 employs the basic concept of level set method, while its application is generalized onto a set of subdomain cells that partition the entire design domain for the structure under optimization. On each subdomain cell, a level set function is defined respectively, such that the entire set of the level set functions comprise the global level set function over the entire global domain. The sizes of the subdomain cells could be chosen or refined at a small scale, thus producing designs in high definition with fine structural features and details. In addition, this cellular representation naturally leads to a parallelized scheme and extraordinary efficiency on multiple CPU or GPU cores. Such designs are the solutions to optimization problems that may have millions or billions of design variables in terms of the parametric coefficients. Therefore, a high-definition cellular level set in B-splines implementation would extend the structural topology optimization to a supercomputer environment.

Particularly, an implicit B-spline function is employed independently to define the cellular level set function for representing the structural material domain of the cell. The B-spline parameterization offers great flexibility for model initialization and manipulation, including, The B-spline basis functions are locally supported, and the support domain can be adjusted by knot manipulations. Therefore, user interactions are easily accommodated for controlling properties of the reconstructed surfaces such as local smoothness.

A fast B-spline interpolation on repeated end knots is developed to reconstruct and initialize the implicit B-spline based level set function with negligible computational cost.

Cell division can be easily achieved by inserting and repeating the knots, which can be applied for splitting the cellular structure into small portions. With this functionality, one can easily extract the structure in a specific region for future usage or local modification.

Based on the B-spline parameterization, simple compatibility constraints on the parametric coefficients of the B-spline functions of the neighboring independent cells can be readily defined. Independent cells can thus be connected with guaranteed geometric connectivity up to a specified order of smoothness, for example, first-order differentiable $C^1$. Periodic cells can be obtained with these compatibility constraints as well.

Using the division and connection, one can change the logical layout and hierarchy of the domain discretization, which offers great flexibility for hierarchical structure design.

By manipulating the coefficients, dilate, erode and gradient distribution within one single cell or the global cellular structure can be achieved in an intuitive way.

The bool operations can be achieved by a series of min/max operations on the coefficients, which offers a simple way to consider the non-design domain in the topology optimization.

A blending function is developed based on the bool operation to transfer a single scale structure into a cellular structure composed of downscale microstructures, with a cover skin of controlled thickness attached onto the surface of the structure.

The HD-CLIBS model 120 can be naturally incorporated into the topology optimization scheme. By virtue of the implicit B-spline parametrization, several benefits can be obtained, The level set function evolution is simplified to updating the B-spline coefficients directly and recursively, without solving the tedious Hamilton-Jacobi partial differential equation.

The derivative of the coefficients with respect to the pseudo time is essentially a discretized convolution between the feature function and the B-spline kernel, which is substantially efficient without solving a linear algebraic system with an interpolation matrix.

In addition to the steepest descent scheme, other gradient based optimization methods, e.g. OC or MMA, can also be employed for updating the B-spline coefficients.

During the optimization, a re-normalization scheme instead of typical re-initialization are applied to bound the gradient norm of the level set function by a certain value.

Various compatibility constraints can be applied directly to the coefficients for controlling the form of final solutions, e.g. a single scale design, a periodic cellular structure or a layered cellular structure, which assigns the HD-CLIBS model great potential in design and optimization of cellular, lattice, and functionally graded materials and structures.

This HD-CLIBS modeling and optimization method could be naturally implemented within the current CAD infrastructure using the prevailing parametric-modeling based capabilities.

Example Operating Environment

One or more embodiments can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It can be understood that each block of the flowchart illustrations and/or block diagrams, and combinations of blocks in the flowchart illustrations and/or block diagrams, can be implemented by computer readable program instructions.

These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In connection with FIG. 33, the systems and processes described below can be embodied within hardware, such as a single integrated circuit (IC) chip, multiple ICs, an application specific integrated circuit (ASIC), or the like. Further, the order in which some or all of the process blocks appear in each process should not be deemed limiting. Rather, it should be understood that some of the process blocks can be executed in a variety of orders, not all of which can be explicitly illustrated herein.

Figure 33:
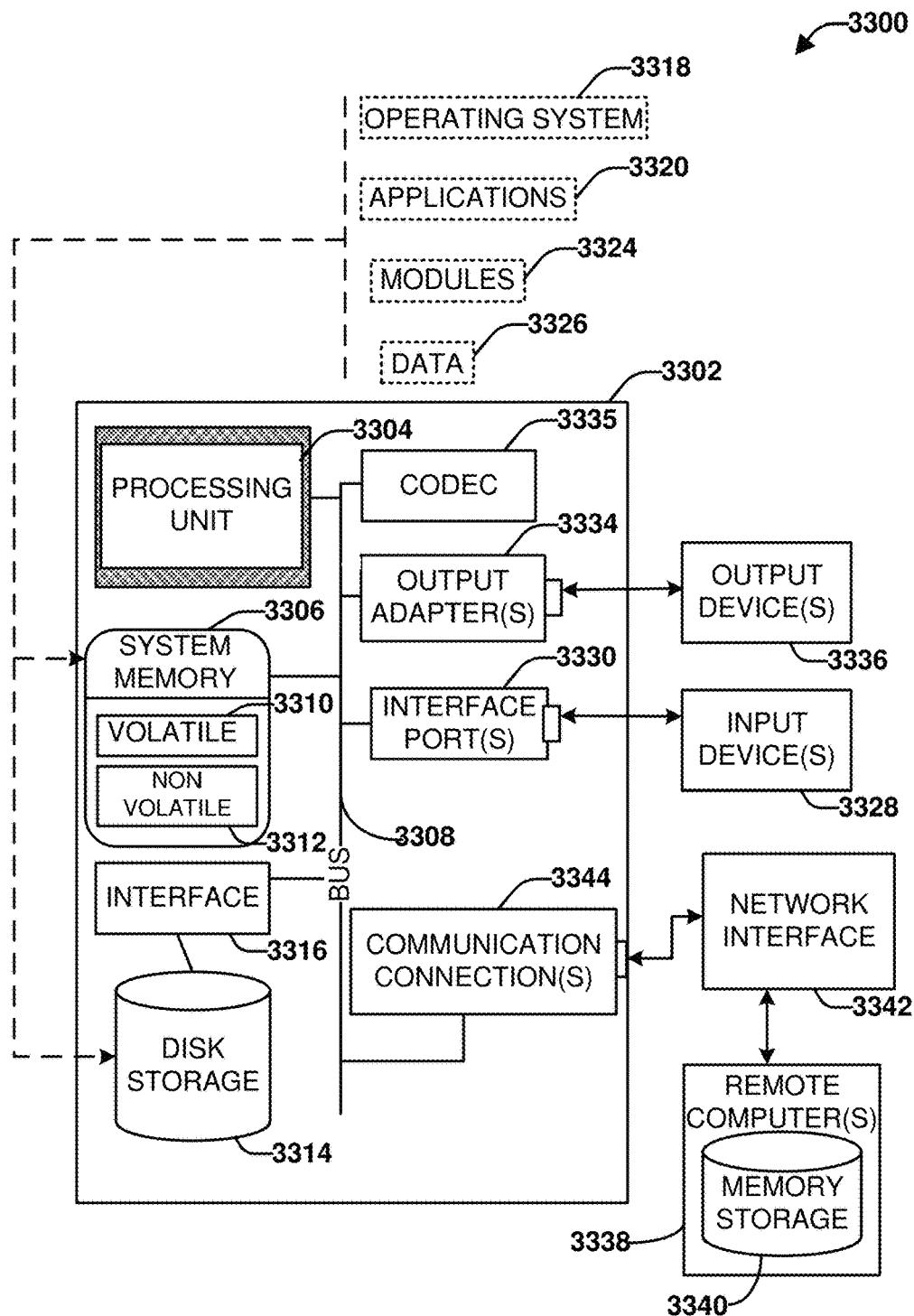
FIG. 33 illustrates a block diagram of an example, non-limiting operating environment in which one or more embodiments described herein can be facilitated.

With reference to FIG. 33, an example environment 3300 for implementing various aspects of the claimed subject matter includes a computer 3302. The computer 3302 includes a processing unit 3304, a system memory 3306, a codec 3335, and a system bus 3308. The system bus 3308 couples system components including, but not limited to, the system memory 3306 to the processing unit 3304. The processing unit 3304 can be any of various available processors. Dual microprocessors and other multiprocessor architectures also can be employed as the processing unit 3304.

The system bus 3308 can be any of several types of bus structure(s) including the memory bus or memory controller, a peripheral bus or external bus, or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 3306 includes volatile memory 3310 and non-volatile memory 3312, which can employ one or more of the disclosed memory architectures, in various embodiments. The basic input/output system (BIOS), containing the basic routines to transfer information between elements within the computer 3302, such as during start-up, is stored in non-volatile memory 3312. In addition, according to present innovations, codec 3335 can include at least one of an encoder or decoder, wherein the at least one of an encoder or decoder can consist of hardware, software, or a combination of hardware and software. Although, codec 3335 is depicted as a separate component, codec 3335 can be contained within non-volatile memory 3312. By way of illustration, and not limitation, non-volatile memory 3312 can include read only memory (ROM), programmable ROM (PROM), electrically programmable ROM (EPROM), electrically erasable programmable ROM (EEPROM), Flash memory, 3D Flash memory, or resistive memory such as resistive random access memory (RRAM). Non-volatile memory 3312 can employ one or more of the disclosed memory devices, in at least some embodiments. Moreover, non-volatile memory 3312 can be computer memory (e.g., physically integrated with computer 3302 or a mainboard thereof), or removable memory. Examples of suitable removable memory with which disclosed embodiments can be implemented can include a secure digital (SD) card, a compact Flash (CF) card, a universal serial bus (USB) memory stick, or the like. Volatile memory 3310 includes random access memory (RAM), which acts as external cache memory, and can also employ one or more disclosed memory devices in various embodiments. By way of illustration and not limitation, RAM is available in many forms such as static RAM (SRAM), dynamic RAM (DRAM), synchronous DRAM (SDRAM), double data rate SDRAM (DDR SDRAM), and enhanced SDRAM (ESDRAM) and so forth.

Computer 3302 can also include removable/non-removable, volatile/non-volatile computer storage medium. FIG. 33 illustrates, for example, disk storage 3314. Disk storage 3314 includes, but is not limited to, devices like a magnetic disk drive, solid state disk (SSD), flash memory card, or memory stick. In addition, disk storage 3314 can include storage medium separately or in combination with other storage medium including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 3314 to the system bus 3308, a removable or non-removable interface is typically used, such as interface 3316. It is appreciated that disk storage 3314 can store information related to a user. Such information might be stored at or provided to a server or to an application running on a user device. In one embodiment, the user can be notified (e.g., by way of output device(s) 3336) of the types of information that are stored to disk storage 3314 or transmitted to the server or application. The user can be provided the opportunity to opt-in or opt-out of having such information collected or shared with the server or application (e.g., by way of input from input device(s) 3328).

It is to be appreciated that FIG. 33 describes software that acts as an intermediary between users and the basic computer resources described in the suitable operating environment 3300. Such software includes an operating system 3318. Operating system 3318, which can be stored on disk storage 3314, acts to control and allocate resources of the computer 3302. Applications 3320 take advantage of the management of resources by operating system 3318 through program modules 3324, and program data 3326, such as the boot/shutdown transaction table and the like, stored either in system memory 3306 or on disk storage 3314. It is to be appreciated that the claimed subject matter can be implemented with various operating systems or combinations of operating systems.

A user enters commands or information into the computer 3302 through input device(s) 3328. Input devices 3328 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 3304 through the system bus 3308 via interface port(s) 3330. Interface port(s) 3330 include, for example, a serial port, a parallel port, a game port, and a universal serial bus (USB). Output device(s) 3336 use some of the same type of ports as input device(s) 3328. Thus, for example, a USB port can be used to provide input to computer 3302 and to output information from computer 3302 to an output device 3336. Output adapter 3334 is provided to illustrate that there are some output devices 3336 like monitors, speakers, and printers, among other output devices 3336, which require special adapters. The output adapters 3334 include, by way of illustration and not limitation, video and sound cards that provide a means of connection between the output device 3336 and the system bus 3308. It should be noted that other devices or systems of devices provide both input and output capabilities such as remote computer(s) 3338.

Computer 3302 can operate in a networked environment using logical connections to one or more remote computers, such as remote computer(s) 3338. The remote computer(s) 3338 can be a personal computer, a server, a router, a network PC, a workstation, a microprocessor based appliance, a peer device, a smart phone, a tablet, or other network node, and typically includes many of the elements described relative to computer 3302. For purposes of brevity, only a memory storage device 3340 is illustrated with remote computer(s) 3338. Remote computer(s) 3338 is logically connected to computer 3302 through a network interface 3342 and then connected via communication connection(s) 3344. Network interface 3342 encompasses wire or wireless communication networks such as local-area networks (LAN) and wide-area networks (WAN) and cellular networks. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 3344 refers to the hardware/software employed to connect the network interface 3342 to the bus 3308. While communication connection 3344 is shown for illustrative clarity inside computer 3302, it can also be external to computer 3302. The hardware/software necessary for connection to the network interface 3342 includes, for exemplary purposes only, internal and external technologies such as, modems including regular telephone grade modems, cable modems and DSL modems, ISDN adapters, and wired and wireless Ethernet cards, hubs, and routers.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments where tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration and are intended to be non-limiting. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim. The descriptions of the various embodiments have been presented for purposes of illustration, but are not intended to be exhaustive or limited to the embodiments disclosed. Many modifications and variations can be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising,
    a processor; and
    a memory that stores executable instructions that, when executed by the processor, facilitate performance of operations, comprising:
        receiving volumetric data defining a structure;
        generating a three-dimensional model of the structure based on the volumetric data, comprising:
            partitioning a global design domain for the structure into subdomain cells in three-dimensions;
            defining cellular level set functions for respective subdomain cells of the subdomain cells; and
            defining parameters of the cellular level set functions using B-spline basis functions for the respective subdomain cells; and
        optimizing a topology of the three-dimensional model in accordance with a defined optimization function by independently adjusting B-spline coefficients of the B-spline basis functions for the respective subdomain cells using as a sequence of discrete convolution operations.

2. The system of claim 1, wherein the generating further comprises:
    initializing the cellular level set functions using a fast B-spline interpolation method or a fast discrete B-spline convolution method to determine the B-spline coefficients for the B-spline basis functions based on the volumetric data, resulting in initialized cellular level set functions.

3. The system of claim 2, wherein the generating further comprises:
    assembling the initialized cellular level set functions into a global level set function for the structure; and
    reconstructing the volumetric data based on the global level set function, resulting in a transformation of the volumetric data into the three-dimensional model.

4. The system of claim 1, wherein the generating further comprises:
    determining the B-spline coefficients for the B-spline basis functions based on the volumetric data using a fast B-spline interpolation method or a fast discrete B-spline convolution method, resulting in defining internal geometric properties of the subdomain cells;
    determining values of the cellular level set functions using the B-spline coefficients, resulting in defining level set representations of the subdomain cells; and
    assembling the level set representations in accordance with a global level set function for the structures, resulting in a transformation of the volumetric data into the three-dimensional model.

5. The system of claim 1, wherein the operations further comprise:
    controlling properties of the three-dimensional model by adjusting the B-spline coefficients and knot vectors of the B-spline basis functions.

6. The system of claim 1, wherein the generating further comprises, for the respective subdomain cells:
    defining a rectilinear grid with regular spacing in respective directions of the three-dimensions;
    locating knot vectors of the B-spline basis functions on the rectilinear grid; and
    setting first and last knots in the respective directions to be fully repeated with highest multiplicity.

7. The system of claim 1, wherein the three-dimensional model comprises a first high-definition cellular level set in B-splines (HD-CLIBS) model, and wherein operations further comprise:
    connecting the first HD-CLIBS model with a second HD-CLIBS model; and
    constraining boundary B-spline coefficients associated with boundary faces between neighboring subdomain cells of the first HD-CLIBS model and the second HD-CLIBS model to achieve a defined order differentiable of continuity between the first HD-CLIBS model and the second HD-CLIBS model.

8. The system of claim 1, wherein the operations further comprise:
    dividing a subdomain cell of the subdomain cells into two or more cells by inserting a repeating knot into a knot sequence of a B-spline basis function of the B-spline basis functions defined for the subdomain cell.

9. The system of claim 1, wherein the operations further comprise:
    adapting geometric properties of the three-dimensional model by adjusting the B-spline coefficients of the B-spline basis functions.

10. The system of claim 9, wherein the adapting comprises performing adjustment operations comprising dilation, erosion, grading, and blending operations.

11. The system of claim 1, wherein the operations further comprise:
    adapting geometric properties of the three-dimensional model by independently adapting geometric properties of the subdomain cells by independently adjusting subsets of the B-spline coefficients associated with the respective subdomain cells.

12. The system of claim 1, wherein the optimizing comprises determining a solution to the optimization function without applying the Hamilton-Jacobi equation or a linear system with an interpolation matrix.

13. The system of claim 1, wherein the optimizing comprises applying a re-normalization scheme to bound a gradient norm of the cellular level set functions by a defined value.

14. A method, comprising:
    obtaining, by a system operatively coupled to at least one processor, volumetric data defining a structure;
    generating, by the system, a three-dimensional model of the structure based on the volumetric data, comprising:
        partitioning, by the system, a global design domain for the structure into subdomain cells in three-dimensions;
        defining, by the system, cellular level set functions for respective subdomain cells of the subdomain cells; and
        defining, by the system, parameters of the cellular level set functions using B-spline basis functions for the respective subdomain cells; and optimizing, by the system, a topology of the three-dimensional model in accordance with a defined optimization function by independently adjusting B-spline coefficients of the B-spline basis functions for the respective subdomain cells using as a sequence of discrete convolution operations.

15. The method of claim 14, wherein the generating further comprises:
initializing, by the system, the cellular level set functions using a fast B-spline interpolation method or a fast discrete B-spline convolution method to determine the B-spline coefficients for the B-spline basis functions based on the volumetric data, resulting in initialized cellular level set functions.

16. The method of claim 15, wherein the generating further comprises:
building, by the system, the global level set function by assembling the initialized cellular level set functions; and
reconstructing, by the system, the volumetric data based on the global level set function, resulting in a transformation of the volumetric data into the three-dimensional model.

17. The method of claim 14, wherein the generating further comprises, for the respective subdomain cells:
defining a rectilinear grid with regular spacing in respective directions of the three-dimensions;
locating knot vectors of the B-spline basis functions on the rectilinear grid; and
setting first and last knots in the respective directions to be fully repeated with highest multiplicity.

18. A non-transitory machine-readable medium, comprising executable instructions that, when executed by one or more processors, facilitate performance of operations, comprising:
defining a three-dimensional model for a structure, comprising:
partitioning a global design domain for the structure subdomain cells in three-dimensions;
defining cellular level set functions for respective subdomain cells of the subdomain cells; and
defining parameters of the cellular level set functions using B-spline basis functions for the respective subdomain cells;
generating the three-dimensional model based on volumetric data corresponding to the structure; and
optimizing a topology of the three-dimensional model in accordance with a defined optimization function by independently adjusting B-spline coefficients of the B-spline basis functions for the respective subdomain cells using as a sequence of discrete convolution operations.

19. A non-transitory machine-readable medium of claim 18, wherein the generating comprises:
initializing the cellular level set functions using a fast B-spline interpolation method or a fast discrete B-spline convolution method to determine the B-spline coefficients for the B-spline basis functions based on the volumetric data, resulting in initialized cellular level set functions.

20. The non-transitory machine-readable medium of claim 19, wherein the generating further comprises:
assembling the initialized cellular level set functions into a global level set function for the structure; and
reconstructing the volumetric data based on the global level set function, resulting in a transformation of the volumetric data into the three-dimensional model.

* * * * *